US006809903B2

(12) United States Patent
Bagnell et al.

(10) Patent No.: US 6,809,903 B2
(45) Date of Patent: Oct. 26, 2004

(54) LOW PROFILE CARTRIDGE FOR DATA STORAGE DISK

(75) Inventors: Glade N. Bagnell, Longmont, CO (US); Christopher F. Banks, Rollinsville, CO (US); Edwin J. Wadsworth, Longmont, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 306 days.

(21) Appl. No.: 09/730,647

(22) Filed: Dec. 5, 2000

(65) Prior Publication Data

US 2001/0030833 A1 Oct. 18, 2001

Related U.S. Application Data

(63) Continuation-in-part of application No. 09/548,128, filed on Apr. 12, 2000.

(51) Int. Cl.[7] ............................................. G11B 23/03
(52) U.S. Cl. ........................... 360/133; 720/739
(58) Field of Search ......................... 360/133; 369/291; 720/738, 739

(56) References Cited

U.S. PATENT DOCUMENTS

| | | | | |
|---|---|---|---|---|
| 4,797,770 A | * | 1/1989 | Takahasi | 369/291 |
| 5,046,170 A | | 9/1991 | Oshima et al. | 360/133 |
| 5,063,558 A | * | 11/1991 | Takahashi | 369/291 |
| 5,166,922 A | * | 11/1992 | Akiyama et al. | 369/291 |
| 5,175,726 A | | 12/1992 | Imokawa | 369/291 |
| 5,293,294 A | * | 3/1994 | Chappell | 360/133 |
| 5,444,691 A | * | 8/1995 | Akiyama | 369/291 |
| 5,530,691 A | * | 6/1996 | Fujisawa | 369/291 |
| 5,546,376 A | | 8/1996 | Taniyama | 369/291 |
| 5,786,969 A | * | 7/1998 | Fukushima et al. | 360/133 |
| 5,815,487 A | * | 9/1998 | Fujisawa | 369/291 |
| 5,903,542 A | | 5/1999 | Sandell et al. | 369/291 |
| 5,923,641 A | * | 7/1999 | Fujita | 369/291 |
| 5,926,454 A | * | 7/1999 | Mizutani et al. | 369/291 |
| 6,108,299 A | | 8/2000 | Kano et al. | 369/291 |
| 6,198,598 B1 | | 3/2001 | Meguro | 360/133 |
| 6,243,355 B1 | * | 6/2001 | Ikebe et al. | 369/291 |
| 6,687,215 B1 | * | 2/2004 | Bagnell et al. | 369/291 |

FOREIGN PATENT DOCUMENTS

| | | |
|---|---|---|
| DE | 197 19 975 | 11/1997 |
| EP | 0 215 958 | 4/1987 |
| EP | 0 339 651 | 11/1989 |
| EP | 0 358 442 | 3/1990 |
| EP | 0 393 858 | 10/1990 |
| EP | 0 440 175 | 8/1991 |
| EP | 0 496 511 | 7/1992 |
| EP | 0 526 222 | 2/1993 |
| EP | 0 752 704 | 1/1997 |
| EP | 0 895 241 | 2/1999 |
| EP | 0 929 070 | 7/1999 |
| EP | 0 982 729 | 3/2000 |
| JP | 3-194782 | * 8/1991 |

* cited by examiner

Primary Examiner—Brian E. Miller
(74) Attorney, Agent, or Firm—MacPherson Kwok Chen & Heid LLP

(57) ABSTRACT

A first-surface optical disk including features, such as a slot defined on an edge of the housing for providing clearance for a blocking tab in a drawer mechanism so as to allow the cartridge assembly to be fully inserted into the drawer mechanism when the shutter member is in the second position.

1 Claim, 55 Drawing Sheets

400

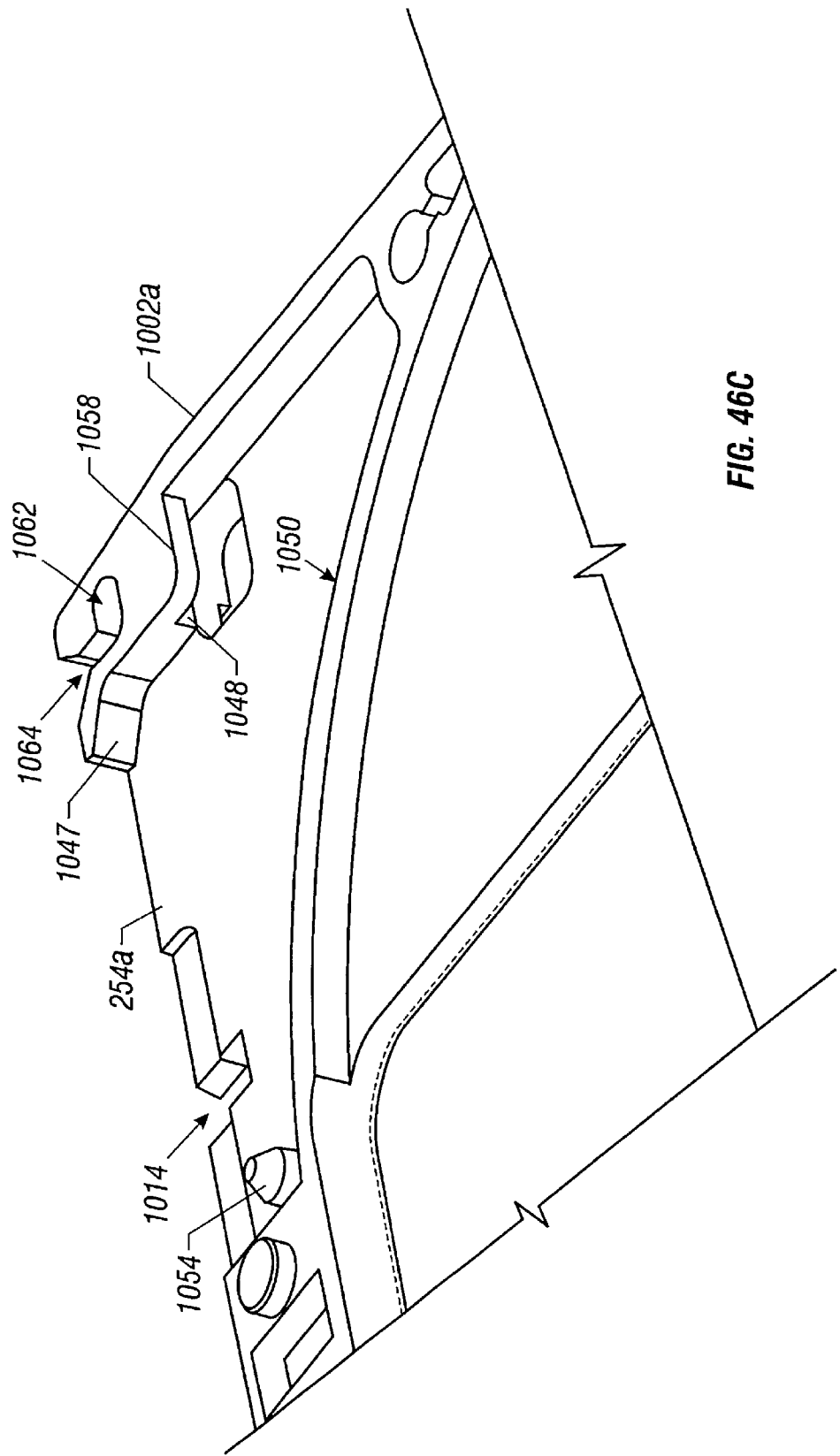

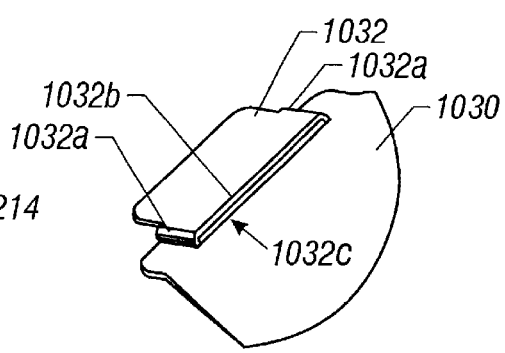
FIG. 51D
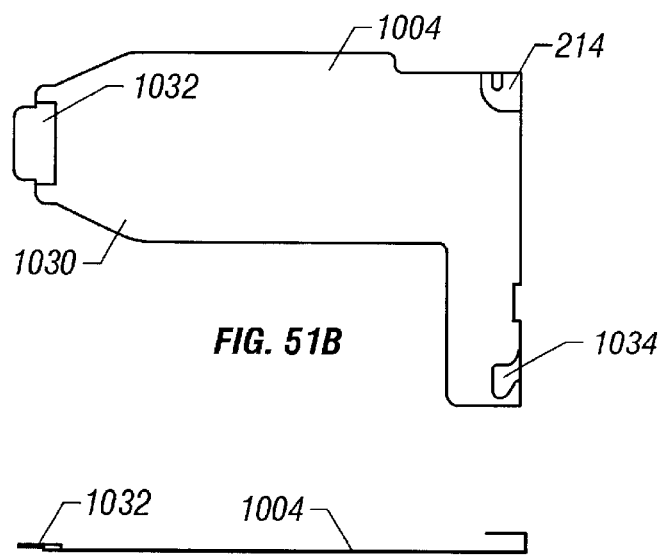
FIG. 51B
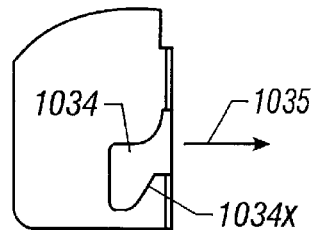
FIG. 51G
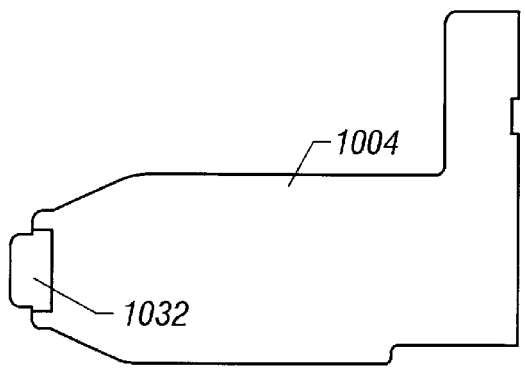
FIG. 51C
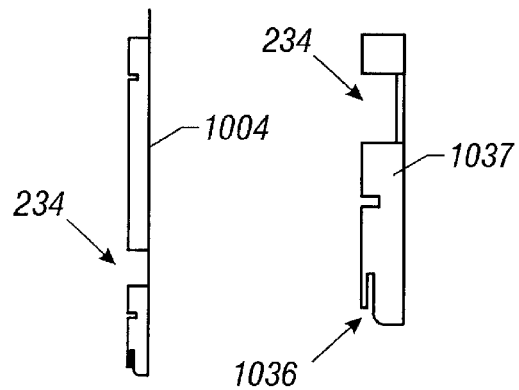
FIG. 51A   FIG. 51E   FIG. 51F

LOW PROFILE CARTRIDGE FOR DATA STORAGE DISK

CROSS REFERENCE TO RELATED APPLICATIONS

The present application is a continuation-in-part of U.S. patent application Ser. No. 09/548,128, filed Apr. 12, 2000, entitled "Low Profile And Medium Protecting Cartridge Assembly", which is incorporated herein by reference in its entirety.

FIELD OF THE INVENTION

The present invention is directed generally to a low profile cartridge and specifically to a low profile cartridge for an optical disk.

BACKGROUND OF THE INVENTION

A number of disk-shaped optical storage media have been developed for use in storing various types of digital data in a manner such that the media can be readily removed from the read/write or drive device for which it is designed. A common type of optical media is second-surface optical media. In accordance with one definition, second-surface optical media can be defined in terms of the read operation that is conducted when reading information from the media. In particular, a second-surface optical medium can refer to a medium in which the read beam is incident on the substrate of the optical medium or disk before it is incident on the information content portions thereof.

The relatively thick and transparent substrate of second-surface optical media makes read-only or read-write operations relatively insensitive to dust particles, scratches and the like which are located more than 50 wavelengths from the information content portions thereof. On the other hand, the second-surface optical medium can be relatively sensitive to various optical aberrations. These optical aberrations include: (1) tilt of the substrate relative to the optical axis; (2) substrate thickness variations; and/or (3) substrate birefringence.

Another drawback associated with second-surface optical media is that the optical requirements of such media are substantially inconsistent with the miniaturization of the disk drive and optical components for such media. As will be appreciated, a longer working distance (distance between the objective lens and the information content portions) is required for an optical system that will read information from or write information onto second-surface media. This is due to the relatively thick transparent layer through which the radiation must pass to access the information content portions. To provide the longer working distance, larger optical components (e.g., objective lens) are required.

Because of these disadvantages associated with second-surface optical media, a first-surface optical medium has been devised by the assignee of the present application. Although it may be subject to more than one definition, in one embodiment, the first-surface optical medium refers to a medium in which the read beam during a read operation is incident on or impinges on information content portions of the first-surface optical medium before it impinges on a substrate of the first-surface optical medium.

The first-surface medium offers numerous advantages over a second-surface medium. By way of example, with the first-surface medium, the radiation does not pass through the relatively thick substrate so that there is a relatively shorter optical path, in comparison with second-surface medium, thereby providing a significantly shorter working distance, in comparison with second-surface medium. Since there is a shorter working distance, a smaller objective lens diameter, for a given numerical aperture, can be utilized which results in smaller, lower mass optical components to achieve a greater degree of optical drive miniaturization. Furthermore, the first-surface medium is not sensitive to substrate birefringence and substrate thickness variations. The first-surface medium is also much less sensitive to substrate tilt.

However, because there is no protective layer with a first-surface optical medium, to protect it from damage or being subject to unwanted particles or debris, it is imperative that a sufficiently protective housing or cartridge be employed to contain the optical medium. There are a number of factors to be considered in designing the protective cartridge for first-surface optical media. The cartridge should include a number of complementary and/or redundant protective features. For example, the cartridge should have features to protect the enclosed first-surface disk from damage such as by scratches and abrasions caused by handling of the cartridge or rotation of the enclosed disk during read and/or write operations. As will be appreciated, the cartridge should be designed to prevent contact of a surface of the cartridge with the operational surface of the disk. The cartridge should have features to retard the entry of dust and other foreign matter into the interior of the cartridge. Such foreign matter can prevent the optical head from reading information from or writing information to the disk. The cartridge should have a small form factor to permit the cartridge to be used with small, hand-held electronic devices, such as PEDs (Personal Electronic Devices) and digital cameras. The cartridge should have features to self-locate the cartridge in the disk drive. Such features facilitate proper alignment of the operational surface and data tracks relative to the optical head. The cartridge should also have features permitting the use of a double-sided, first-surface, optical disk. In other words, the cartridge should permit the optical head to access both of the opposing operational surfaces of the disk.

SUMMARY OF THE INVENTION

These and other design considerations are satisfied by one or more of the cartridge embodiments of the present invention.

In a first embodiment of the present invention, an apparatus for use in an optical system is provided. The apparatus includes a cartridge assembly having upper and lower shutter members that move independently of one another. In particularly preferred configuration, a single mechanism, such as a rotary arm mounted in the disk drive, engages and moves each of the shutter members. In one configuration, the mechanism engages and moves a first (but not a second) shutter member when the cartridge assembly is inserted into the disk drive in a first orientation and engages and moves the second (but not the first) shutter member when the cartridge assembly is inserted into the disk drive in a second orientation that is different from the first orientation. In one application, the first orientation is the flip side (or reverse) of the second orientation.

In another embodiment, a cartridge assembly is provided that includes a double-sided optical medium, access openings (for the optical head) located on opposing surfaces of the cartridge assembly, and one or more shutter members that are movably disposed to cover or uncover (simultaneously or sequentially) the access openings. In this manner, the cartridge assembly can be inserted into the disk drive in a first orientation to reveal a first operational surface of the medium and in a second orientation to reveal a second operational surface of the medium. As noted above, the first orientation can be the flip side (or reverse) of the second orientation.

In yet another embodiment, an apparatus for use in an optical system is provided. The apparatus includes:

(a) an optical storage medium (which can be first- or second-surface) having at least a first side for storing information;

(b) a hub assembly operatively associated with the optical storage medium; and (c) a cartridge assembly that contains the optical storage medium and the hub assembly. The cartridge assembly includes a first optical storage medium protector for use in safeguarding the optical storage medium against the occurrence of one or more unwanted events and a second optical storage medium protector for use in safeguarding the optical storage medium against the occurrence of one or more second unwanted events. The unwanted events, for example, can be contact of the operational surface of the disk with a cartridge wall(s) due to inward deflection of the cartridge wall(s) by a user, contact of the operational surface of the disk with the cartridge wall(s) during rotation of the disk by a disk drive, and collection of foreign matter on the disk operational surface.

The first and second optical storage medium protectors are preferably selected from a variety of features.

In one configuration, the first and/or second optical storage medium protectors include a first major wall (e.g., a shutter wall) covering a hub member of the hub assembly. Not only does the cartridge wall block foreign matter from entering into the interior of the cartridge through a hole in the cartridge wall(s) to permit the disk drive to engage the hub member, but also the hub member provides structural support to the wall to resist deflection. In one configuration, an inner surface of the first major wall is spaced from the adjacent outer surface of the hub member such that, when a force is applied to the wall, the interior surface contacts the outer surface of the hub member to thereby constrain inward wall deflection, but does not contact the operational surface of the optical storage medium.

In another configuration, the first and/or second optical storage medium protectors include a locking subassembly having first and second positions. When the locking subassembly is in the first position, access to the hub member and/or optical storage medium is blocked (e.g., by a movable shutter wall member) and when the locking subassembly is in the second position access to the hub member and/or optical storage medium is available. In one design, a laterally movable wall or shutter is disposed so as to cover an access door in the cartridge wall for the optical head, as well as an opening in the cartridge wall for the hub member, in the first position and uncover the access door for the optical head, and the opening for the hub member, in the second position.

In yet another configuration, the cartridge assembly further includes a third optical storage medium protector. The third optical storage medium protector includes a medium constraining member having portions that overlie a peripheral edge of the optical storage medium. The third optical storage medium protector can be a annular slot positioned around the periphery of the medium for receiving a peripheral edge of the medium in between opposing surfaces of the slot. The opposing surfaces of the slot are interiorly offset from a surface of a wall of the cartridge to suspend the medium above, and avoid contact of the medium with the interior surface.

In yet another embodiment, an apparatus for use in an optical system is provided. The apparatus includes:

(a) a hub assembly having a total height and including at least a first hub member, with the total height including at least a height of the first hub member;

(b) an optical storage medium having a thickness and including a first side and a second side, with at least the first side storing information; and (c) a cartridge assembly for containing the hub assembly and the optical storage medium. The cartridge assembly has a low profile. The ratio of the cartridge assembly height to the total height of the hub assembly is typically less than about 1.50 and more typically ranges from greater than 1.00 to about 1.25.

In yet a further embodiment, an apparatus for use in an optical system is provided. The apparatus includes:

(a) an optical storage medium; and (b) a cartridge assembly including a holding feature (e.g., at least one of a locating pin and a locating hole) and a displacement feature (e.g., at least one of an anti-rotational pin and an anti-rotational slot). In one configuration, one of the locating pin and hole and one of the anti-rotational pin and slot are each located on the disk drive with the other being located on the cartridge housing. The anti-rotational slot has a larger cross-sectional extent or area than the locating hole to permit the disk drive to displace the cartridge housing along an arc extending along the anti-rotational slot (e.g., rotate the housing), the center of which is located at the center of the locating pin. In this manner, the disk drive is able to displace the cartridge housing as needed to correctly align the cartridge in a plane parallel to an operational surface of the medium. In another configuration, the disk drive includes one or more datum features (e.g., one or more contact surfaces) for contacting one or more surfaces of the cartridge assembly to correctly position the cartridge in a plane normal to the operational surface of the medium. These features facilitate alignment of the medium in the plane for substantially optimal focus and servo control.

In yet a further embodiment, a method is provided for safeguarding an optical storage medium. The method includes the steps of:

(a) providing a cartridge assembly including a housing having a major wall with an inner wall surface and containing (i) an optical storage medium side and (ii) a hub assembly joined to the optical storage medium, with one or more portions of the major wall covering a first hub member of the hub assembly; and (b) opening a locking subassembly when access to the optical storage medium is being provided.

In yet another embodiment, an apparatus for use in an optical system is provided that includes:

(a) an optical storage medium having at least one operational surface for storing information; and (b) a cartridge assembly that contains the optical storage medium and includes a lockout subassembly. The cartridge assembly is properly insertable into a disk drive in a first orientation and improperly insertable into the disk drive in a second orientation. The lockout subassembly permits the cartridge assembly to be inserted fully into the disk drive in the first orientation and retards the cartridge assembly from being inserted fully into the disk drive in the second orientation.

In one configuration, the lockout subassembly includes a slot for engaging a rotary arm located in the disk drive, thereby inhibiting full insertion of the cartridge assembly in the second orientation. The cartridge assembly can include a second lockout subassembly located on an opposing side of the cartridge assembly from the first lockout subassembly to safeguard the cartridge from being improperly inserted when the cartridge assembly is flipped over.

In another aspect the invention comprises a cartridge assembly for a data storage disk. The cartridge assembly comprises a housing for containing a data storage disk; a shutter member movable between a first position, wherein an opening in the housing is covered, and a second position, wherein the opening is at least partially uncovered to expose a portion of the data storage disk. The shutter member has a tab which slides in a slot in the housing as the shutter member moves between the first and second positions, the slot being isolated from an interior of the disk so as to protect the disk from debris generated as the shutter member moves between the first and second positions.

In another aspect, the cartridge assembly includes a slot in an edge of the housing, the slot being covered when the shutter member is in the first position and being uncovered when the shutter member is in the second position, the slot being for providing clearance for a blocking tab in a drawer mechanism so as to allow the cartridge assembly to be fully inserted into the drawer mechanism when the shutter member is in the second position.

In yet another aspect, the housing has a leading edge and a trailing edge and includes a reverse-lockout slot formed in the trailing edge to prevent the cartridge assembly from being fully inserted, trailing-edge first, into a drawer mechanism.

The cartridge assembly may comprise a locking arm rotatable about a pivot point, the locking arm containing a locking nub for engaging the shutter member so as to prevent the shutter member from being opened. The locking arm may contain a cam surface adjacent the locking nub for engaging the shutter member when the shutter member is being closed, the cam surface being in a concave shape. In one embodiment, the cam surface is in the form of an arc of a circle having a selected radius.

The locking arm may contain a spring member urging the locking arm such that the locking nub is in position to engage the shutter member and may further contain a restraining edge for contacting a corresponding surface of the cartridge assembly to prevent damage to the spring member from rotation of the locking arm.

The cartridge assembly may comprise a spring member arranged so as to bias the shutter member towards the first position, one end of the spring member being hooked to assist in holding the spring member in place.

As will be appreciated, the foregoing summary of the invention is neither exhaustive nor complete. Other embodiments including one or more of the features referred to above and/or one or more of the features discussed below are envisioned by the present disclosure.

BRIEF DESCRIPTION OF THE DRAWINGS

FIG. 46C is a detailed view of the portion of the housing member which includes the lock retaining feature.

FIG. 51A is a plan view from the outside of the shutter member.

FIG. 51B is a plan view from the inside of the shutter member.

FIG. 51C is an elevation view from the side of the shutter member.

FIG. 51D is a detailed perspective view of the upper tab of the shutter member.

FIG. 51E is an elevation view from below the shutter member.

FIG. 51F is a detailed view of the locking feature of the shutter member.

FIG. 51G is a detailed view of the anti-rotation feature of the shutter member.

DETAILED DESCRIPTION OF THE INVENTION

Figure 1:
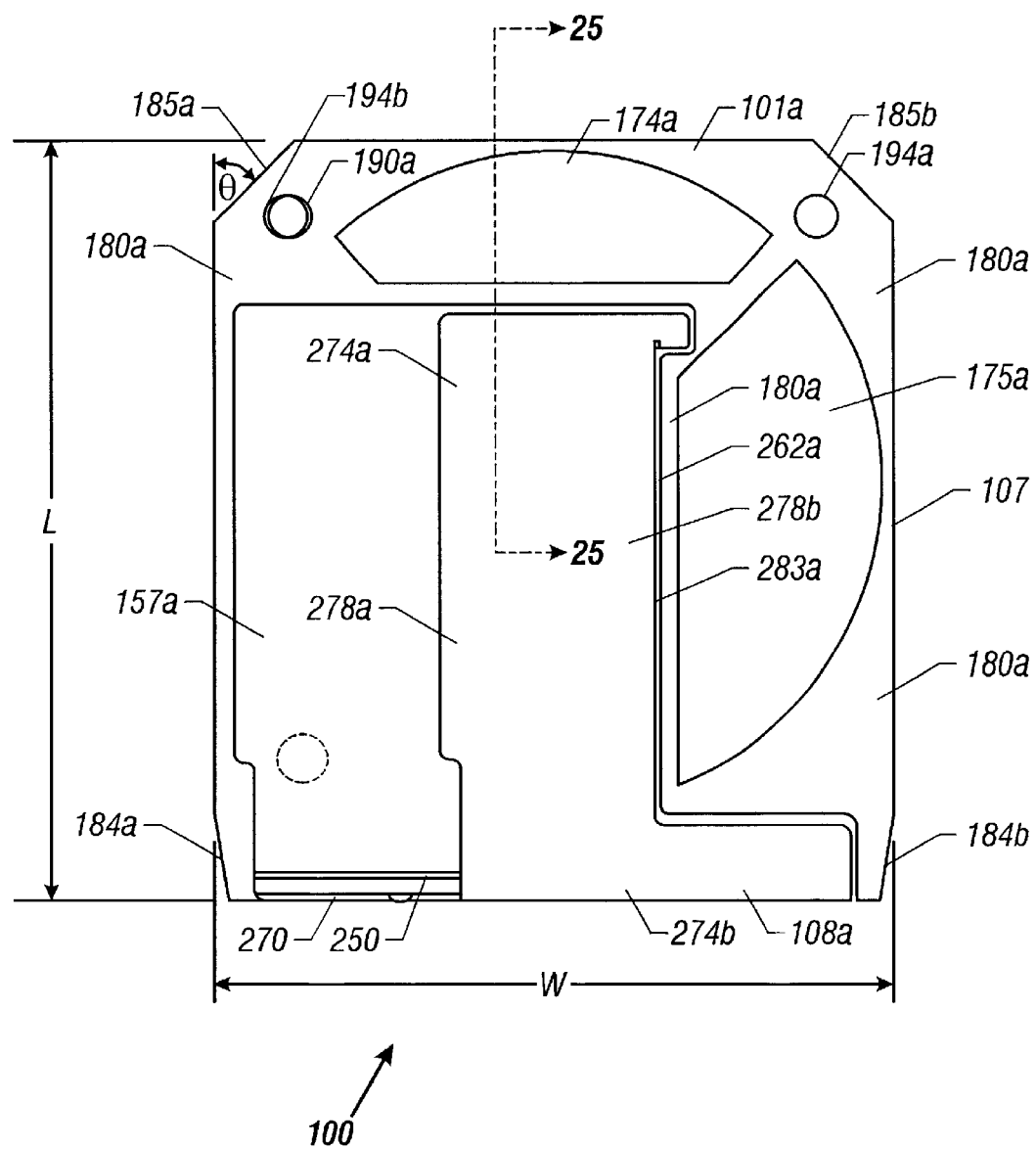
FIG. 1 is a top plan view of a cartridge assembly according to a first embodiment of the present invention.

Referring to FIGS. 1–6 and 22–23, a removable, recordable or prerecorded optical, magnetic, or magneto-optical storage cartridge assembly 100 according to a first embodiment of the invention is depicted. The cartridge assembly includes first and second housing members 104a and 104b (FIGS. 2 and 6) (which are identical to one another), first and second shutter members 108a and 108b (FIGS. 2 and 6) (which are also identical to one another), locking arms 113a,b (which are also identical to one another) and an information-containing medium 116 (which is preferably an optical, first-surface medium). The first and second housing members define a substantially rectangular sidewall 107 (FIG. 1) having substantially planar top and bottom surfaces to enclose and protect the medium 116 (which is typically double-sided).

Referring to FIG. 1, the form factor of the cartridge assembly can be relatively small. In one configuration, the width "W" of the cartridge assembly is less than about 40 mm, and typically ranges from about 30 to about 37 mm, the length "L" is less than about 42 mm and typically ranges from about 30 to about 40 mm, and the height "H" (FIG. 3) is less than about 5 mm and typically ranges from about 1 to about 3 mm. In another configuration, the cartridge assembly has a mass less than about 7 gm, preferably less than about 5 gm.

In one configuration (FIGS. 2 and 4), the medium 116 is a double-sided rigid or semi-rigid film-type disk and is joined to a rigid or semi-rigid hub assembly 106 having first and second hub members 124a,b. The medium 116 and hub assembly 106 are described in co-pending application Ser. No. 09/560,781 entitled "Miniature Optical Disk Data Storage System," which is hereby incorporated by reference.

The first and second housing members 104a,b form the primary enclosure for the medium 116. The housing members 104a,b each contain interlocking features 105a–f (e.g., pin-and-hole (shown in FIGS. 2 and 6) and tab-and-slot arrangements and the like) that make them self-locating with respect to one another during manufacture. Each of the housing members 104a,b includes a circular opening 120a,b for receiving the first or second hub member 124a,b attached to opposing sides of the medium 116 (for a double-sided disk) and a window 128a,b (FIGS. 2 and 6) to permit the optical head (not shown) to access the medium 116 during read and/or write operations. Although the window 128 is normally an empty space, the window can be covered by a (non-movable) transparent material (at least at the wavelength of the read/write beam) for additional protection of the medium. Examples of cover materials include glass and polycarbonate.

The first and second housing members 104a,b are preferably made by injection molding of a thermoplastic material, though other processes (such as stamping, machining, and the like) and other materials (such as aluminum, steel, or other metals, resins, fiberglass, ceramics and the like) can also be used. The polycarbonate can include a filler that is a lubricant such as "TEFLON" glass, or graphite to provide lubricity for moving parts and/or a filler than is an anti-static (or conductive) material such as metal powders. In one configuration, one or both housing members 104a,b are composed of a translucent (unclear or colored) or transparent (clear) material, such as a polycarbonate, to facilitate ultraviolet curing of an adhesive used to join the members. As will be appreciated, the adhesive is cured by illuminating the adhesive with ultraviolet light.

Figure 25:
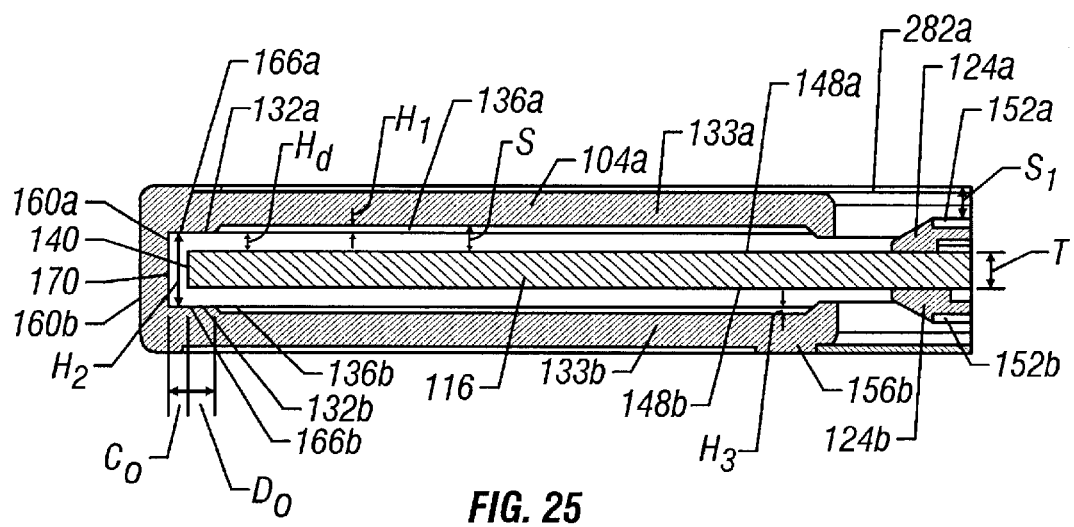
FIG. 25 is a cross-sectional view along line 25—25 of FIG. 1.

Each of the first and second housing members 104a,b has an offset, annular, disk-shaped, interior surface 132a,b (FIGS. 2 and 6) to hold the medium 116 therebetween. Referring to FIG. 25, the surface 132a,b is bounded by a radial or annular step 136a,b located interiorly of the peripheral edge 140 of the medium 116 (i.e., the radial distance from the step 136 to the hub center 144 (FIGS. 2 and 6) is less than the radial distance from the peripheral edge 140 of the medium to the hub center 144). Radially disposed walls 160a,b are combined when the housing members 104a,b are joined together. The wall 160 and opposing walls 166a,b define an annular slot for receiving and constraining movement of medium portions adjacent to the peripheral edge 140 of the medium 116.

With this configuration, each of the operational surfaces 148a,b of the medium 116 is spaced a distance "S" (FIG. 25) from each of the interior surfaces 133a,b of the housing members 104a,b. This prevents the interior surfaces 133a,b from contacting the adjacent operational surfaces 148a,b. Such contact could occur in response to compression of the cartridge assembly walls 156a,b by a user, movement of the medium 116 in the cartridge assembly during handling by the user (medium 116 is loosely mounted within the cartridge assembly to permit alignment of the medium 116 independent of the position of the housing members 104a,b), insertion or ejection of the cartridge into or from the disk drive, and/or rotation of the medium 116 when the medium 116 is warped. In one configuration, the distance "S" ranges from about 0.3 to about 0.5 mm. In another configuration, the height "$H_1$" of the step 136a,b typically ranges from about 0.1 to about 0.2 mm, or from about 16% to about 33% of the thickness "T" of the medium 116, and the distance "$H_2$" between opposing interior walls 166a,b of the annular slot ranges from about 0.5 to about 0.7 mm or from about 85% to about 115% of the thickness "T".

The formed radially disposed wall 160 is located exteriorly of the peripheral edge 140 of the medium 116 (i.e., the radial distance from the wall 160 to the hub center 144 is more than the radial distance from the peripheral edge 140 of the medium 116 to the hub center 144) to enclose the medium 116 within the cartridge. The clearance "$C_o$" between the peripheral edge 140 of the medium 116 and the wall 160 should be as small as possible for the medium 116 to be centered in the disk drive and typically ranges from about 0.2 to about 0.4 mm. The overlap distance "$D_o$" from the step 136 to the medium peripheral edge 140 typically is less than the clearance $C_o$.

To provide further constrainment of vertical movement of the medium 116 in the cartridge assembly and protection of the information-containing surface(s) of the medium from harmful contact with a housing member 104 surface, each of the housing members 104a,b includes a rim or radial step 152a,b (FIGS. 2 and 6) adjacent to and bounding the circular openings 120a,b. The height "$H_3$" (FIG. 25) of the radial step 152 above the surface 133 typically ranges from about 0.1 to about 0.3 mm. A radial distance "$D_r$" (FIGS. 2 and 6) is defined between the radial steps 152 and 136 (relative to hub center 144).

Figure 2:
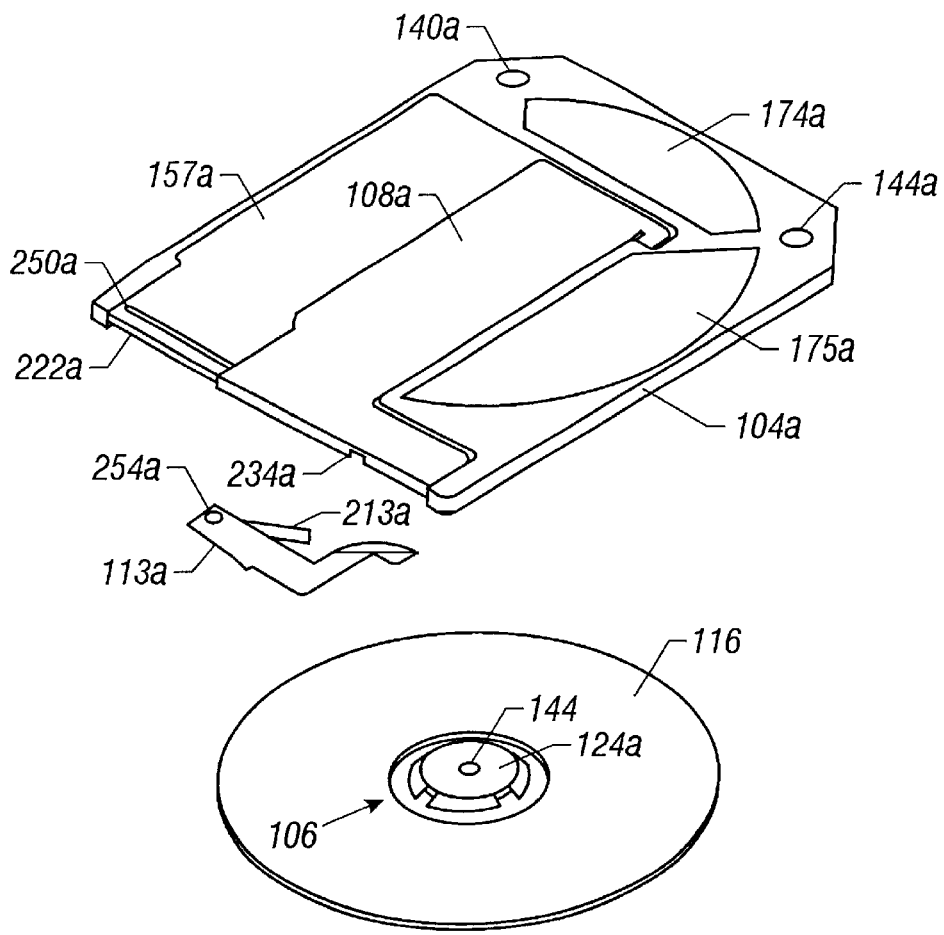
FIG. 2 is a disassembled view of the cartridge assembly of FIG. 1.
Figure 2:
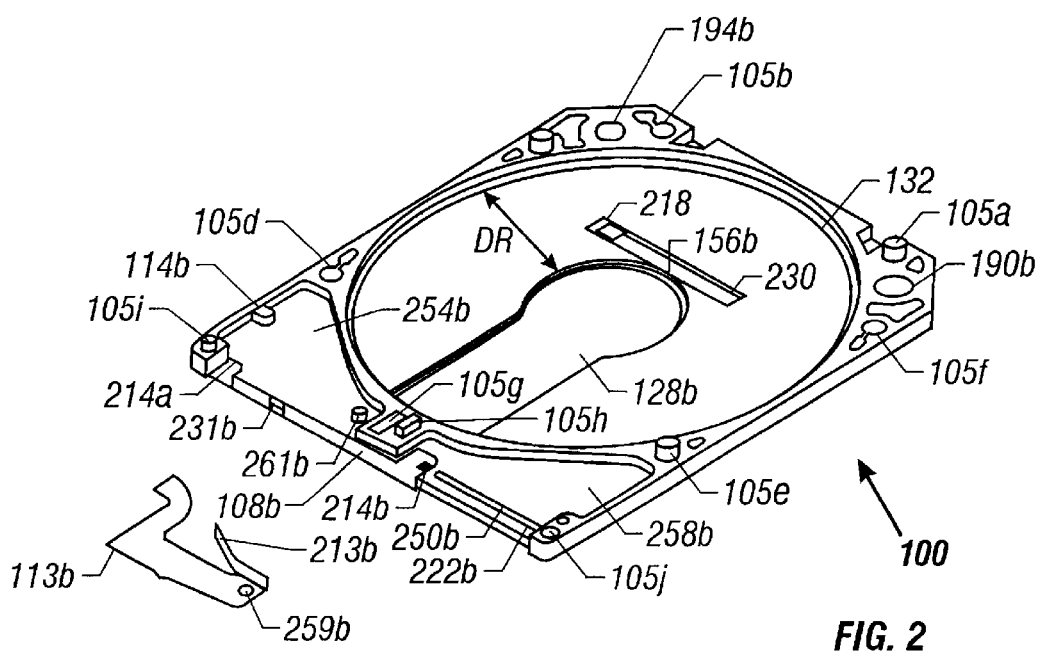
Figure 6:
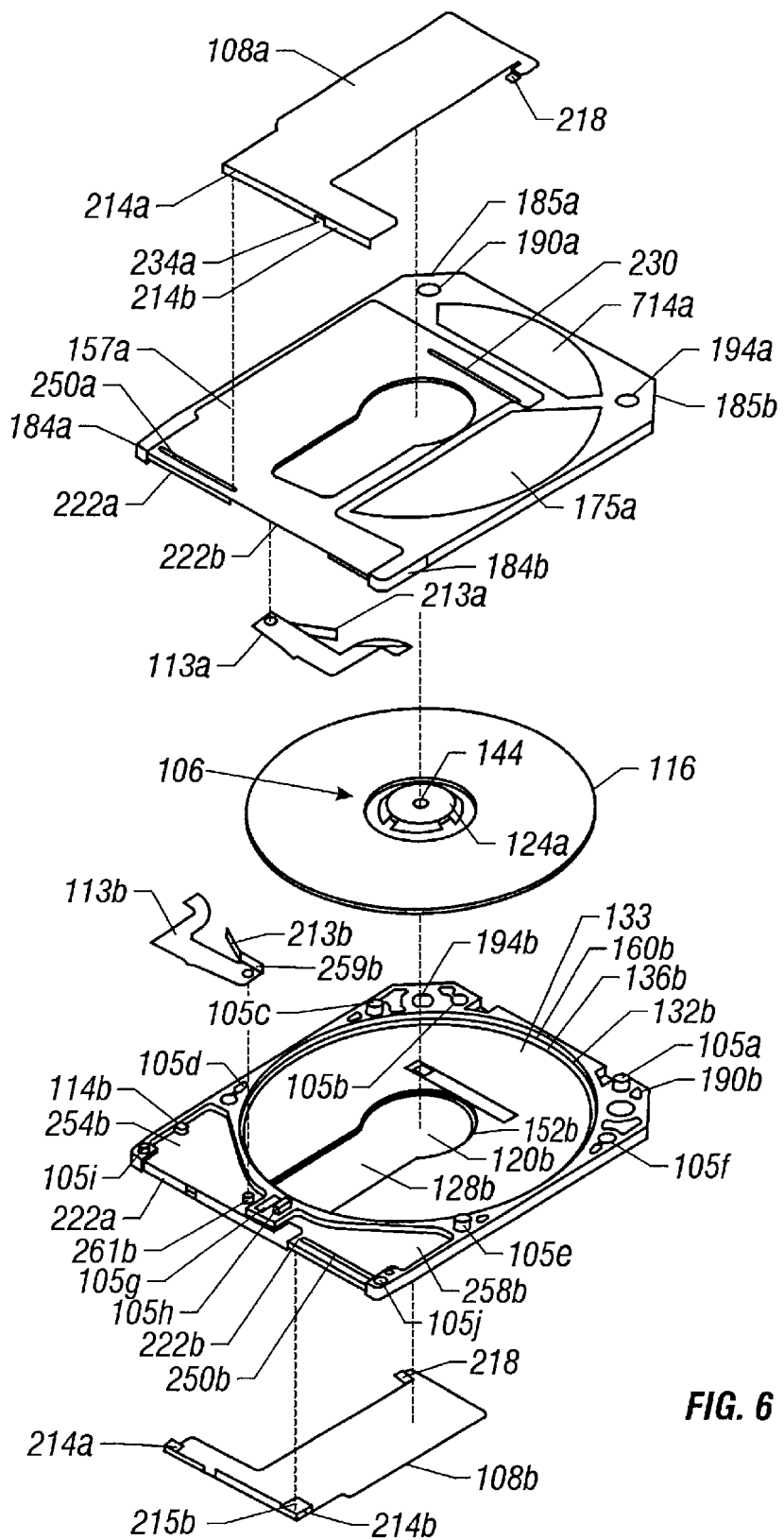
FIG. 6 is another disassembled view of cartridge assembly of FIG. 1.

Referring to FIGS. 1–2 and 6, the first and second housing members 104a,b have indented surfaces 174a,b and 175a,b for labels. The depth of the indented surfaces relative to the surrounding raised outer wall portion 180a,b of the members 104a,b is typically from about 0.1 to about 0.3 mm.

Figure 3:
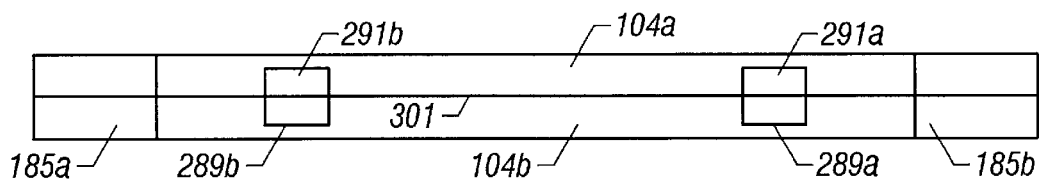
FIG. 3 is a rear end view of the assembled cartridge assembly of FIG. 1.
Figure 5:
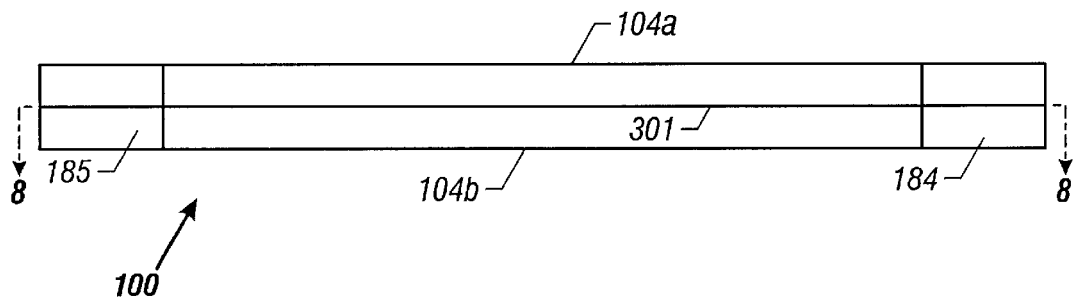
FIG. 5 is side view of the assembled cartridge assembly of FIG. 1.

The first and second housing members 104a,b are configured to end or side load (straight insertion) into a disk drive 177 (FIGS. 12–21). Compared to top loading, end or side loading provides a self-contained volume in which all drive functions are contained. To facilitate end or side loading, each housing member 104a,b has left and right lead-in radii 184a,b and lead-out chamfers 185a,b for cartridge ejection (FIGS. 3, 5, and 6). In one configuration, the chamfer angle θ (FIG. 1) common to the lead-out chamfers 184a–d ranges from about 25 degrees to about 75 degrees.

Figure 4:
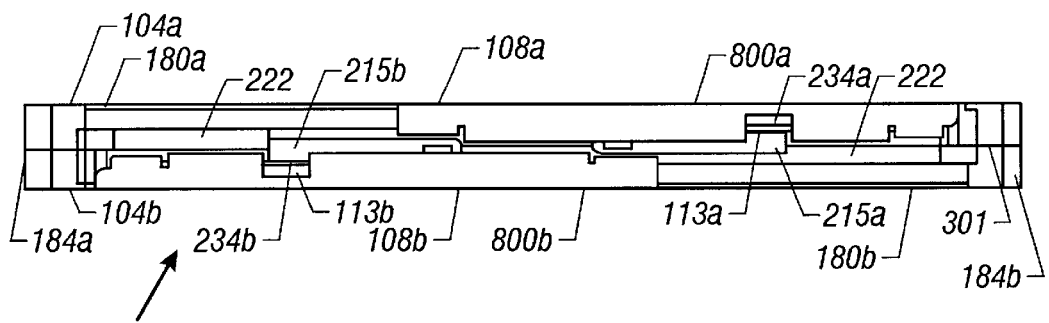
FIG. 4 is a front end view of the assembled cartridge assembly of FIG. 1 with both shutter members in the closed and locked position.

Referring to FIGS. 1–23, the windows 128a,b in the first and second housing members 104a,b are covered by a respective "L"-shaped shutter member 108a,b when the cartridge assembly 100 is not inserted in the disk drive 177 (FIGS. 26–29) and uncovered by (lateral or alternatively rotational) movement of the respective shutter member when the cartridge assembly 100 is inserted in the disk drive 177 to permit the optical head 206 (FIG. 26) to access the medium 116 via the pertinent window 128a,b. As discussed in detail below, during insertion of the cartridge assembly into the drive, the shutter member 108a,b for the pertinent window to be accessed by the optical head 206 is moved laterally as shown in FIGS. 11–16B by a rotary arm 700 and locking plate 704 in the disk drive. The other shutter member 108a,b remains stationary during the insertion process. This is shown in FIG. 4 which illustrates that the two shutter members 108a,b are vertically spaced apart from one another to permit independent movement.

The L-shape of the shutter member provides several benefits during the opening and closing of the shutter member. The elongated base portion of the "L" (which is located at the front of the cartridge assembly 100) provides stability and guidance during shutter member movement and thereby inhibits cocking and/or jamming of the shutter member. The narrow top portion of the "L" (which is located in the central and rear portions of the cartridge assembly 100) allows for more label area than a rectangular shutter member. The L-shaped shutter member does not contact the label area as in the case of a rectangular shutter member.

Figure 7:
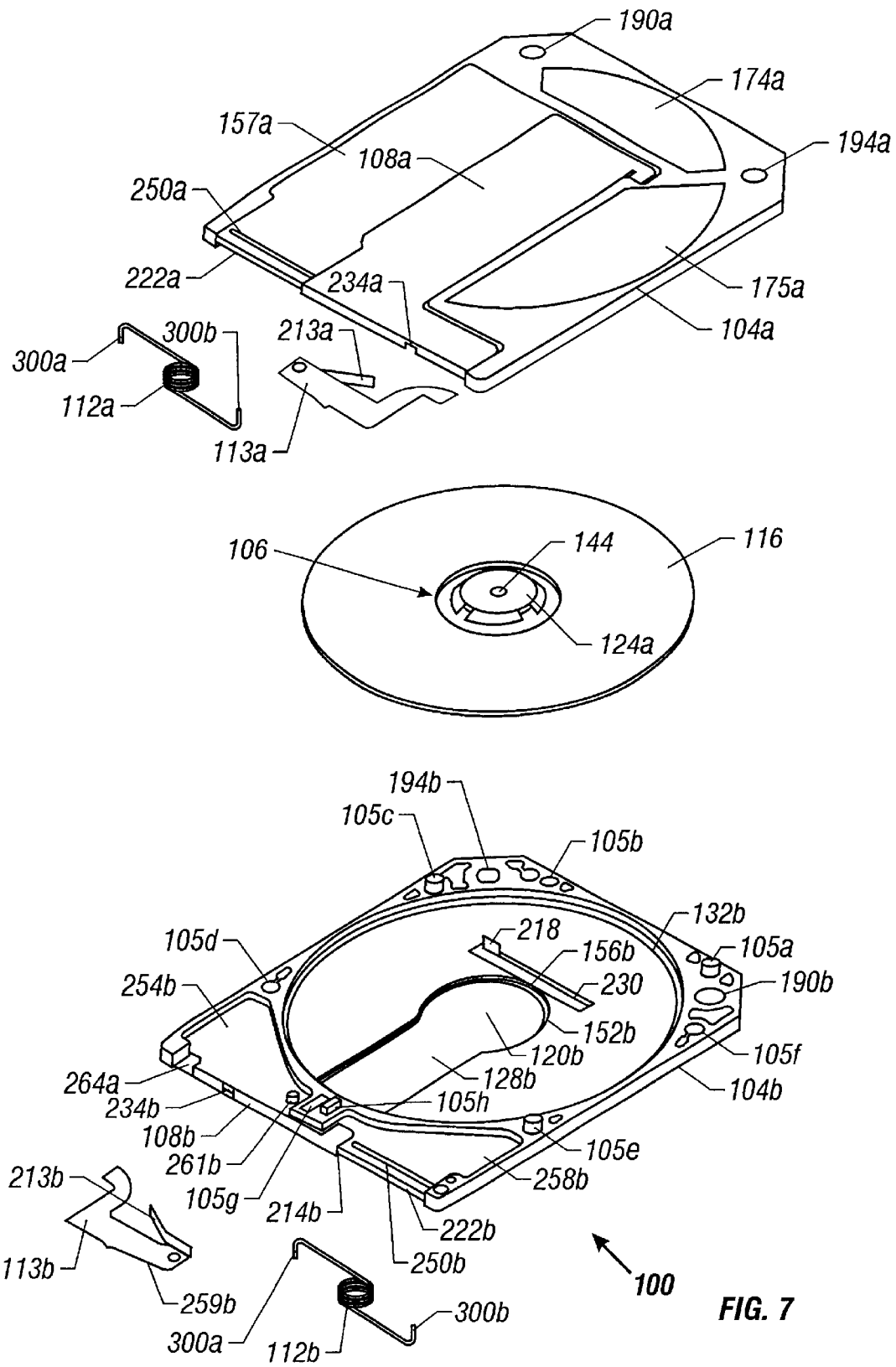
FIG. 7 is another disassembled view of cartridge assembly of FIG. 1.

Each shutter member 108 includes inwardly facing tabs 214a,b and a tab 218. Tabs 214a,b ride in slots 222a,b, respectively, and tab 218 engages a corresponding slot 230 in the respective cartridge housing member 104a,b. During manufacture, tab 218 is inserted into slot 230 and is bent downwardly as shown in FIGS. 3 and 6–7 to avoid contact of the tab 218 with (and damage to) information-containing portions or the operational surface of the medium 116. The movement of the tabs in the slots permits lateral movement of the shutter members in response to the rotary arm in the disk drive assembly 177 rotatably engaging the slot 234a,b in the pertinent shutter member and applying a lateral force thereto to cause lateral (side-to-side) displacement of the shutter member. The design of a suitable insertion mechanism (e.g., rotary arm device) and ejection mechanism is described in Ser. No. 09/315,398 filed May 20, 1999 (which is incorporated herein by this reference).

To permit lateral displacement of each shutter member 108a,b without contact of the tab 218 with the medium 116, each housing member 104a,b includes an indented surface 157a,b (FIGS. 2 and 6) to provide travel area for the shutter member and an indented surface 156a,b to provide travel area for the outwardly facing tab 218. The indented surface 157a,b has a depth relative to the adjacent raised wall portions 180a,b typically ranging from about 0.05 to about 0.20 mm. The indented surface 156a,b has a depth relative to the adjacent surface 133a,b typically ranging from about 0.02 to about 0.10 mm.

To fixedly hold the shutter member when in the closed position and to return the shutter member to the closed position after removal of the cartridge assembly from the disk drive (i.e., disengagement of the rotary arm 269 from the slot 234), a locking subassembly is provided. The locking subassembly includes a locking arm 113a,b.

Figure 8:
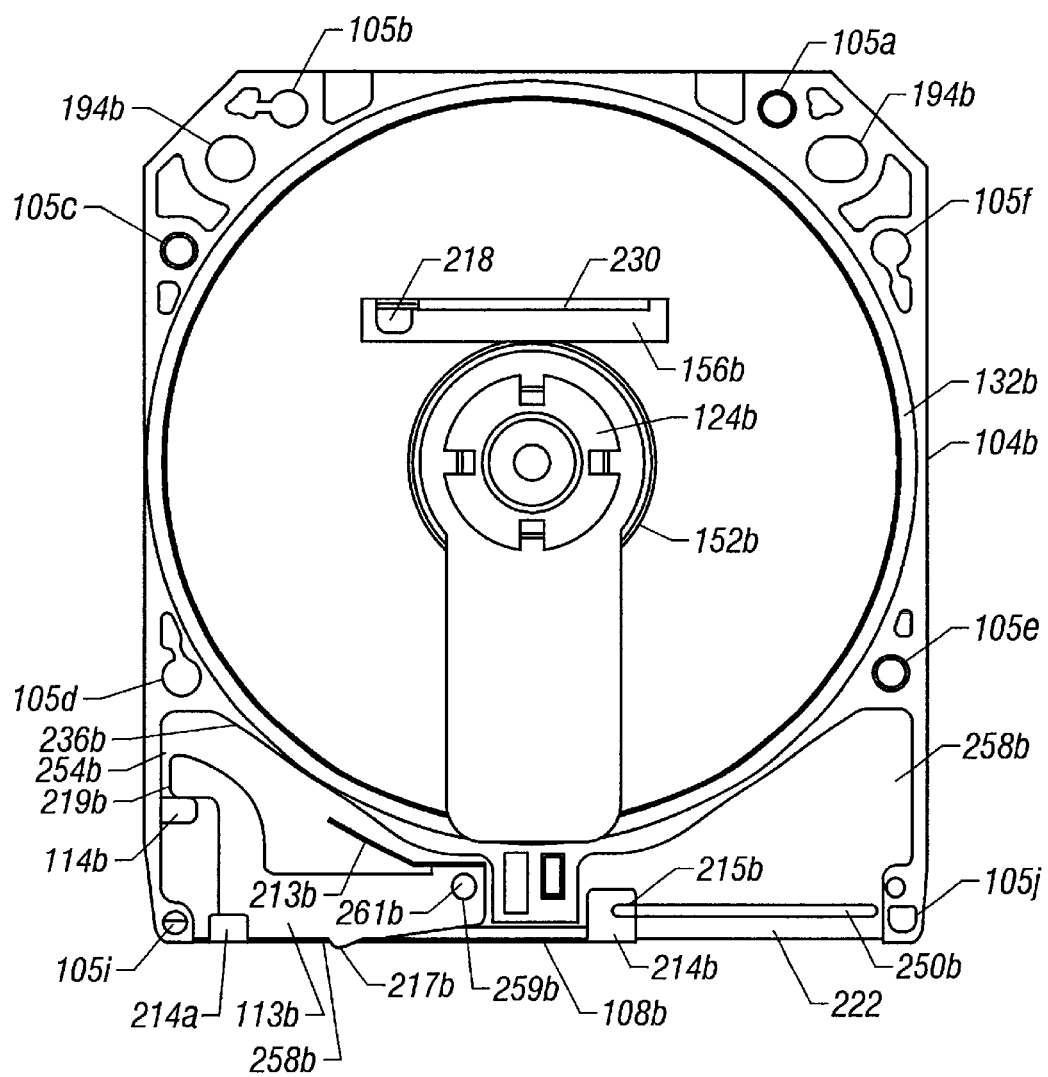
FIG. 8 is a sectional view taken along line 8—8 of FIG. 5 when the shutter member is in the closed position (the disk being removed for purposes of illustration)

Referring to FIGS. 6 and 8, the locking arm 113 includes a spring member 213 to resist displacement of the locking arm 113, a locking nub 217 that engages the slot 234 in the shutter member 108, and a stop arm 219 that restricts outward (counterclockwise rotational) and inward (clockwise rotational) movement of the locking arm 113. The locking arm 113 is rotatably disposed in between the corresponding opposing surfaces 254a,b and 258a,b by means of a hole 259a,b in the locking arm 113 which engages a corresponding pin 261a,b connected to the housing member 104a,b (FIGS. 2 and 6). When the locking nub 217a,b engages the slot 234a,b (FIG. 9), the spring member 213a,b exerts little or no outward force against the bearing surface 263a,b of the housing member 104a,b. The spring member 213a,b, however, applies a resistive force against removal of the locking nub 217a,b from the slot 234a,b and lateral movement of the respective shutter member 108a,b, with the magnitude of the resistive force being directly proportional to the degree of displacement (clockwise rotation) of the locking arm 113.

The wall 236 and the displacement controlling member 114a,b of the housing member 104a,b control rotational displacement of the locking arm 113a,b to prevent overcompression and damage of the spring member 213. This can occur, for example, when a user unlocks the shutter member by using an object to dislodge the locking nub inwardly. As will be appreciated, the degree of rotational movement of the locking arm in the clockwise direction is limited by the engagement of the rear of the stop arm 219 and the wall 236. The degree of rotational movement of the locking arm in the counterclockwise direction is limited by the engagement of the front of the stop arm 219 and the member 114.

FIG. 7 shows an alternative configuration of the cartridge assembly 100 that includes two spring members 112a,b to assist closure of the shutter members 108a,b (by resisting the opening of the respective shutter member engaging the spring member). Each spring member 112 has a plane of flexure substantially parallel to the inner walls or surfaces 254a,b and 258a,b of the housing members. The spring member 112a is provided between the opposing surfaces 254a and 258a of the housing members 104a,b. The spring member 112b is provided between the opposing surfaces 254b and 258b of the housing members 104a,b. Each spring member 112a,b is positioned in a spring guide slot 250a,b in an associated housing member 104a,b and is received in an indentation 215b in tab 214b to thereby bias the corresponding tab 214b of the shutter member 108a,b. The ends 300a,b of the spring members 112a,b are transverse to the plane of flexure of the spring member to permit the ends to ride in spring guide slots 250a,b and bias the end of each tab 214b of each shutter member 108a,b.

In one embodiment, the end of spring member 112a that is received in the spring guide slot 250a,b and the indentation 215b in tab 214b is formed in to a hook 111, as shown in FIGS. 54A–54D. Hook 111 helps to keep the spring member 112a in place in tab 214b when the shutter member 108a,b is fully open. Without hook 111, the torsion on spring member 112a,b when it is compressed (i.e., when shutter member 108a,b is open) tend to cause spring 111 to slip out of tab 214b.

As shown in FIGS. 11–16B, a drawer assembly receives the cartridge and cooperates with the cartridge assembly to open the shutter member. The drawer assembly includes a rotary arm 700 movably (rotatably) engaging a locking plate 704 via a pin 708; a sleeve 117 for receiving the cartridge assembly, and a partial cover 716. The sleeve 117 includes leaf springs 702a,b to facilitate insertion of the cartridge assembly in the sleeve 117 and centering of the disk on the disk drive and disks 712a–c which are received in guide tracks (not shown) in the disk drive for movement in direction 724 of the sleeve 117. The sleeve 117, pin 708, cover 716, and disks 712a–c are typically formed from metal such as stainless steel. The locking plate 704 is also typically formed from metal, with brass being preferred. The rotary arm 700 can be formed from metal or plastic.

Figure 9:
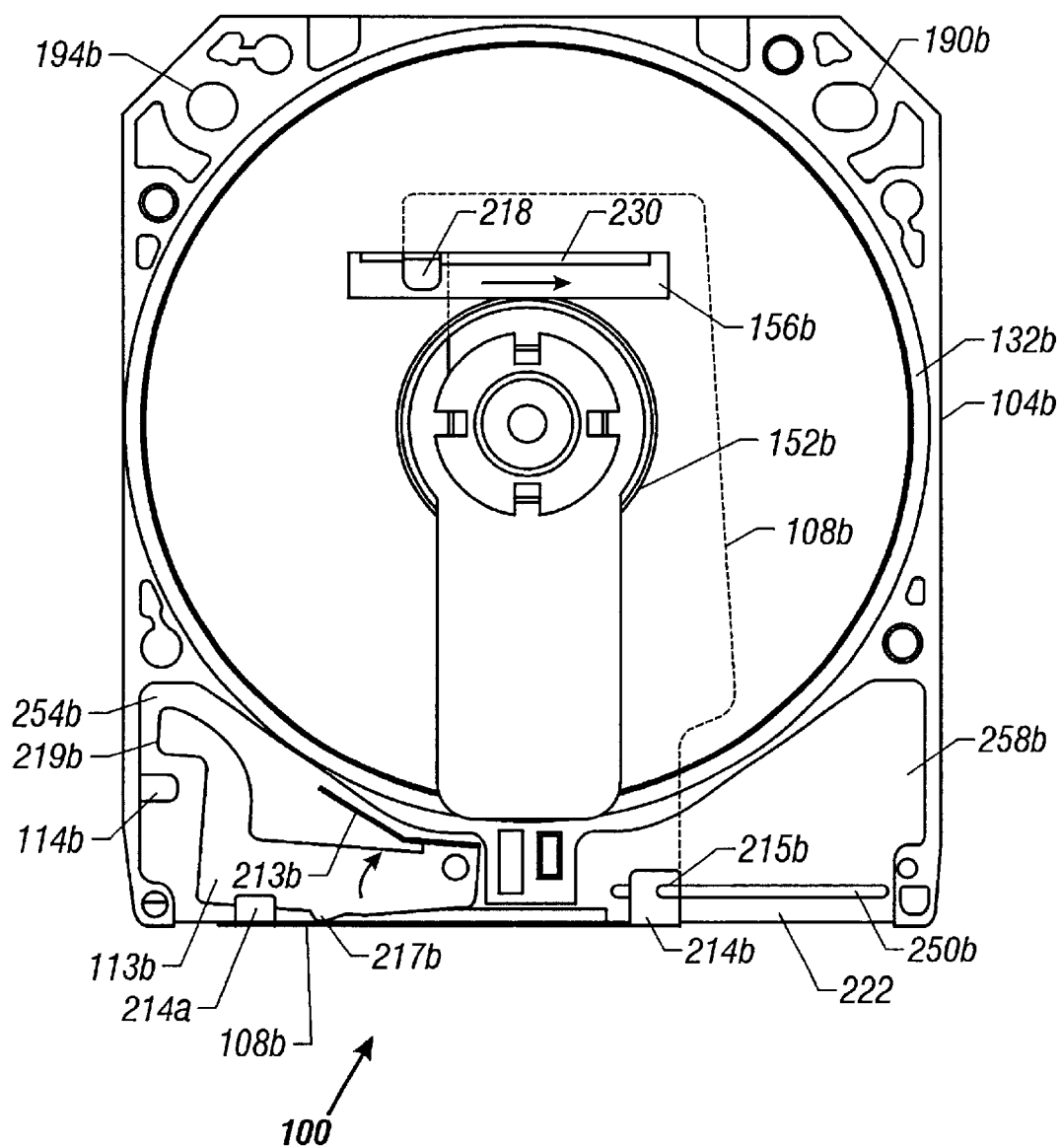
FIG. 9 is a sectional view taken along line 8—8 of FIG. 5 when the shutter member is in the partially open (unlocked) position (the disk being removed for purposes of illustration)
Figure 10:
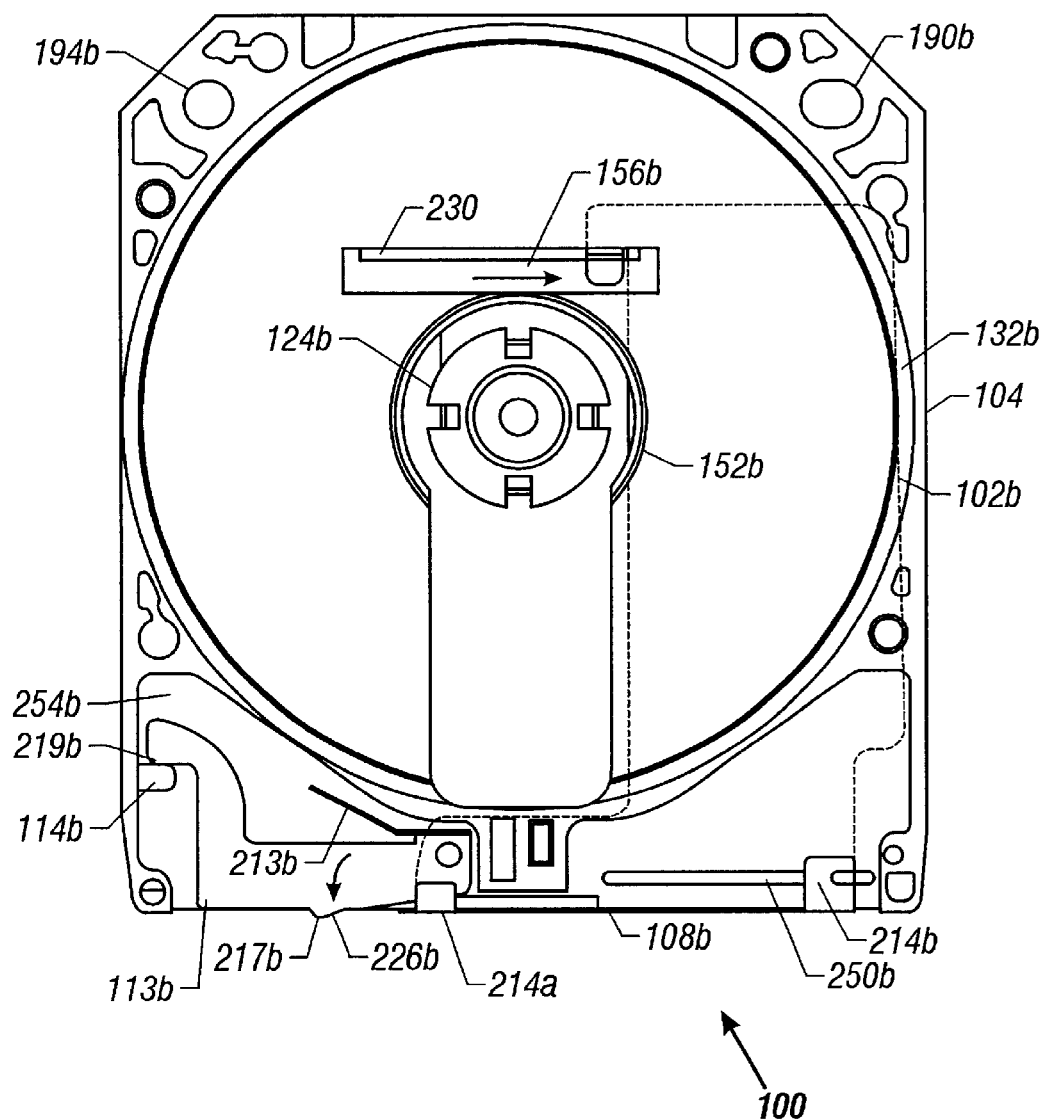
FIG. 10 is a sectional view taken along line 8—8 of FIG. 5 when the shutter member is in the fully open (unlocked) position (the disk being removed for purposes of illustration)
Figure 11:
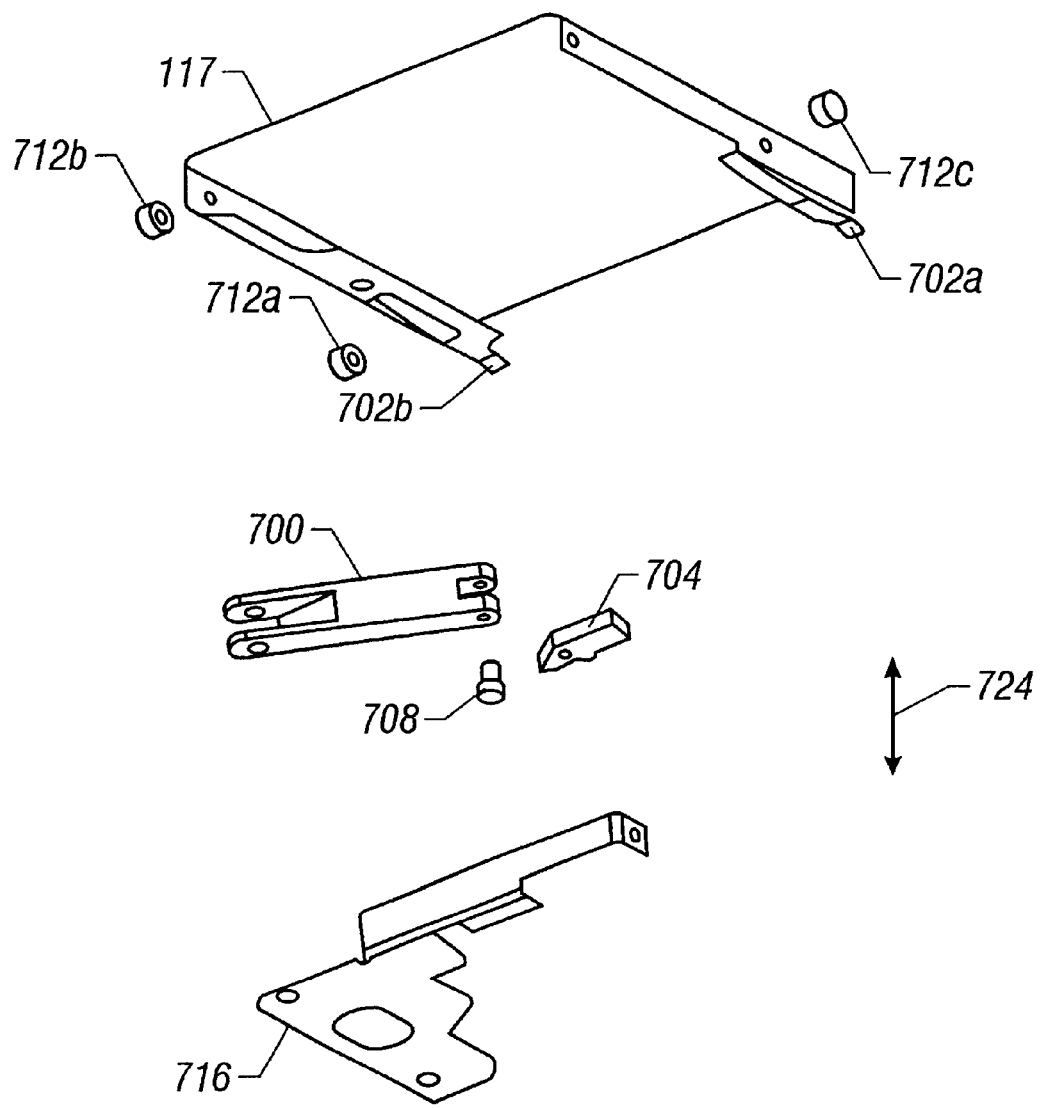
FIG. 11 is a disassembled view of a drawer assembly for receiving the cartridge assembly (with the top of the page facing away from the disk drive spindle)
Figure 12:
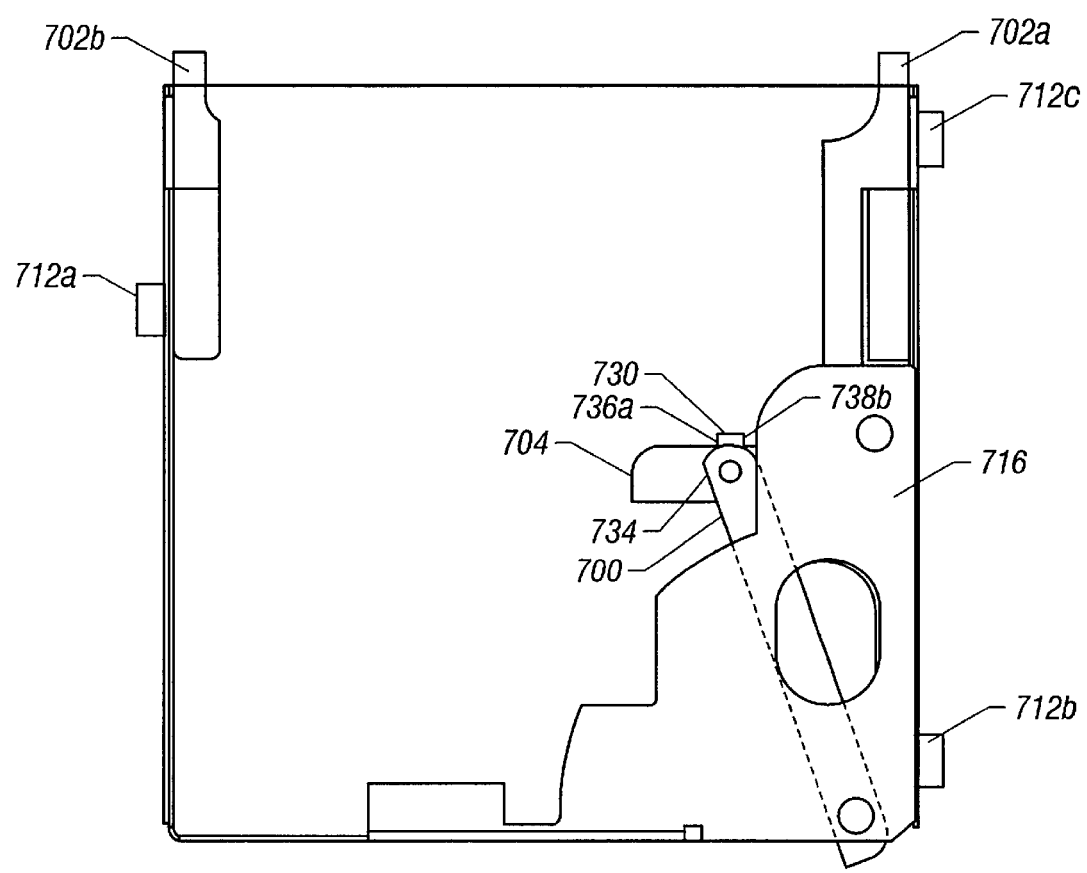
FIG. 12 is a plan view of the drawer assembly of FIG. 11.
Figure 13:
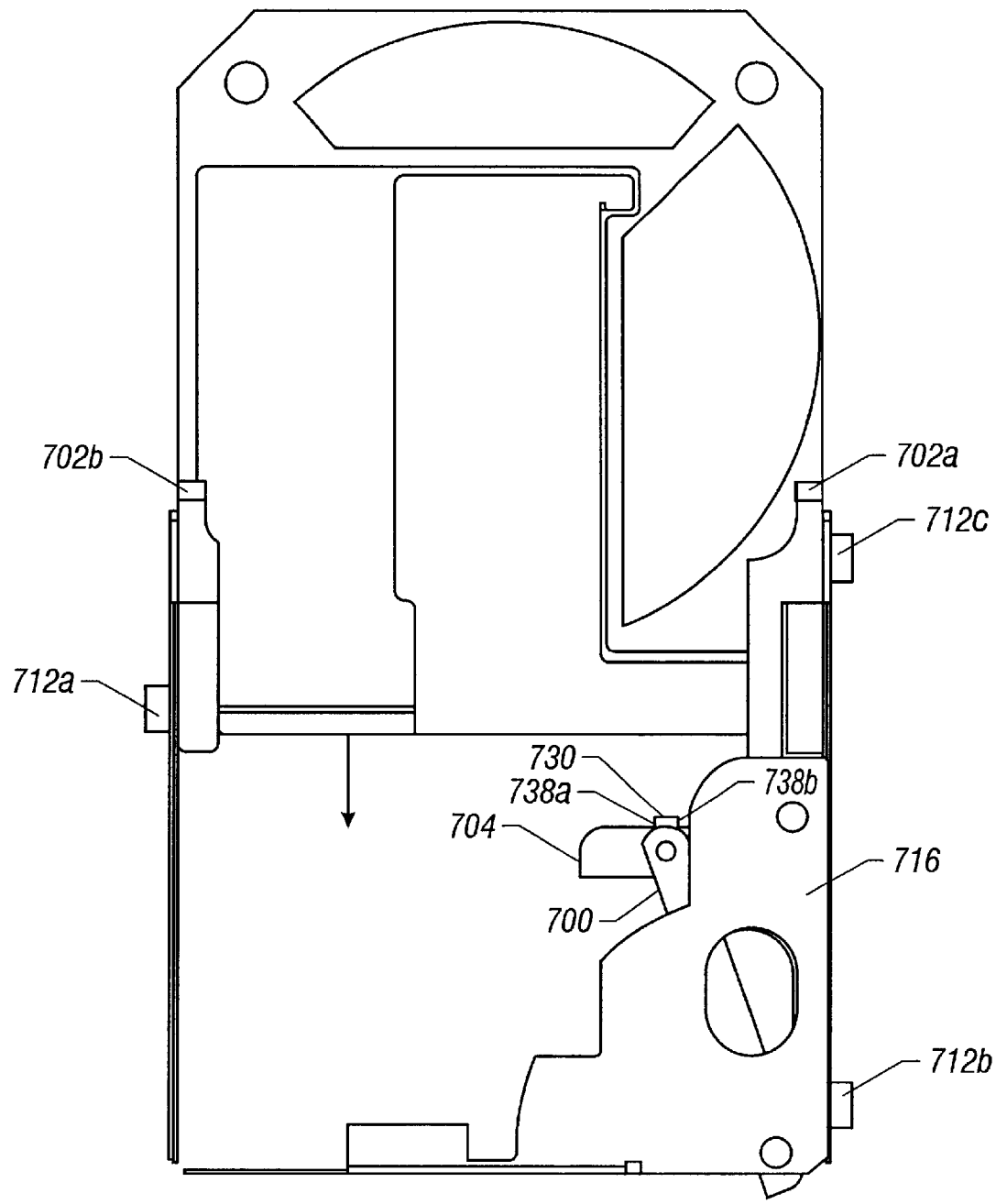
FIG. 13 is a plan view of the cartridge assembly being inserted into the drawer assembly.
Figure 14:
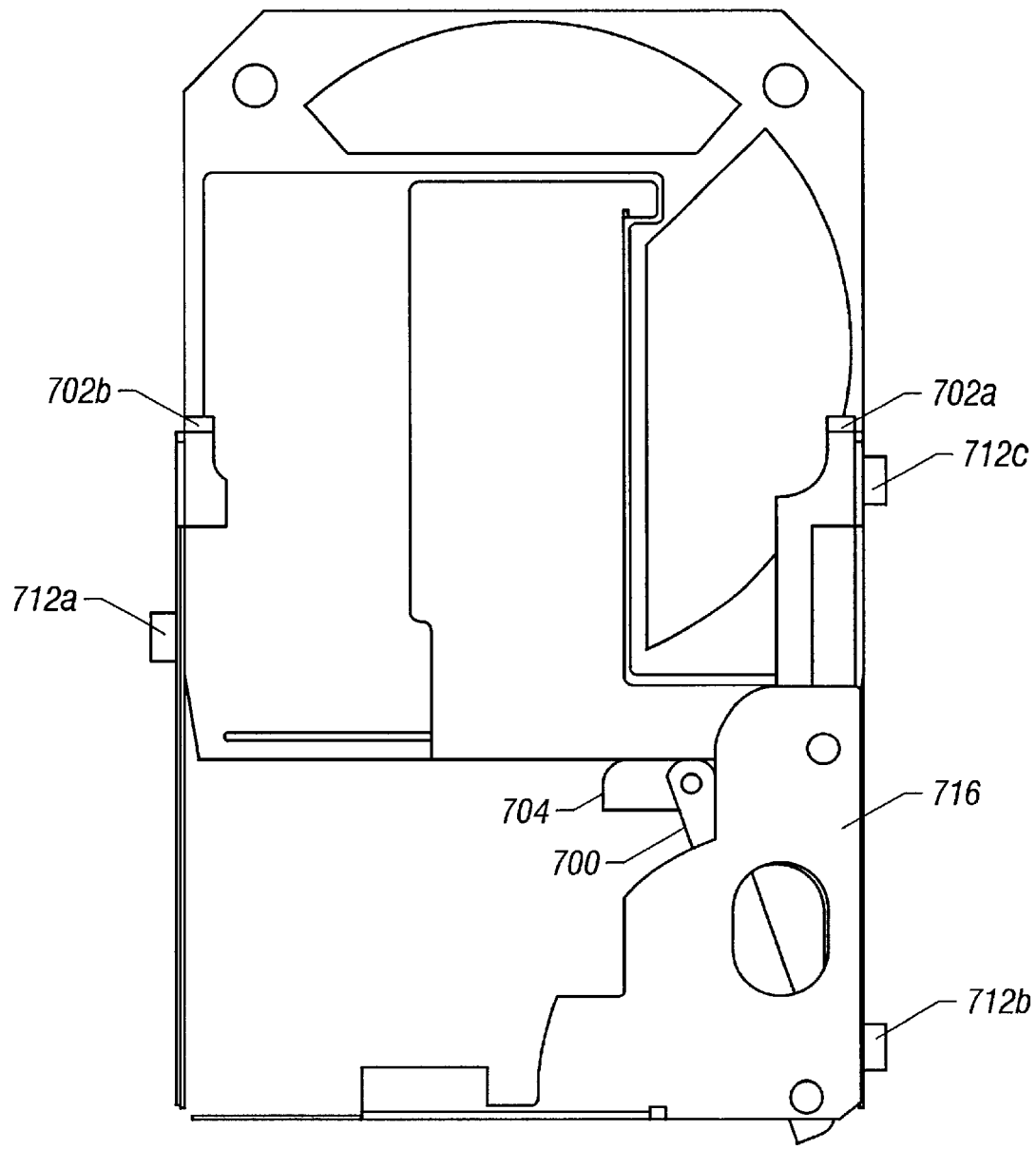
FIG. 14 is a another plan view of the cartridge assembly being inserted into the drawer assembly.
Figure 15:
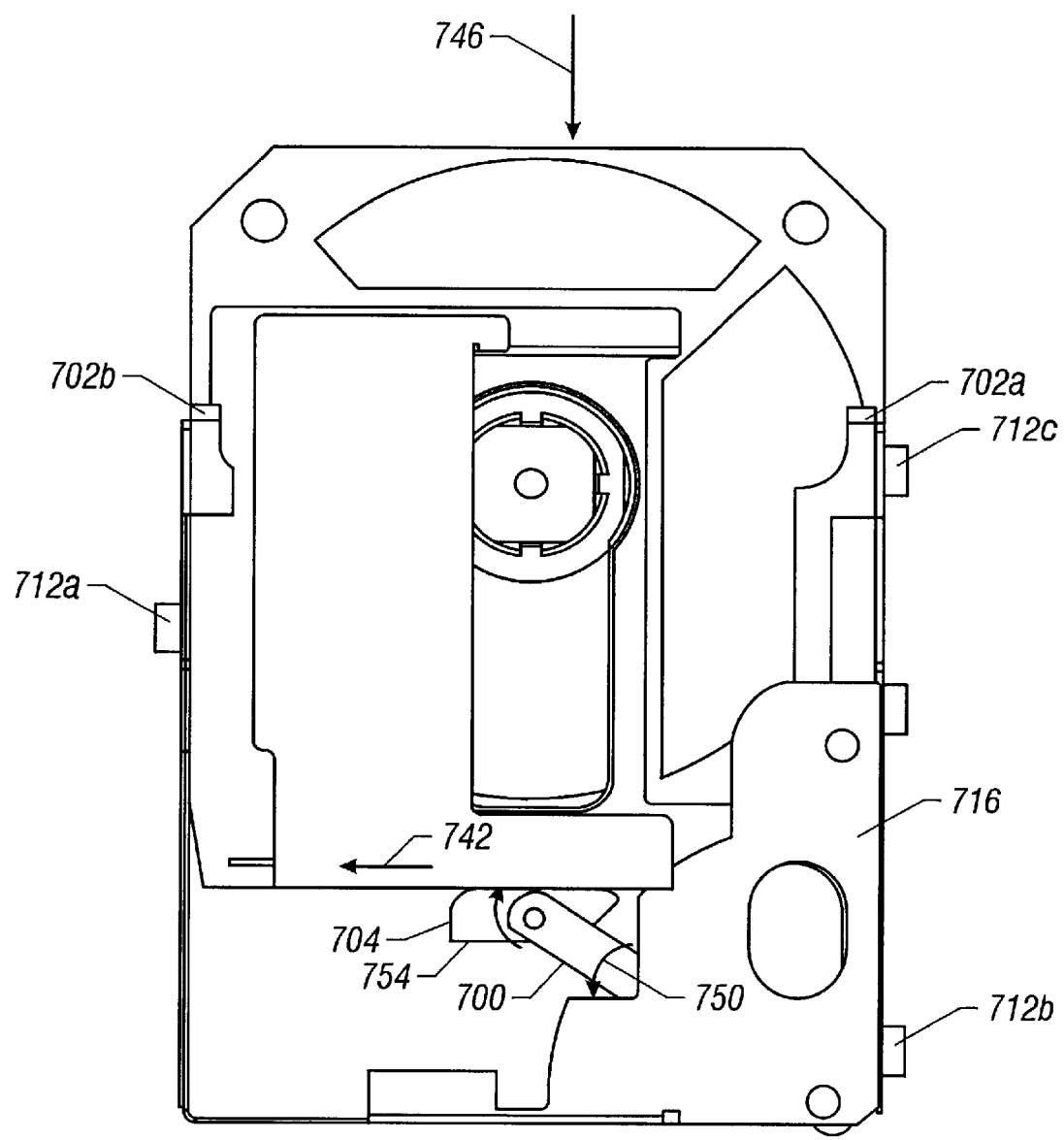
FIG. 15 is a another plan view of the cartridge assembly being inserted into the drawer assembly.
Figure 16A:
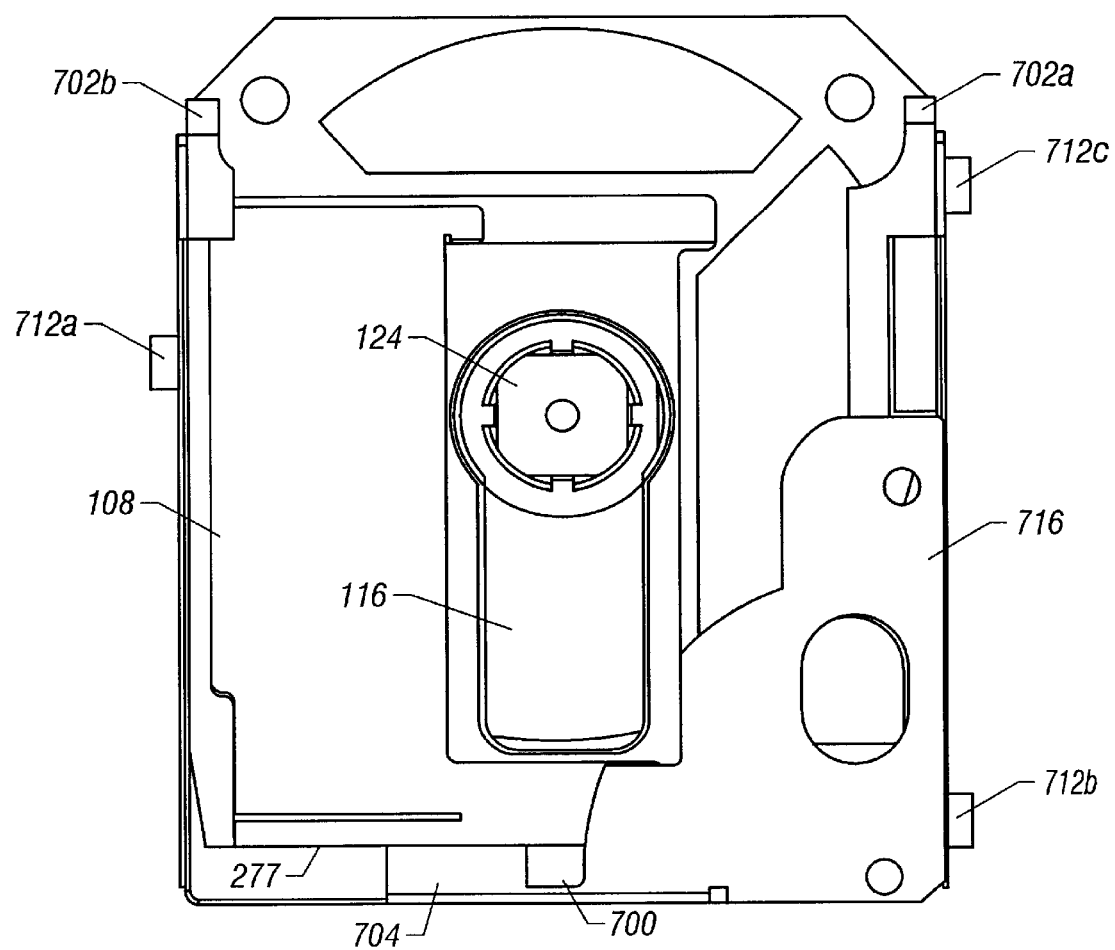
FIGS. 16A and B are more plan views of the cartridge assembly being inserted into the drawer assembly, with FIG. 16B having the cover removed to better illustrate the rotary arm and locking plate.
Figure 16B:
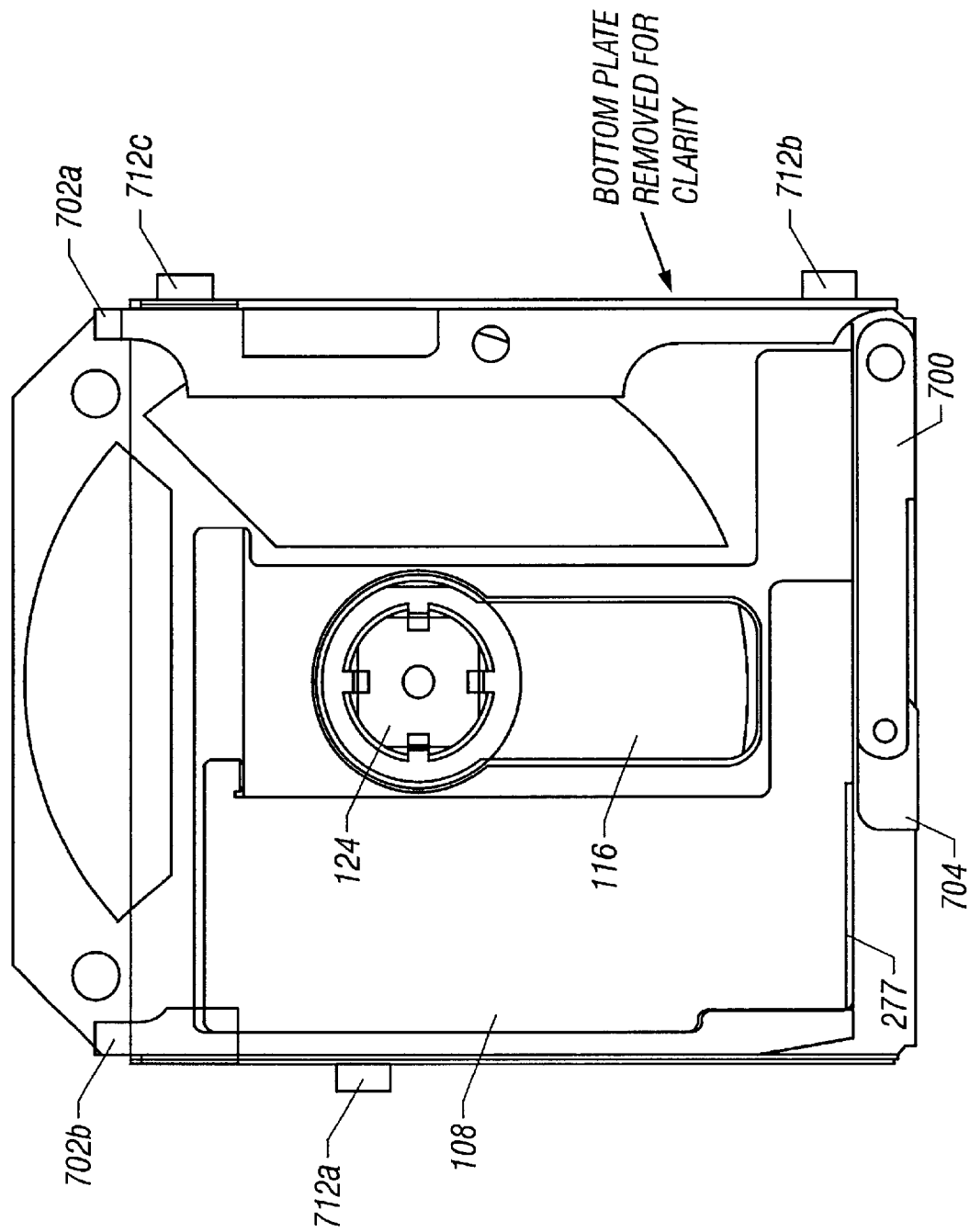
Figure 17:
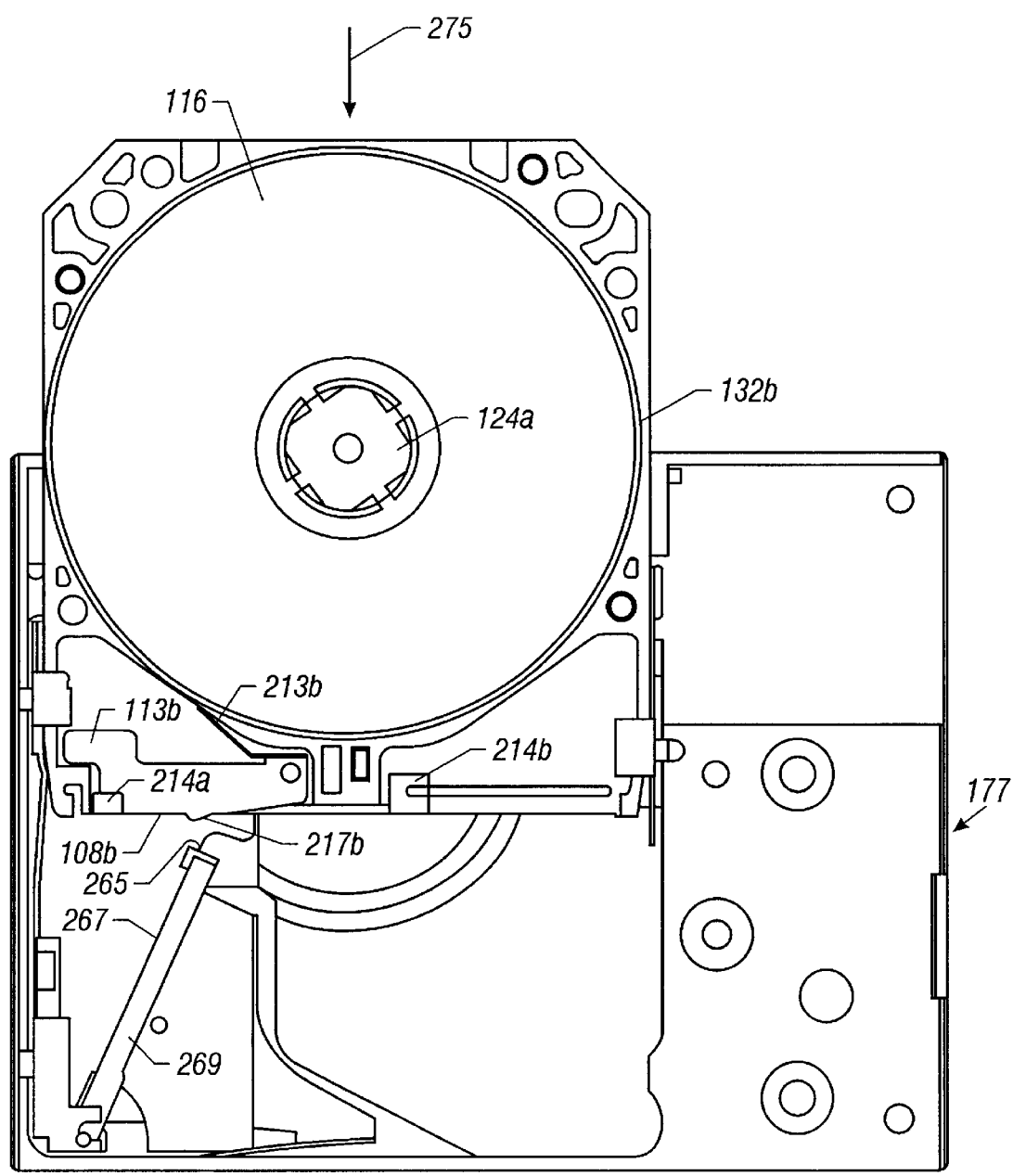
FIG. 17 is a top sectional view taken along line 8—8 of FIG. 5 when the cartridge assembly is being inserted properly into a disk drive according to another embodiment of the present invention.

Operation of the locking subassembly and the shutter member will be discussed with reference to FIGS. 8–16B. When the shutter member 108a,b is in the locked and closed position (FIG. 7), the locking nub 217a,b projects into the locking slot 234a,b and the spring member 213a,b is in an uncompressed (or slightly compressed) state. The cartridge assembly 100 is inserted into the disk drive 177 as shown in the sequence of FIGS. 12–16. As the cartridge assembly 100 moves into the disk drive 177, an unlocking nub 730 rotatably positioned on a distal end 734 of the rotary arm 700 engages the locking nub 217a,b (FIG. 14). As the user continues to push the cartridge assembly 100 into the disk drive 177, the unlocking nub 730 displaces the locking nub 217b inwardly (and rotates the locking arm 113a,b) until the locking nub 217b is disengaged from (and the unlocking nub 730 engages) the locking slot 234a,b and the shutter member 108a,b is in the unlocked and movable position (FIGS. 9 and 14). In response the spring member 213a,b exerts a resistive force (by being forced against bearing surface or wall 236a,b) against displacement of the locking arm 113a,b by the rotary arm 700. The stepped front surfaces 738a,b of the unlocking nub 730 hooks the locking slot 234a,b and displaces the shutter member 108a,b laterally in direction 742 as shown in FIG. 15. In response to the insertion force 746 against the cartridge assembly 100, the rotary arm 700 rotates in a counterclockwise direction 750 and the locking plate rotates in a clockwise direction 754 (relative to the rotary arm) and displaces the shutter member to the fully open and unlocked position (FIGS. 10, 16A and B, and 22–23). The rotary arm 700 causes the leading edge 263a,b of the shutter member 108a,b to engage the similarly shaped raised edge 264a,b of the housing member 104b (FIG. 16). In the open position, the rotary arm is substantially aligned with (or parallel to) the planar front face 277 of the cartridge assembly 100 and the front face of the shutter member 108a,b (FIG. 16). The locking arm 113a,b is returned to its original (starting) position by the bias of the spring member 213a,b (FIG. 10).

When the user ejects the cartridge assembly 100 from the disk drive 177 by a mechanical device (not shown), the cartridge assembly 100 is pushed out of the disk drive and/or drawer assembly, and the rotary arm 700 is laterally displaced in a clockwise direction (viewed from the top cover) until the shutter member 108 and locking arm 113a,b are returned to their original positions of FIG. 8. As will be appreciated, the inclined or cammed surface 281a,b (FIG. 10) of the locking arm 113a,b facilitates movement of the shutter member 108 over the locking nub 217a,b during this process. As the cartridge assembly 100 is removed from the disk drive 177 and the rotary arm 700 disengaged from the slot 234a,b, the locking plate forces the trailing edge 283a,b of the corresponding shutter member 108a,b to the closed position against the raised, inner step 262a,b of the housing member 104a,b (FIG. 1). As will be appreciated, the raised inner step 262 is shaped the same as the trailing edge 283a,b of the shutter member 108a,b. The spring member 213a,b then forces the locking nub 217a,b to engage the locking slot 234a,b and return the shutter member 108a,b to the locked and closed position. As will be appreciated, the stepped edge 280a,b of the locking arm 113a,b engages the edge of the slot 234a,b to prevent the shutter member 108a,b from being displaced during storage and/or handling.

Figure 18:
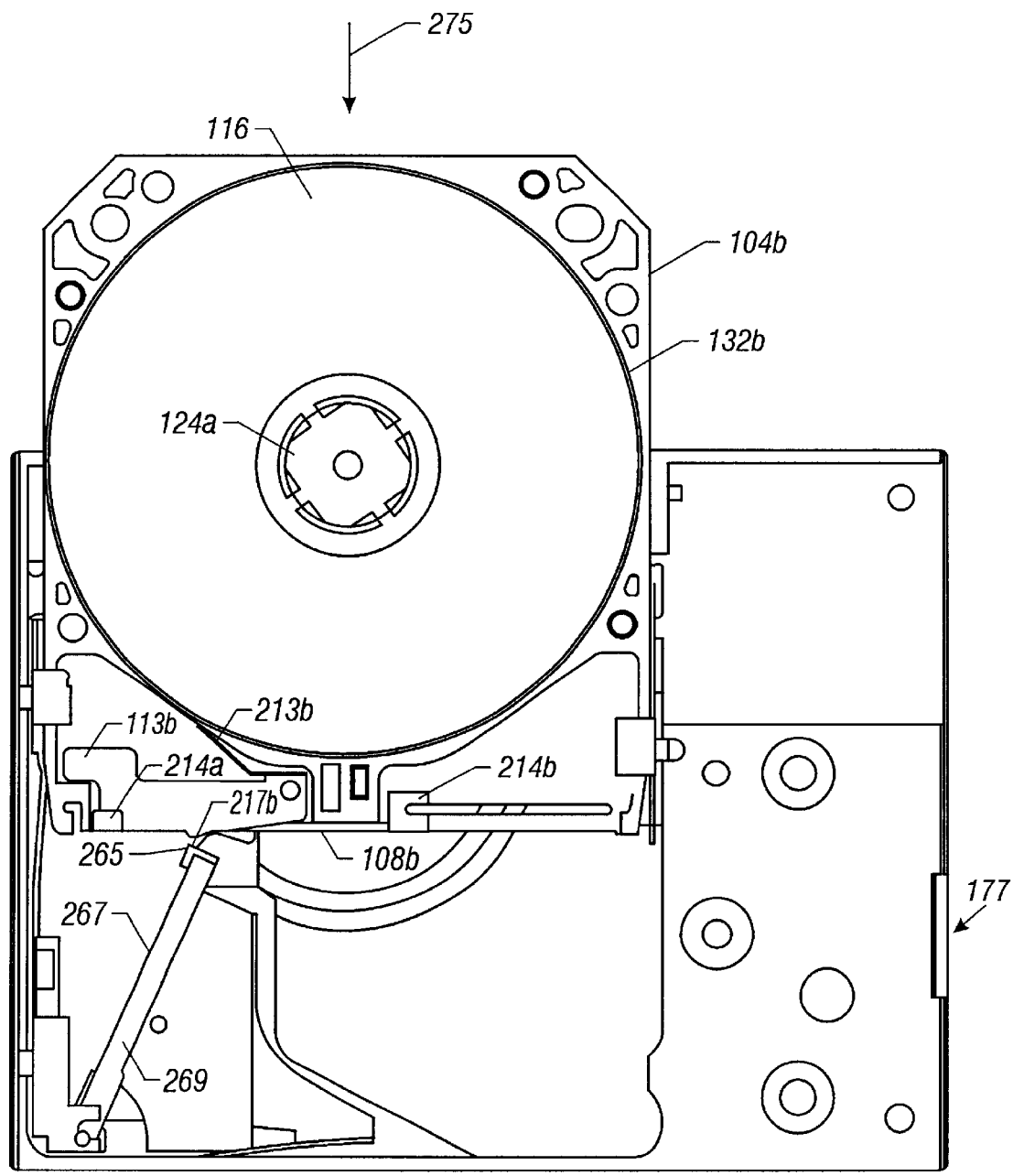
FIG. 18 is another top sectional view taken along line 8—8 of FIG. 5 when the cartridge assembly is being inserted properly into the disk drive of FIG. 17.
Figure 19:
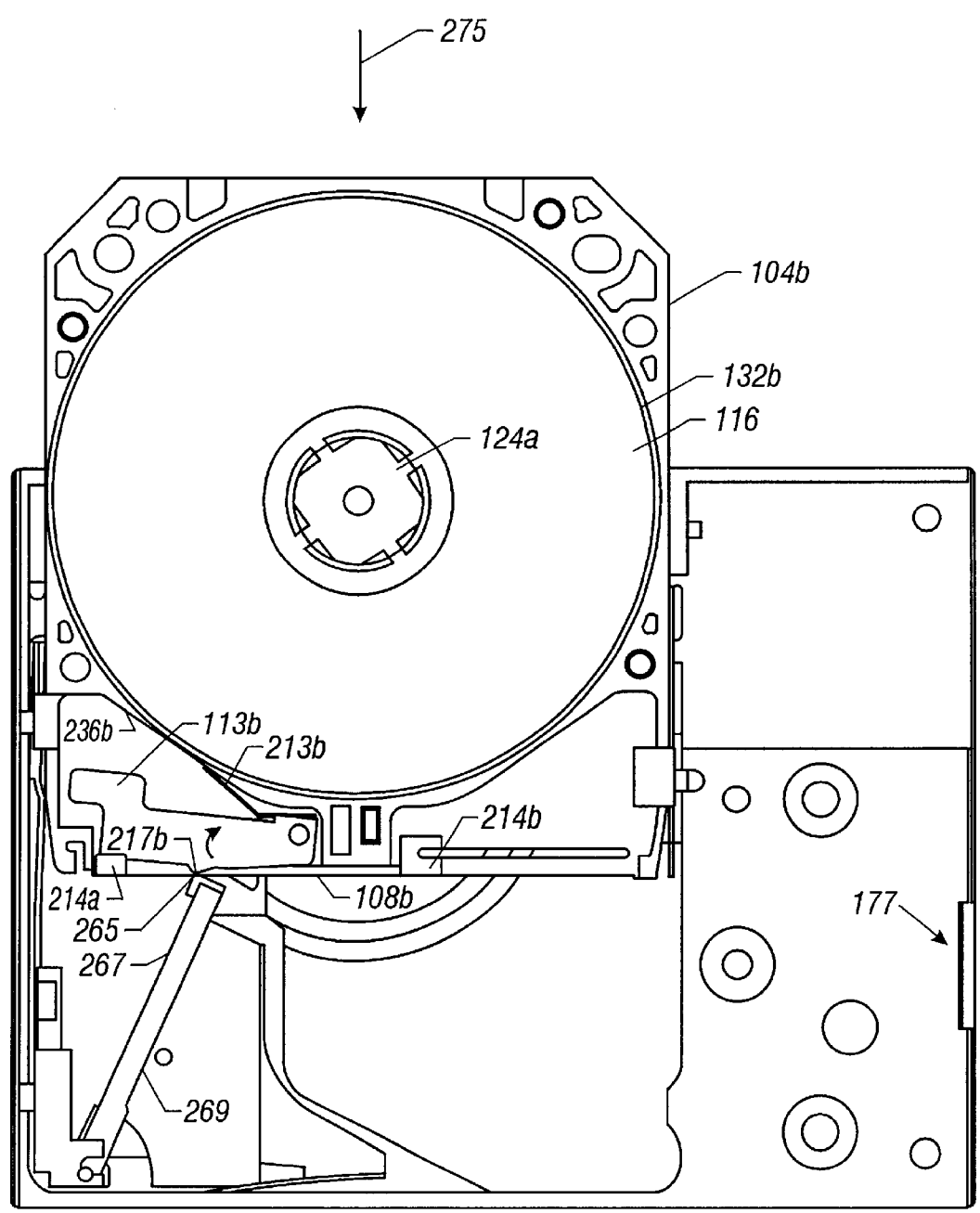
FIG. 19 is yet another top sectional view taken along line 8—8 of FIG. 5 when the cartridge assembly is being inserted properly into the disk drive of FIG. 17.
Figure 20:
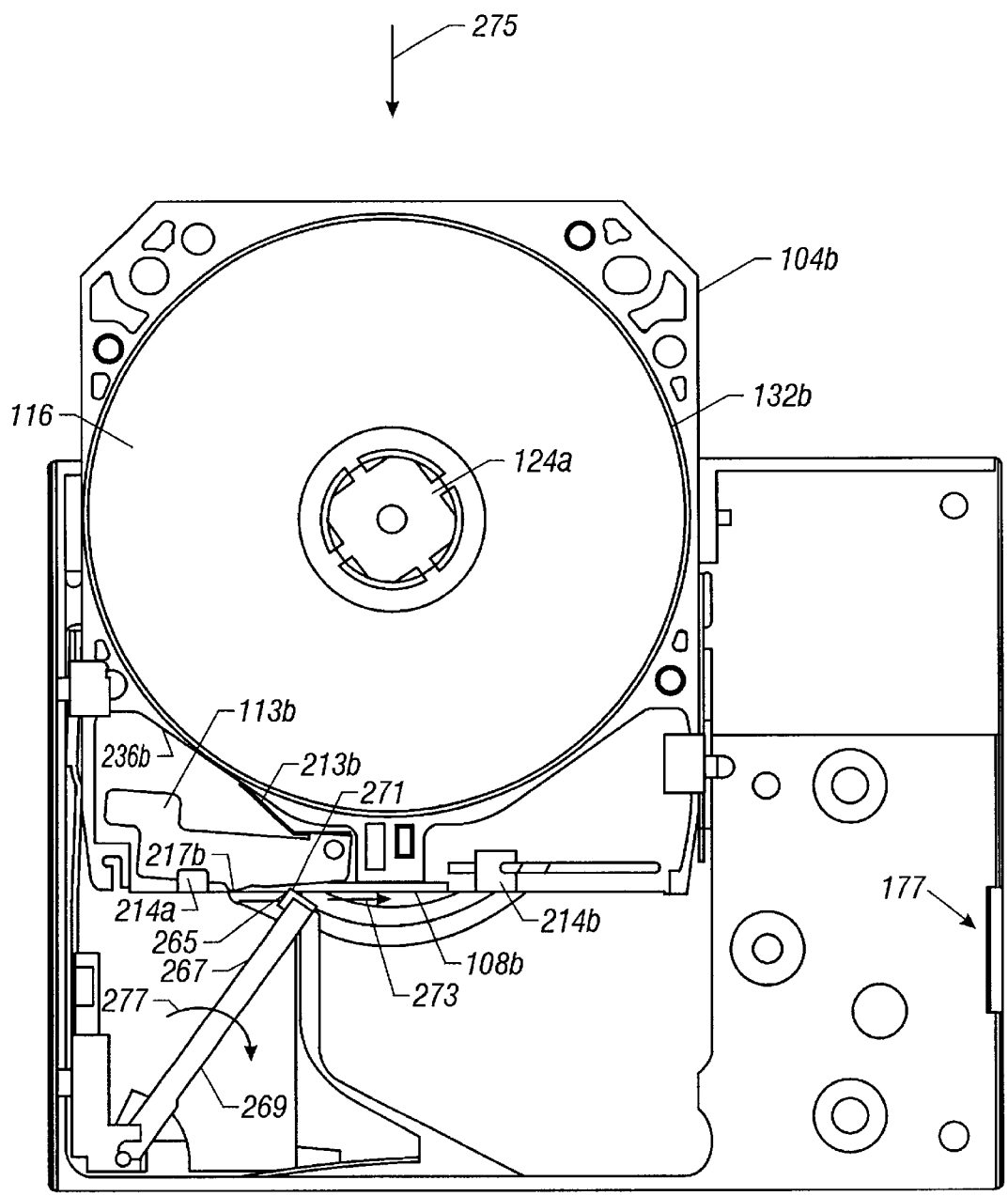
FIG. 20 is a further top sectional view taken along line 8—8 of FIG. 5 when the cartridge assembly is being inserted properly into the disk drive of FIG. 17.
Figure 21:
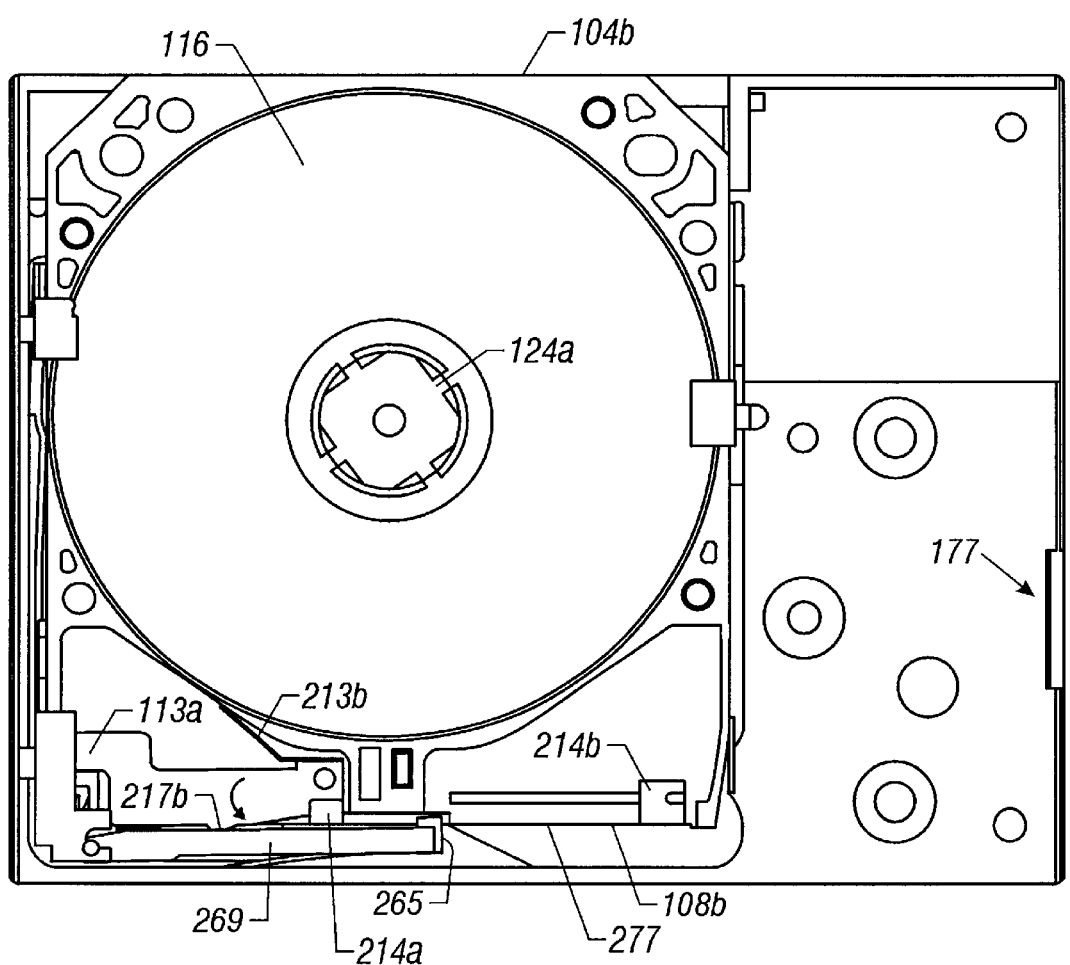
FIG. 21 is a further top sectional view taken along line 8—8 of FIG. 5 when the cartridge assembly is fully inserted and seated in the disk drive of FIG. 17.
Figure 22:
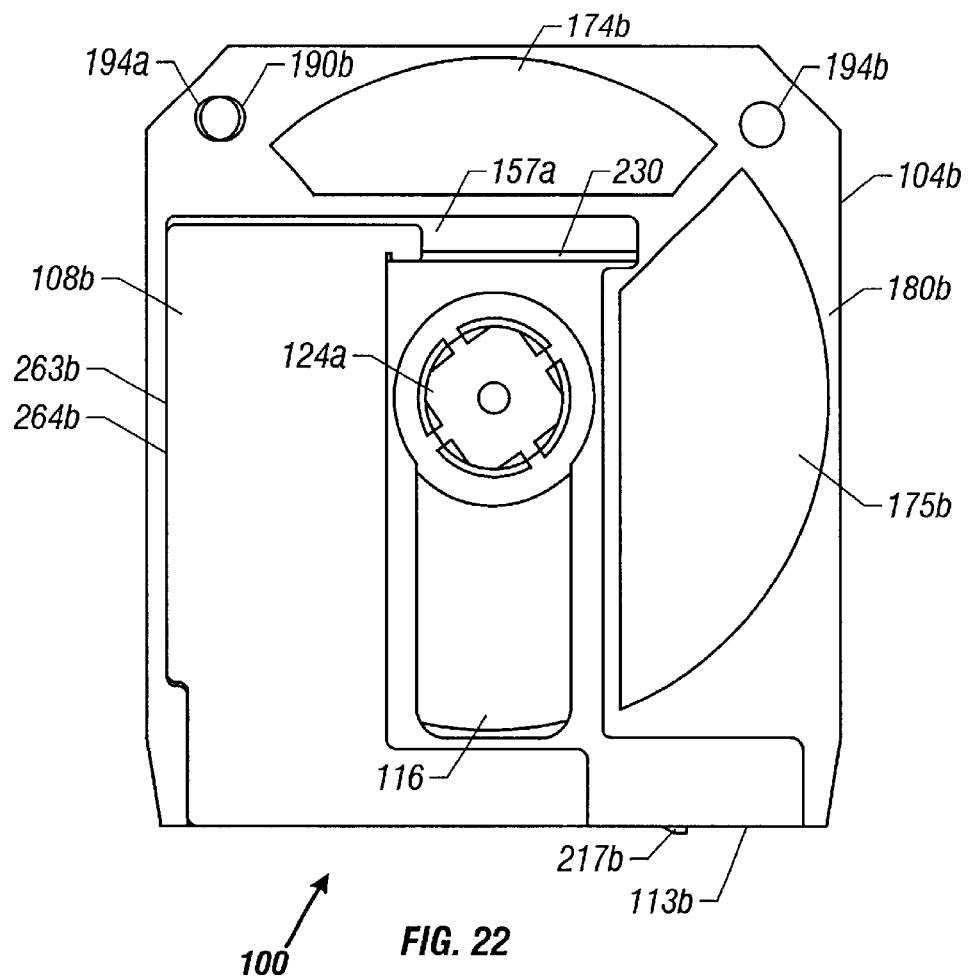
FIG. 22 is a bottom plan view of the cartridge assembly when the shutter member is in the fully open position.
Figure 23:
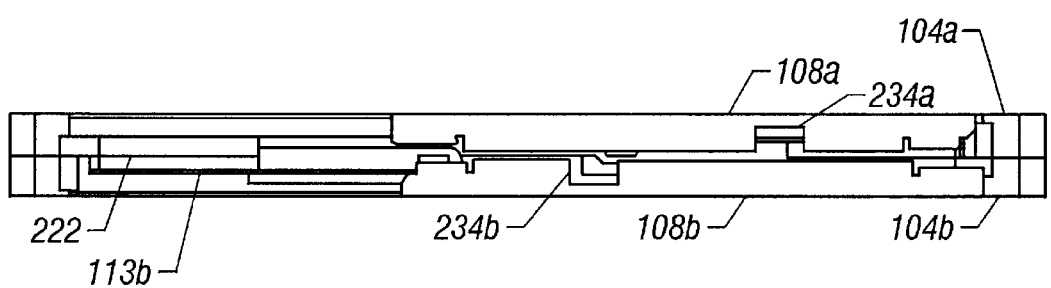
FIG. 23 is an end view of the cartridge assembly when a (lower) shutter member is in the open position.

Another embodiment of a cartridge unlocking assembly is shown in FIGS. 17–21. An unlocking nub 265, positioned on a distal end 267 of a rotary arm 269, engages the locking nub 217a,b (FIG. 18). As the user pushes the cartridge assembly 100 into the disk drive 177, the unlocking nub 267 displaces the locking nub 217b inwardly (and rotates the locking arm 113a,b) until the locking nub 217b is disengaged from the locking slot 234a,b and the shutter member 108a,b is in the unlocked and movable position (FIG. 19). In response the spring member 213a,b exerts a resistive force (by being forced against bearing surface 236a,b) against displacement of the locking arm 113a,b by the rotary arm 269. The stepped front surface 271 of the unlocking nub 265 hooks the locking slot 234a,b and displaces the shutter member 108a,b laterally in direction 237 as shown in FIG. 20. In response to the insertion force 275 against the cartridge assembly 100, the rotary arm 269 rotates in a clockwise direction 277 against the force of the spring member 112a,b and displaces the shutter member to the fully open and unlocked position (FIG. 20). The rotary arm 269 causes the leading edge 263a,b of the shutter member 108a,b to engage the similarly shaped raised edge 264a,b of the housing member 104b (FIG. 21). In the open position, the rotary arm is substantially aligned with (or parallel to) the planar front face 277 of the cartridge assembly 100 and the front face of the shutter member 108a,b (FIG. 21).

The shutter member 108a,b, when in the closed and locked position, protects the medium 116 from damage and seals the cartridge interior from foreign debris. Referring to FIG. 1, the shutter member 108a,b extends from a front (or loading) end 270 of the cartridge assembly 100 to a point on the other side of the hub assembly 106. The flexible shutter member 108 contacts the hub member 124 while avoiding contact with the medium 116 when flexed inwardly, i.e. when the shutter member 108a,b is moved towards the hub member(s) 124a,b. Additional structural support is provided to the shutter member by the end portions 274a,b and the peripheral side portions 278a,b of each shutter member 108a,b. These overlap and engage the indented surface 157 of the housing member adjacent to the opening 120a,b and window 128a,b when the shutter member 108a,b is displaced inwardly. In this manner, the shutter member acts as a load bearing member that provides additional protection to the medium 116 by resisting compression of the cartridge wall (e.g. by a user). The positioning of the shutter member 108a,b over the hub member further closes the opening and windows and thereby inhibits the entry of foreign matter, such as dust, into the interior of the cartridge.

The shutter members and housing members 108a,b and 104a,b can be composed of the same or different materials. In one configuration, the shutter members are metal (e.g., stainless steel) and the housing members are plastic (e.g., polycarbonate). In this configuration, the shutter members thus have greater yield and tensile strengths than the housing members.

Referring to FIGS. 26–29, alignment of the cartridge assembly 100 in the disk drive 177 will now be described. As will be appreciated, to facilitate alignment of the medium 116 in the disk drive 177, it is necessary to first properly spatially align the cartridge assembly 100 in the drive 177.

Referring to FIGS. 26–29, cartridge assembly alignment is performed in the X and Y directions using anti-rotational slots 190a,b and locating holes 194a,b formed in each housing member 104a,b. These engage an anti-rotational pin 198 and locating pin 202, respectively. Specifically, anti-rotational slot 190a is aligned with the locating hole 194b and the locating hole 194a is aligned with the anti-rotational slot 190b to permit the cartridge to be flipped in the disk drive depending upon which operational surface 148a,b of the double-sided medium 116 is to be accessed. Depending on which side of the medium 116 is to be accessed, one of the anti-rotational slots 190a,b will receive the anti-rotational pin 198 and one of the locating holes 194a,b will receive the locating pin 202. The combination of the anti-rotational slot and locating hole and related pins permits the disk drive to rotate the housing members slightly about the locating pin to provide proper alignment of the housing members in the disk drive prior to or simultaneous with alignment of the medium and attached hub assembly. When the cartridge housing is properly aligned, the disk drive is able to freely rotate the medium without interference form the cartridge housing. As will be appreciated, the anti-rotational slot and pin together inhibit unwanted or excessive rotation of the cartridge assembly about the locating hole and pin as too much displacement of the cartridge can be detrimental to centering of the disk on the disk drive spindle and to servo control.

Figure 27:
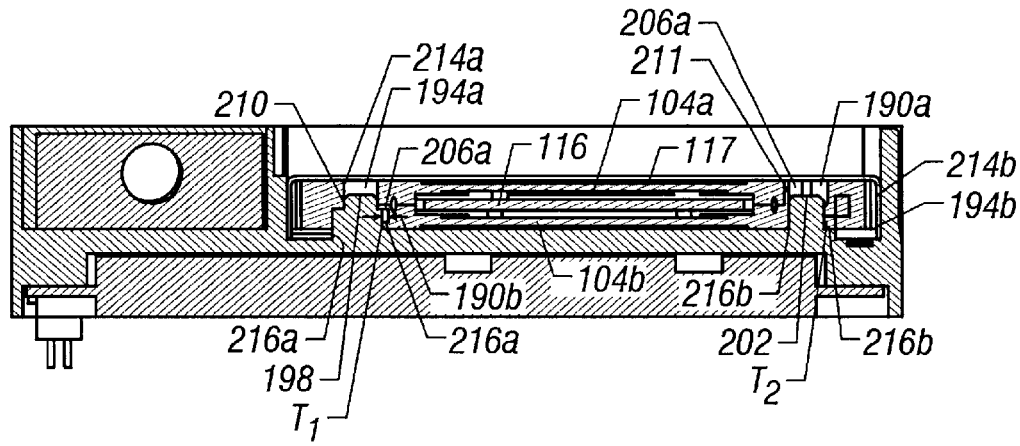
FIG. 27 is a cross-sectional view taken along lines 27—27 of FIG. 26 (with the cartridge assembly in position on the disk drive spindle)

Referring to FIG. 27, the clearance "$T_1$", between the interior walls 206a,b of the slots 190a,b and the outer wall 210 of the anti-rotational pin 198, is greater than the clearance "$T_2$", between the interior wall 214a,b of the locating hole 194a,b and the outer wall 211 of the locating pin 202, to permit the cartridge assembly to engage the anti-rotational pin. In one configuration, the diameters of the anti-rotational and locating pins 198 and 202 are substantially the same and the length of each of the anti-rotational slots 190a,b is greater (i.e., at least about 25% but not more than about 50% more) than each of the diameters of the locating holes 194a,b. The pins 198 and 202 are radially chamfered and/or bullet-nosed to facilitate insertion of the pins into the anti-rotational slot and locating hole respectively. The pins are located at the corners of the cartridge assembly as there is a sufficient cartridge wall thickness at the corners to support the pins.

Cartridge assembly alignment in the Z direction is performed by means of the engagement of shoulders 216a,b,c with the raised outer wall portions 180a,b (FIG. 1) of the housing member (depending on which housing member is facing the shoulders). The annular shoulders 216a,b are adjacent to the anti-rotational and locating pins 198 and 202, respectively, while the shoulder 216c is not associated with any pin. The shoulders 216a–c contact the wall portions 180a,b due to the downward force of a spring located above the housing member 104a (not shown), such as a leaf spring, on the opposite housing member 104a when housing member 104b engages the shoulders. As will be appreciated, only three shoulders are required to perform the alignment even though a system can use four or more such shoulders to contact the wall portions 180a,b of the members 104a,b. When the cartridge assembly is properly positioned in the disk drive, the medium 116 and attached hub assembly 106 are free to rotate in the cartridge assembly. The shoulders or datum features provide a highly efficient method for positioning the cartridge assembly without distortion of the medium 116 such as by clamping.

Through proper alignment of the cartridge housing, the disk drive components are able to further align the medium. A central bore 290 in the hub assembly 106 engages a spindle 291 on the disk drive spin motor 292 to align the medium 116 in the x-y directions and an annular ring 293 engages the operational surface 148b of the medium 116 to provide alignment in the Z direction, thereby providing proper servo and focus control. A rotary actuator 293 radially moves the optical arm 294 to properly orient the optical head 206 mounted on the end of the arm relative to the operational surface 148b of the medium 116. A sleeve 117 mounted in the disk drive receives the cartridge assembly prior to or during insertion to facilitate insertion and ejection of the cartridge assembly.

Figure 26:
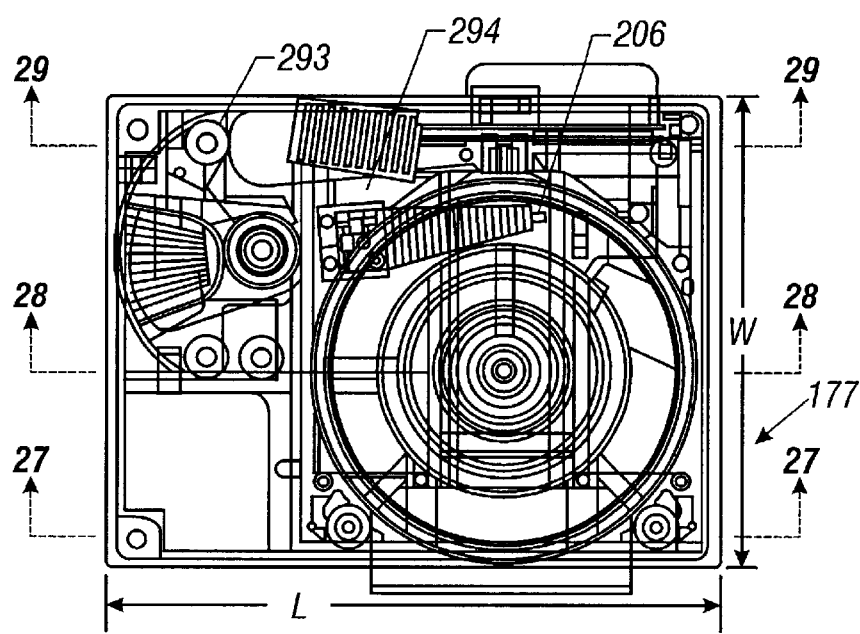
FIG. 26 is a top view of the cartridge assembly of FIG. 1 in a disk drive assembly.
Figure 28:
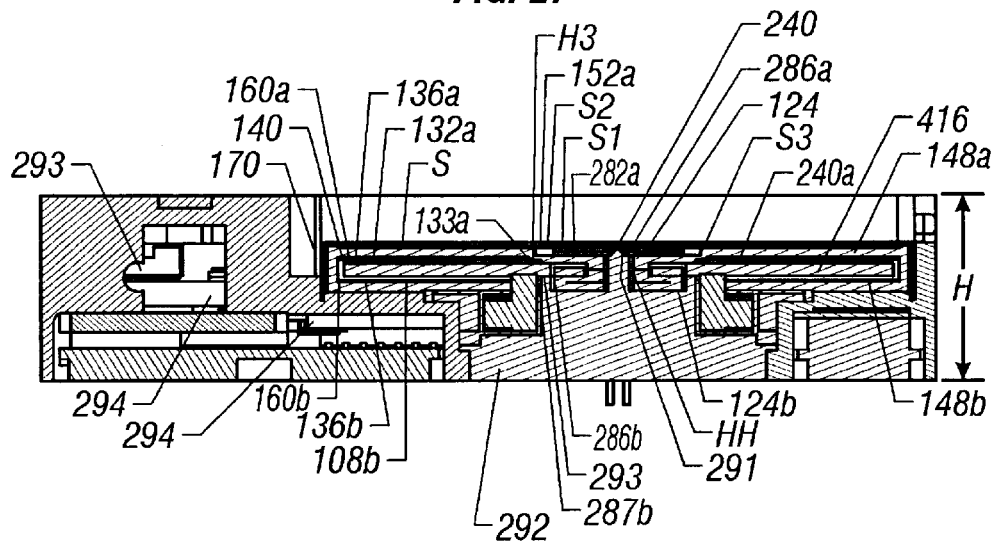
FIG. 28 is a cross-sectional view taken along line 28—28 of FIG. 26 (with the cartridge assembly in position on the disk drive spindle)
Figure 29:
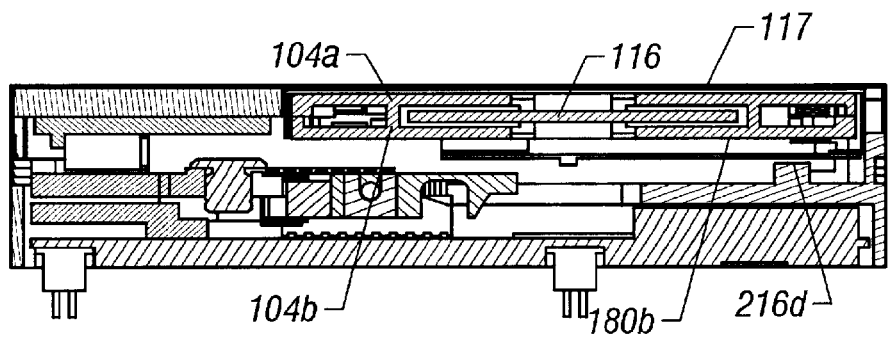
FIG. 29 is a cross-sectional view taken along line 29—29 of FIG. 26 (immediately before the cartridge assembly is lowered into position on the disk drive spindle)

Referring to FIGS. 26 and 28, the form factor of the disk drive assembly 177 is relatively small. In one configuration, the disk drive assembly 177 has a height "H" ranging from about 10 to about 15 mm, a width "W" ranging from about 35 to about 55 mm, and a length "L" ranging from about 30 to about 50 mm.

Referring again to FIGS. 27–29, the spatial relationships among the hub assembly 106, medium 116, and components of the cartridge assembly 100 are depicted. As noted, an objective of the present invention is to provide a cartridge assembly that is compatible with the small form factor optical disk drive 177. To make this possible, a number of issues design considerations typically are addressed.

First, the cartridge assembly height "H" (FIG. 3) is preferably substantially minimized. Second, the vertical displacement of the cartridge assembly in the "Z" direction is preferably substantially minimized. To realize a low loading "Z" distance, the exterior surface 180a,b of the cartridge assembly and exterior surface 800a,b of the corresponding shutter member 108a,b are typically coincident (or coplanar) (see FIG. 4). This relationship facilitates the ability of the shutter member to expose or cover the bore 290 in the hub assembly and the window 128. The exterior surface 180a,b of the housing members 104a,b and the adjacent shutter member exterior surface 800a,b must be inserted over the free end of the spindle 291 with a minimal, carefully controlled clearance in the "Z" direction for the straight-in insertion configuration of FIGS. 12–21. This clearance is typically no more than about 0.2 mm. To substantially minimize the loading displacement in the "Z" direction, the exterior surfaces 286a,b of the hub members are each preferably established in close proximity to the respective exterior surfaces 180a,b and 800a,b. Accordingly, the thickness of the shutter members is preferably substantially minimized (i.e., is no more than about 0.2 mm) and the hub height is substantially maximized, within the height "H" of the cartridge assembly 100.

Third, medium 116 displacement in the "Z" direction from a nominal starting position within the cartridge is preferably substantially minimized to assure that the hub assembly does not interfere with part of the shutter member during shutter member displacement in either direction (i.e., in shutter member opening or closing). The nominal starting position refers to the medium 116 position when the medium 116 is precisely centered in the annular slot 170. The medium 116 can translate or move in the "Z" direction internally in the cartridge assembly 100 in the presence of a gravitational or accelerating force. Referring to FIG. 25, the distance ($S_f$) from the interior surface 282a of the shutter member 108a to the exterior surface 152a of the hub member 124a is greater than the distance ($H_d$) between the outer surface of the medium 116 and the interior surface 132a of the first housing member 104a The width $H_2$ of the annular slot 170 is preferably minimized while being sufficiently large to assure that the medium 116 can rotate freely, without contacting any internal surface of the cartridge assembly 100 during medium rotation. The foregoing requirements typically require the height of the hub members (as measured from the operational surface 148 of the medium 116 to the maximum thickness point of the hub assembly or given by the equation 50% ($H_H$–T)) to be limited by about 50% of the cartridge thickness "H" reduced by the following: (a) 50% of the medium 116 thickness "T", (b) 50% of the width $H_2$ of the annular slot, (c) the shutter member thickness, and (d) manufacturing tolerances.

Figure 24:
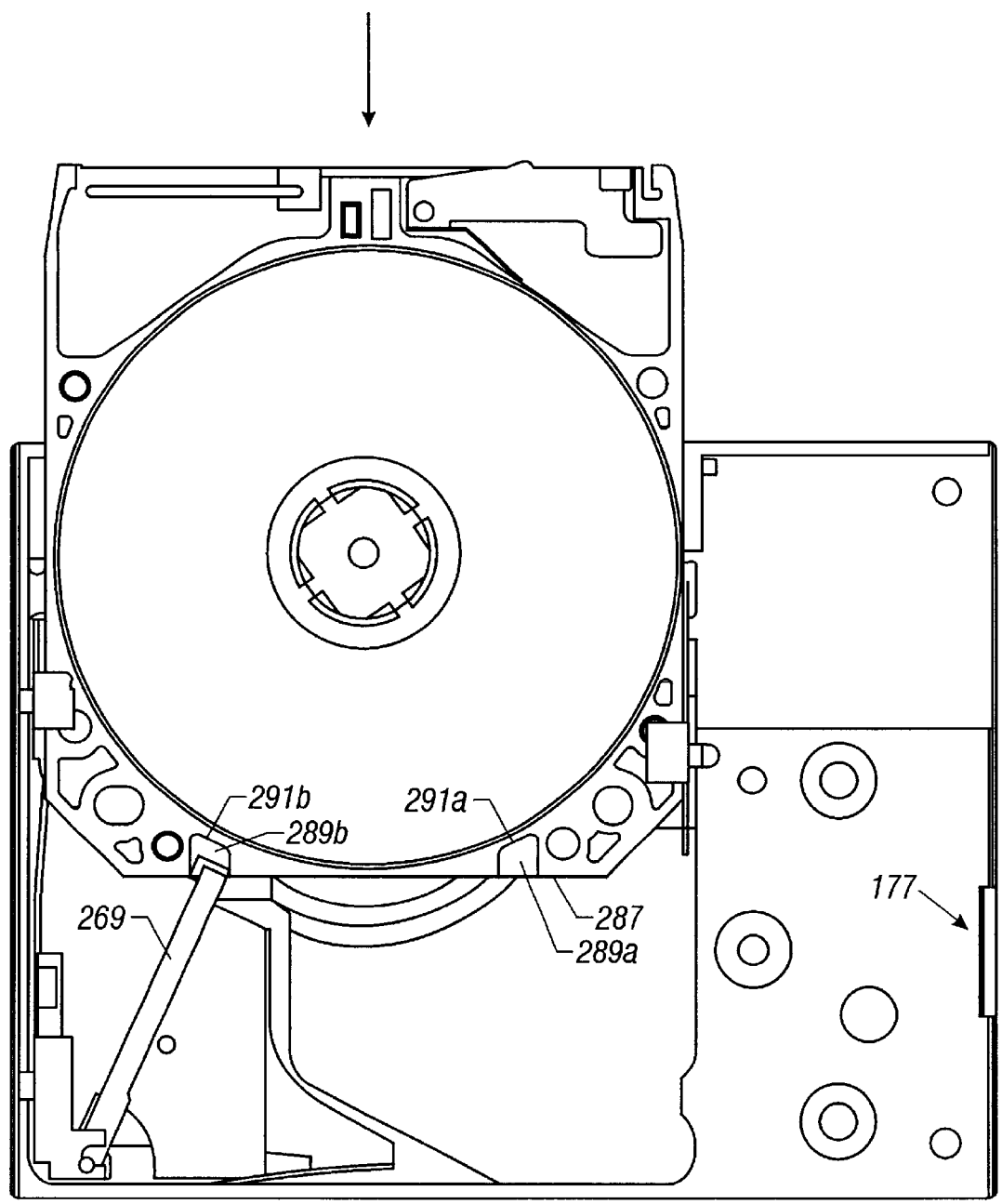
FIG. 24 is a top sectional view taken along line 8—8 of FIG. 5 when the cartridge assembly is being inserted improperly into a disk drive.

The cartridge assembly 100 can include a feature to prevent a user from inserting the cartridge assembly improperly into the disk drive and thereby damaging the disk drive, cartridge assembly, and/or disk or jamming the cartridge assembly in the disk drive. Referring to FIGS. 3 and 24, the rear end or trailing edge 287 of the cartridge assembly 100 includes one or more reverse lockout slots 289a,b which engage the rotary arm 269 as shown in FIG. 24 when the cartridge assembly 100 is inserted in a reverse (or incorrect) orientation into the drive 177. In this manner, the rotary arm 269 inhibits or restricts the distance of (improper) insertion of the cartridge into the disk drive, thereby protecting the disk drive and other components. The lockout slots 289a,b are positioned to engage the rotary arm 269 when the arm 269 is in a home or an at rest position (prior to rotational displacement of the arm by the cartridge assembly). The lockout slot 289a,b has an angled face 291a,b to accommodate the rotary arm 269 and prevent damage to the unlocking nub 265 during engagement.

Referring to FIGS. 2 and 6, the cartridge assembly 100 is manufactured by: placing the ends 300a,b of the spring members 112a,b in the corresponding spring guide slot 250a,b and the spring member in the space between the corresponding surfaces 254a,b and 258a,b; inserting each pin 261a,b into the corresponding hole 259a,b of the locking arm; inserting the tab 218a,b of each shutter member 108a,b in the tab opening 230a,b and the inwardly facing tabs 214a,b in the slots 222a,b; and placing the other end 300b of the spring members 300a,b into engagement with the corresponding indentation 215b in the tab 214b. These steps are repeated in the same order for the other housing member 104a,b. The tabs 218a,b are bent as shown in FIG. 7 and as described above. Next, the medium 116 is positioned such that the centers of the hub members 124a,b are roughly aligned with the center of the circular opening 120a,b in each housing member 104a,b. The housing members 104a,b are then joined together along a seam line 301 such as by ultrasonic welding, adhesion, ultraviolet techniques, tab-and-slot arrangements, and the like. Alternatively, clips or other suitable connectors can be used to join the housing members together.

Figure 30:
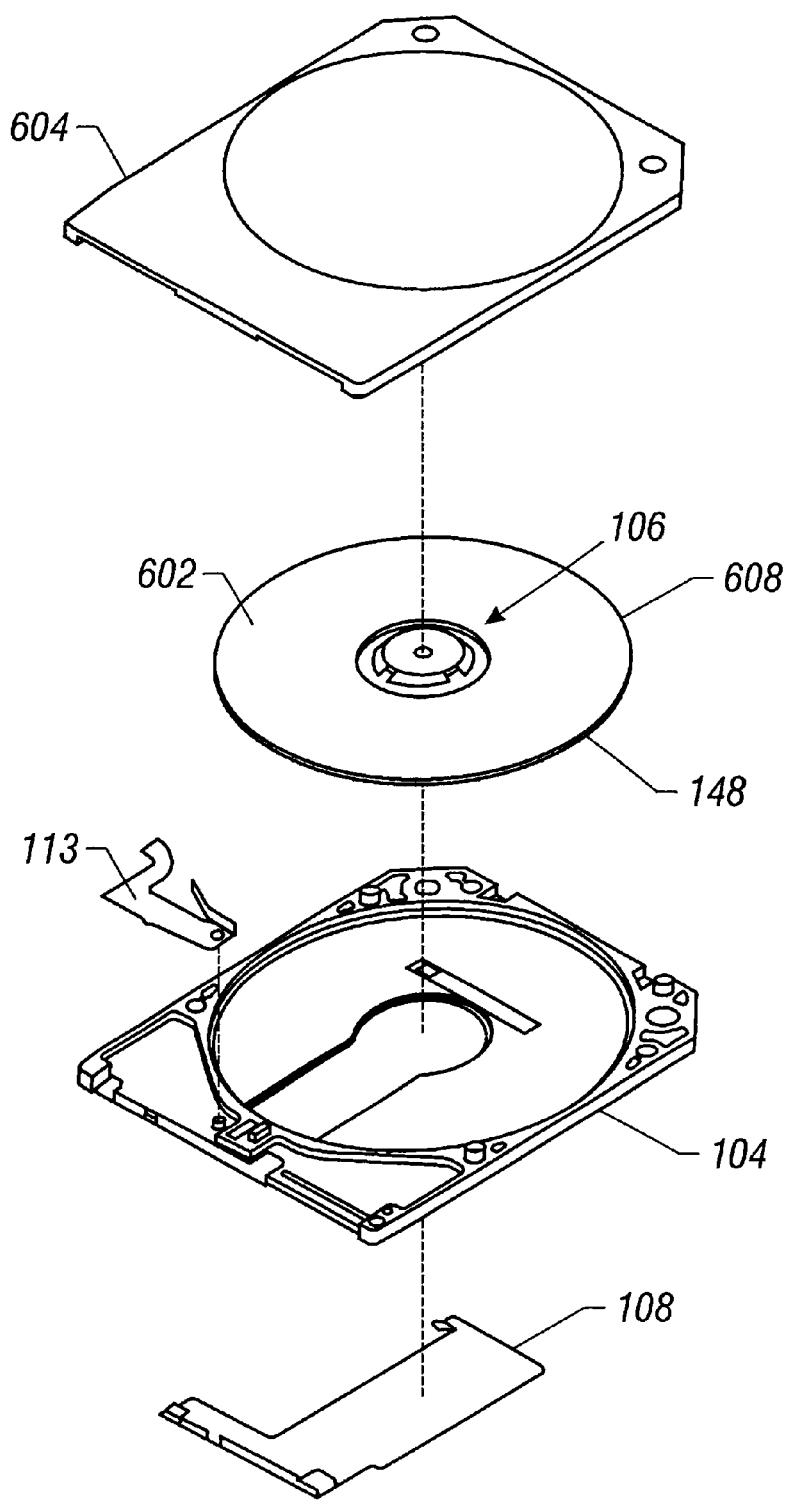
FIG. 30 is a disassembled view of a cartridge assembly according to another embodiment of the present invention.

FIG. 30 depicts an alternative embodiment of a cartridge assembly 600 for a single-sided disk 602 having only one information-containing or operational surface 148 and a blank or nonoperational surface 608. The one-half of the cartridge assembly 600 that is adjacent to surface 148 is the same as the embodiment set forth above. The other half of the cartridge assembly that is adjacent to surface 608 does not include a shutter, a locking arm, and a spring member. In this embodiment, the other housing member 604 of the cartridge assembly can be solid, with no window for to access the disk or circular opening for the hub assembly. The cartridge assembly is configured such that the cartridge assembly will not fit into the disk drive if the user attempts to insert the cartridge assembly upside down (i.e., with the nonoperational surface facing the optical head).

Figure 31:
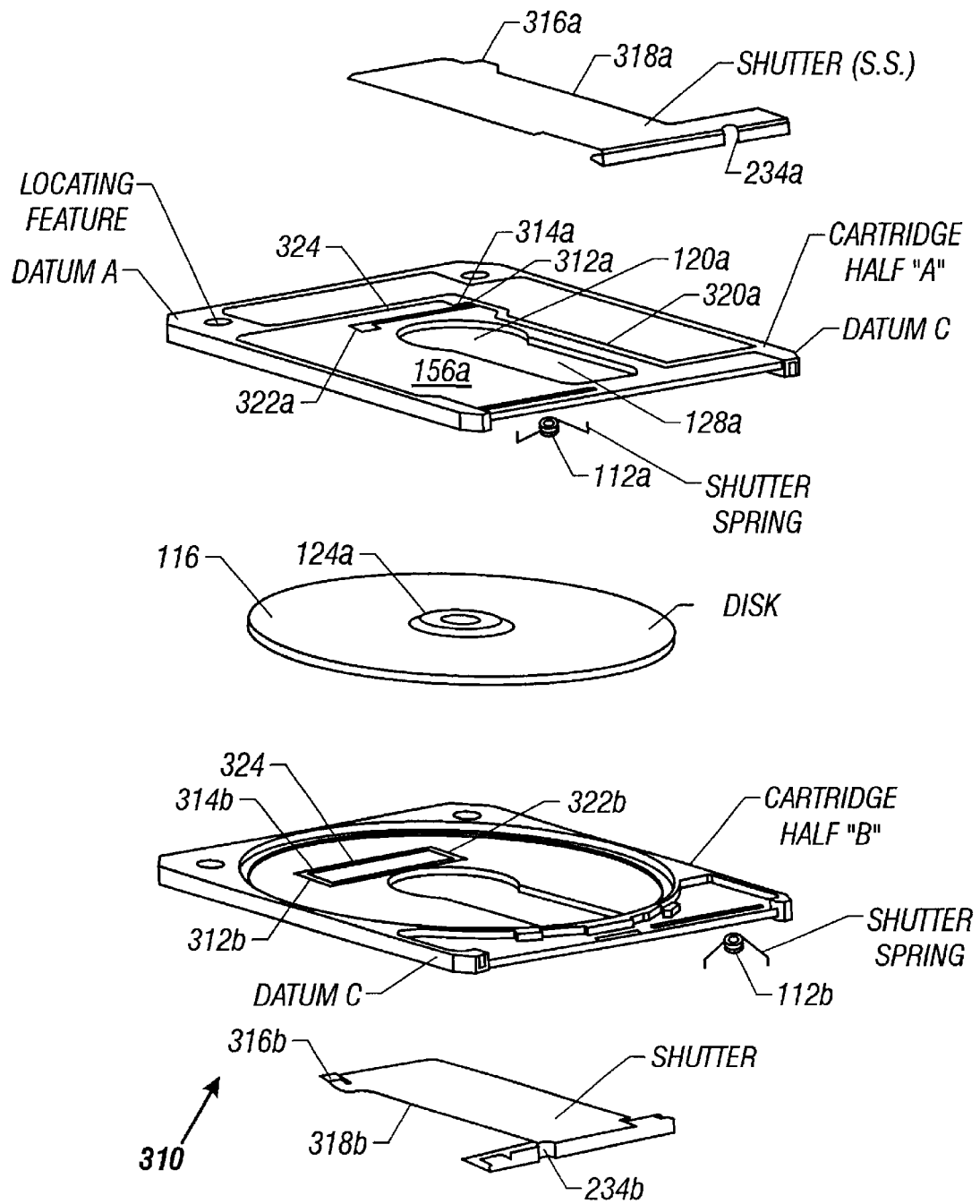
FIG. 31 is a disassembled view of a cartridge assembly according to another embodiment of the present invention.
Figure 32:
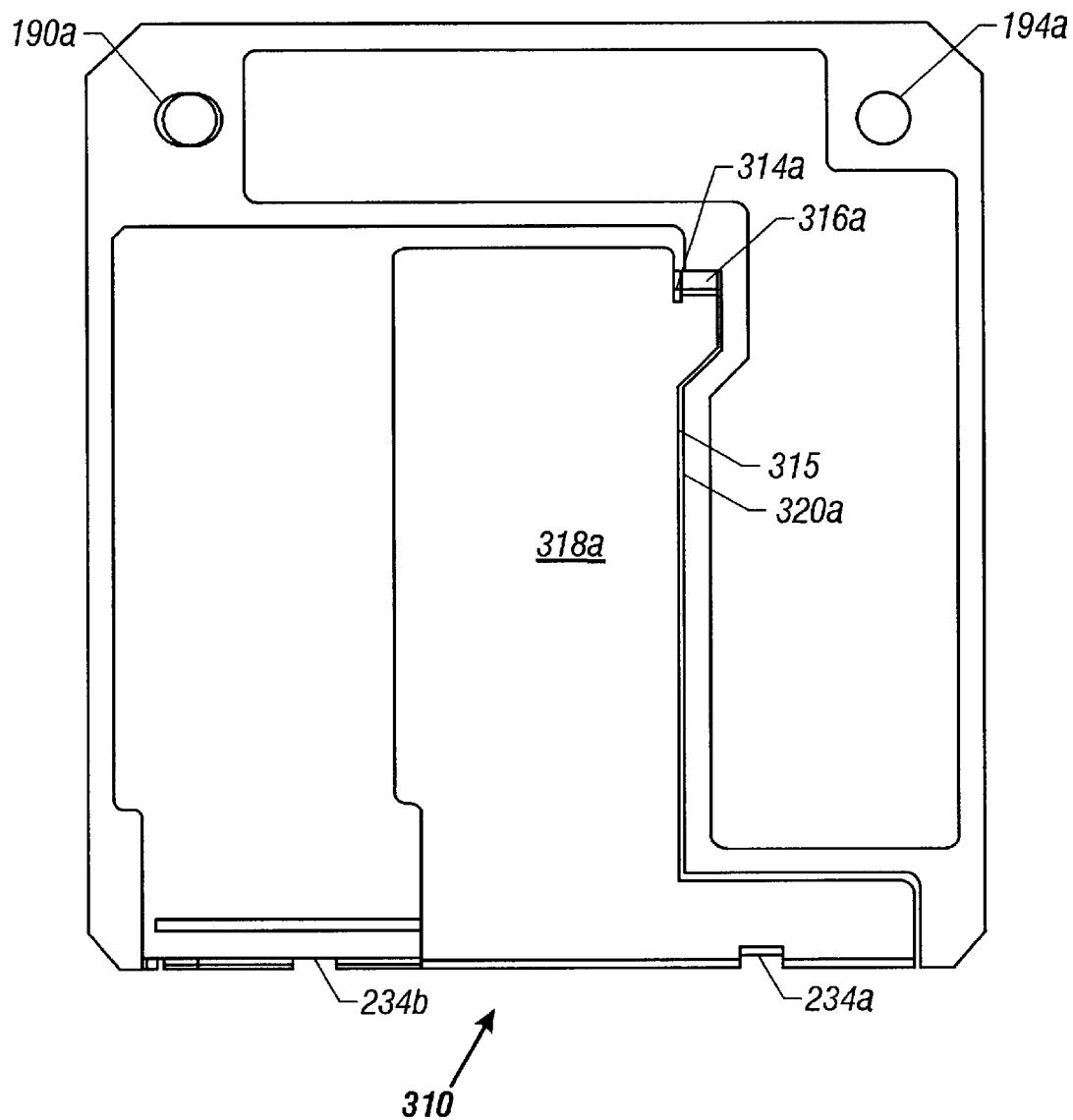
FIG. 32 is a top view of the cartridge assembly of FIG. 31 with the shutter in the closed and locked position.
Figure 33:
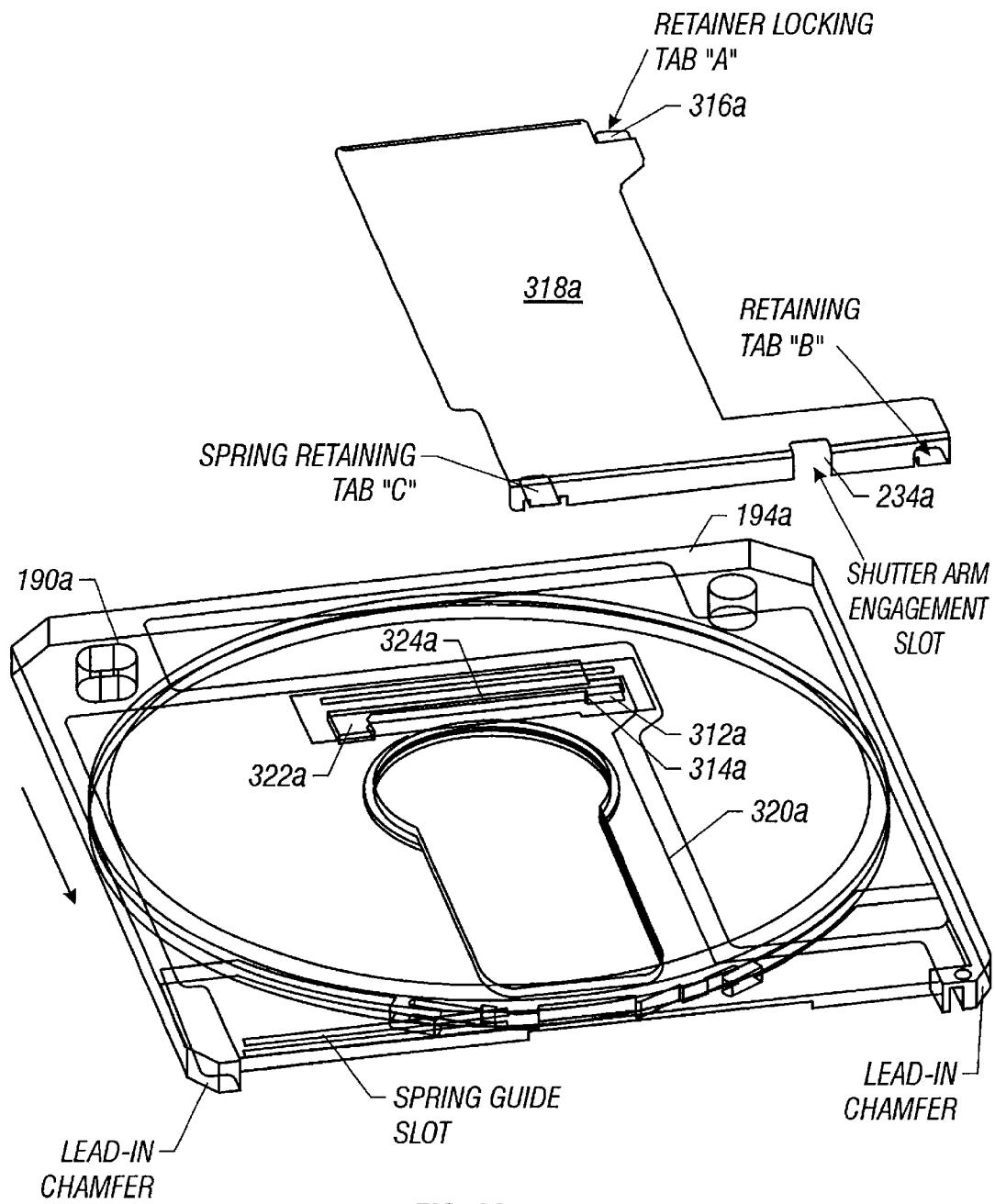
FIG. 33 is a partial disassembled view of first housing member and shutter member of the cartridge assembly of FIG. 31.

FIGS. 31–33 depict another embodiment of a cartridge assembly 310 that differs from the previous embodiment in the use of a different locking subassembly. The locking subassembly includes a locking slot 312a,b (and locking step 314a,b) that engages a tab 316 when the shutter member 318a,b is in the closed position. This subassembly does not include a locking arm. As will be appreciated, when the shutter member 318a,b is opened by the rotary arm, the rotary arm pushes the shutter member slightly inwardly to disengage the tab 316 from the locking step 314 and moves the tab 316 laterally out of and away from the locking slot 312. When the cartridge assembly 310 is removed from the disk drive and the rotary arm disengaged from the slot 234a,b, the spring member 112a,b forces the trailing edge 315 of the corresponding shutter member 318a,b to the closed position against the raised, inner step 320a,b of the housing member 314a,b and the tab 316 into the locking slot 312 and into engagement with the locking step 314. Another slot 322 is included at one end of the slot 324 (which permits lateral displacement of the tab 316) to permit the tab 316 to be placed into the engagement with the slot 324 (as shown in FIG. 33) during manufacture.

Figure 34:
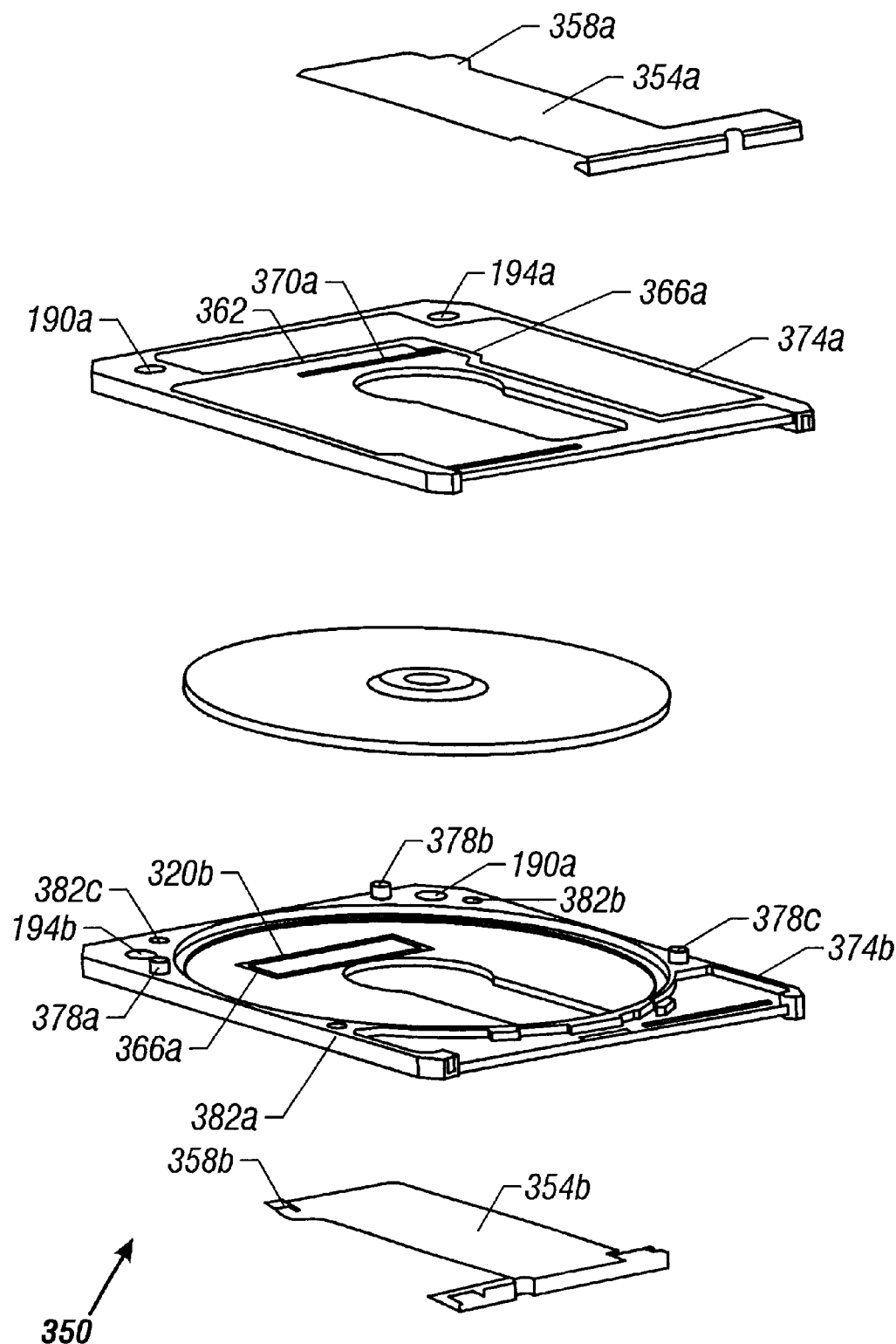
FIG. 34 is a disassembled view of a cartridge assembly according to a yet another embodiment of the invention.

FIG. 34 depicts yet another embodiment of a cartridge assembly. The cartridge assembly 350 is similar to the above embodiment with a number of exceptions. For example, the shutter members 354a,b include an inwardly facing tab 358a,b that differs from the outwardly facing tab 316a,b of the shutter members 318a,b. To accommodate the tab 358a,b, the slot 362a,b has a different configuration than the slot 324a,b (see e.g. FIG. 33) of the shutter members 318a,b. The slot 362a,b, however, also includes a locking slot 366a,b and step 370a,b. The first and second housing members 374a,b also include self-locating features, namely pins 378a–f and matching holes 382a–f to facilitate alignment of the housing members during manufacture. As will be appreciated, pins 378d–f and holes 382d–f are on the first housing member 374a and are therefore not shown.

Figure 35:
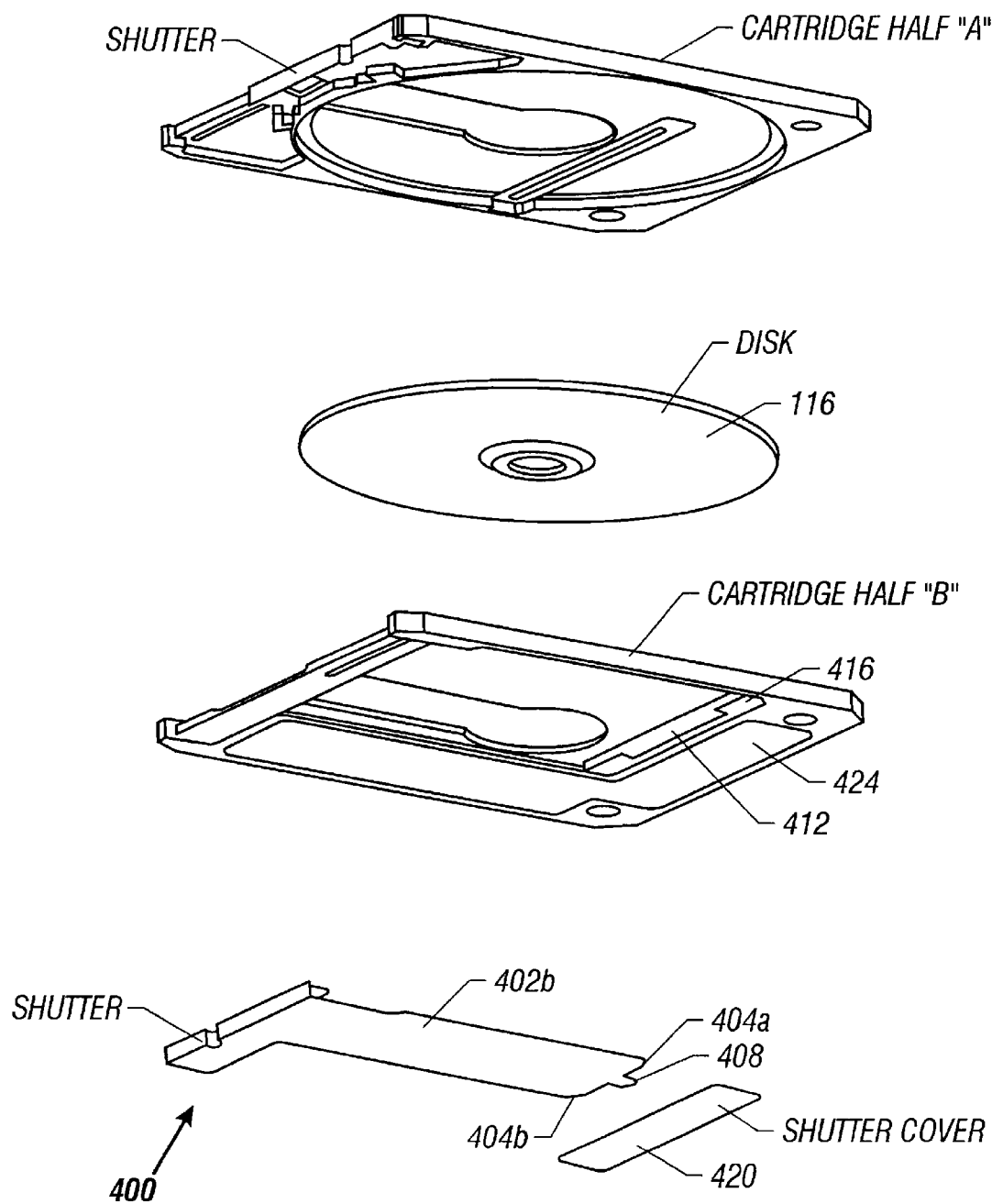
FIG. 35 is a disassembled view of cartridge assembly according to another embodiment of the present invention.
Figure 36:
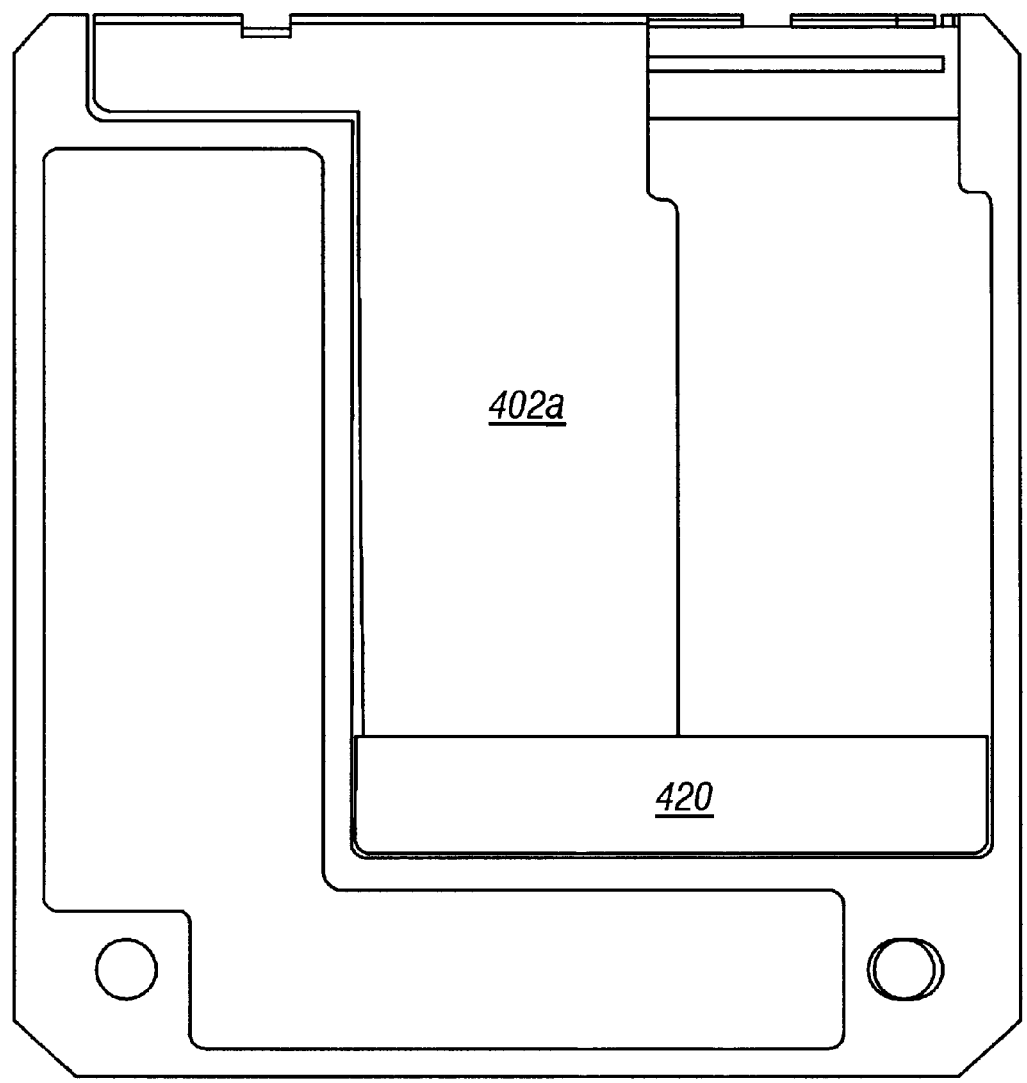
FIG. 36 is a top view of the cartridge assembly of FIG. 35 with the shutter in the closed and unlocked position.
Figure 37:
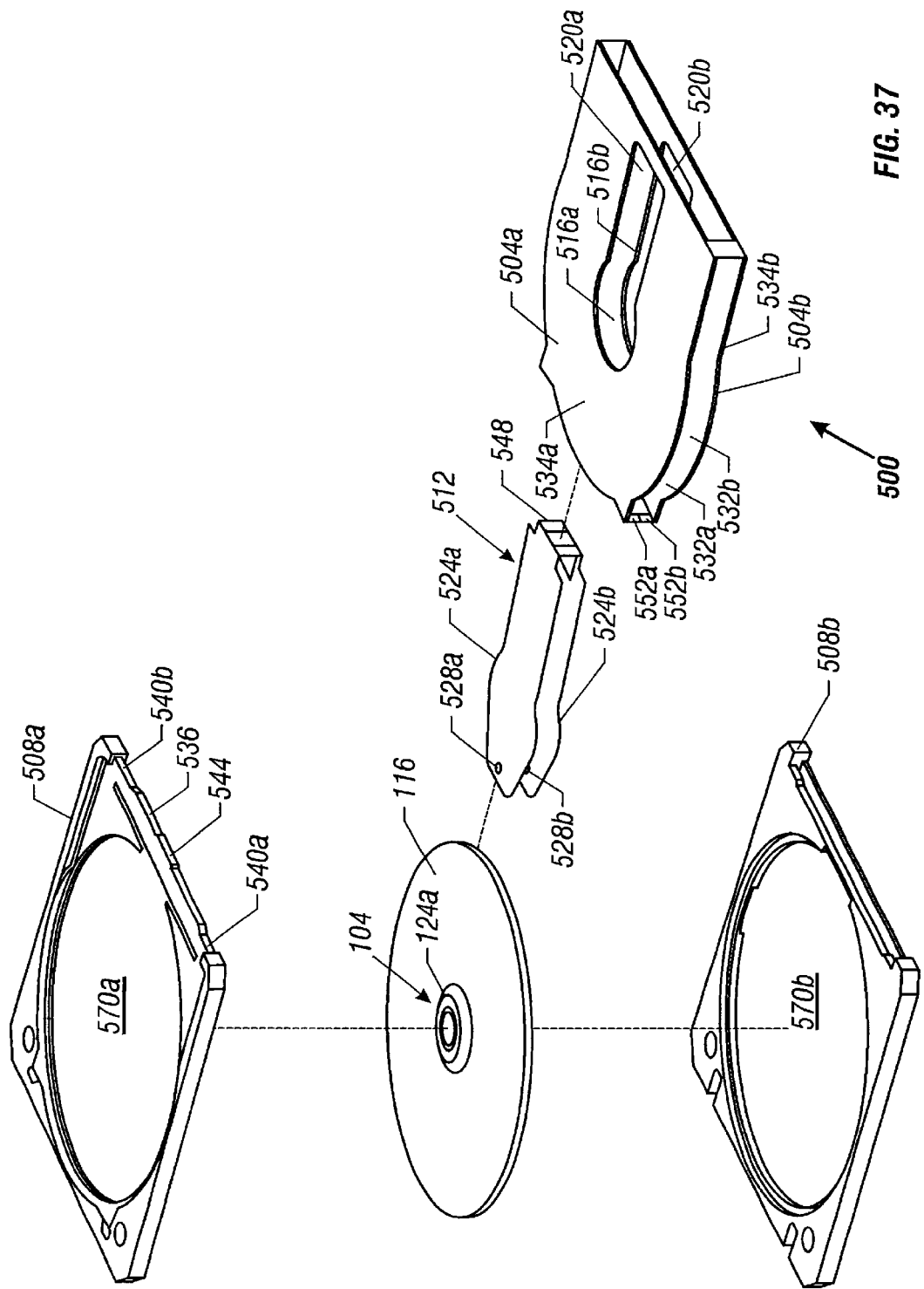
FIG. 37 is a disassembled view of a cartridge assembly according to yet another embodiment of the present invention prior to insertion in the cartridge assembly.

FIGS. 35–36 depict a further embodiment of a cartridge assembly 400 according to the present invention. The cartridge assembly 400 is similar to the above-noted embodiment of FIGS. 1–7 with a number of exceptions. The cartridge assembly 400 uses a shutter member 402a,b having projections 404a,b positioned on either side of a flat tab 408. The tab 408 rides in the slot 412, with the projections 404a,b engaging the step 416 to hold the shutter member in position during movement (and prevent the shutter member from becoming cocked to either side). A shutter cover 420 is fastened to the surface 424 and holds the tab 416 in the slot 412. The use of a slot that does not pass through the housing member as in the prior embodiment provides additional protection against the tab 408 contacting an operational surface of the medium. However, the use of the bent tab of FIG. 6 permits fewer parts to be used in cartridge assembly manufacture which lowers unit costs and a reduction of the overall cartridge height H with concomitant benefits in the form factor of the disk drive 177.

FIGS. 37–41 depict another embodiment of a cartridge assembly 500 that incorporates a unitary, metal (e.g., stainless steel) cover 504a,b on each of the housing members 508a,b. This embodiment provides additional structural support and a unitary, internal shutter 512 (e.g., stainless steel) for covering simultaneously the circular openings 516a,b and windows 520a,b from inside of each housing member 508a,b. This design is different from the two-piece shutter of the previous embodiments that are positioned outside of the housing members (i.e., are external shutters). Each arm 524a,b of the shutter has an outwardly facing dimple 528a,b that contacts the adjacent interior wall 532a,b of the adjacent metal cover 534a,b member and thereby reduces friction as the internal shutter 512 moves laterally inside of the cartridge between the open and closed positions. The metal covers are highly electrically conductive and thereby prevent the buildup of static electricity and the electrical attraction of charged particles by the cartridge assembly and also provide a higher strength than plastic for a given thickness.

Figure 38:
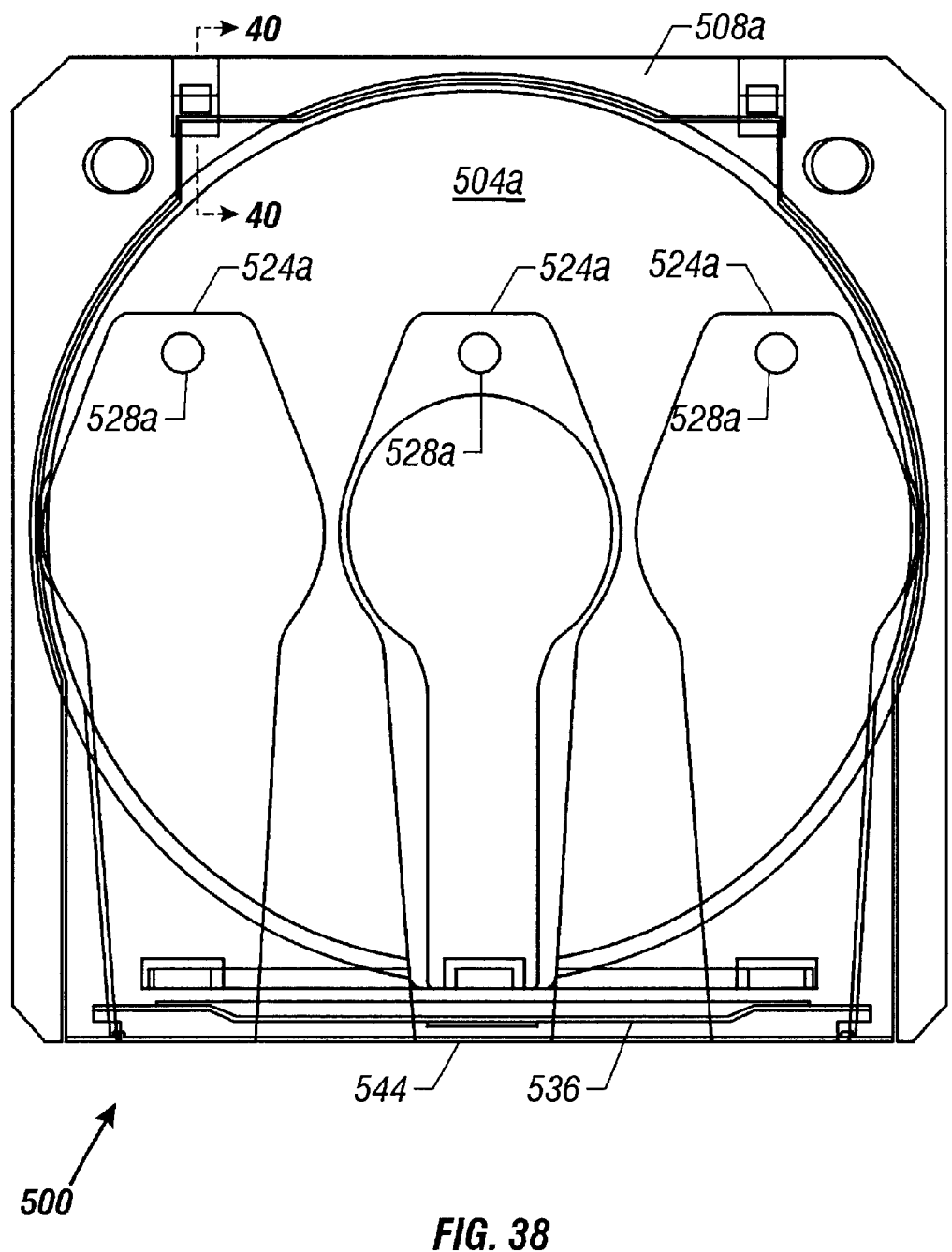
FIG. 38 is a top view of the cartridge assembly of FIG. 37 with the shutter member being depicted in different positions.
Figure 39:
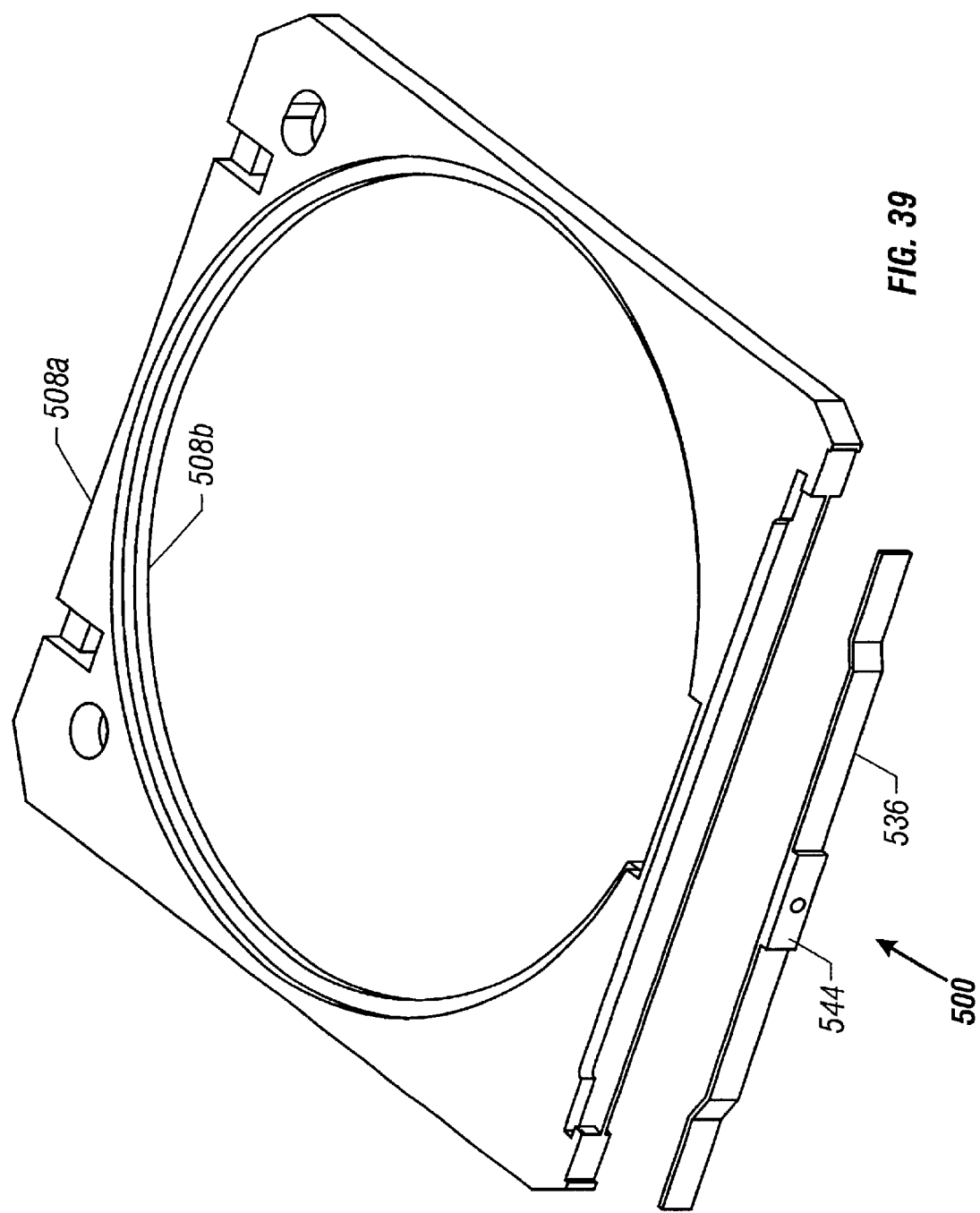
FIG. 39 is an isometric view of selected components of the cartridge assembly of FIG. 37.

A locking subassembly includes an elastic locking member 536 that is secured by the housing members 508a,b at ends 540a,b of the locking member 536. The locking member 536 is biased outwardly to cause the locking projection 544 to engage the rotary arm opening 548 in the shutter 512 when the shutter is in the closed position. When the cartridge assembly is inserted into the disk drive (not shown), the rotary arm (not shown) engages the shutter arm opening 548 and pushes the locking projection 544 inwardly to release the shutter 512. The rotary arm is then able to move the shutter freely from side-to-side to the open position. As shown in FIG. 38, both of the shutter members 524a,b move to the left or right of the circular openings 516a,b and windows 520a,b to permit the optical head to access both operational surfaces of the medium. When the cartridge assembly is removed from the disk drive, the rotary arm moves the shutter back to the closed position. When the rotary arm disengages the rotary arm opening 548, the locking projection 544 is reinserted into the opening 548 to lock the shutter 512 in the closed position.

Figure 40:
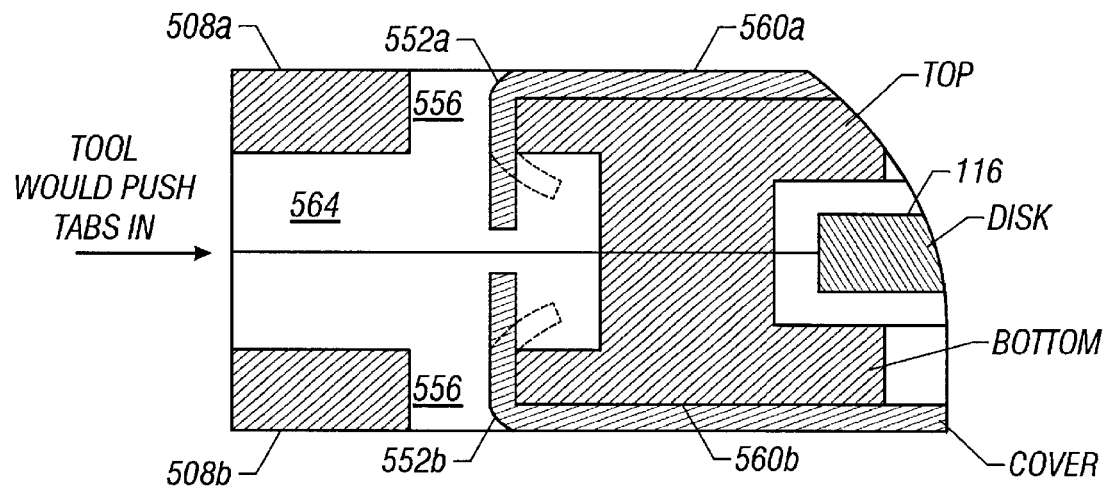
FIG. 40 is a cross-sectional view taken along line 40—40 of FIG. 37.

FIG. 40 shows the method used to lock the metal cover in position during manufacture. Each side of the metal cover 504a,b has downwardly bent tabs 552a,b which are inserted into a passage 556 oriented normal to the longitudinal plane of the medium 116 and cartridge assembly walls 560a,b. A suitable tool is then inserted through the transverse passage 564 (which is located on an end of the cartridge assembly) to deform the tabs 552a,b inwardly as shown by the dotted lines and thereby lock the metal cover in position. Accordingly, the assembly is free of welds and adhesives.

Figure 41:
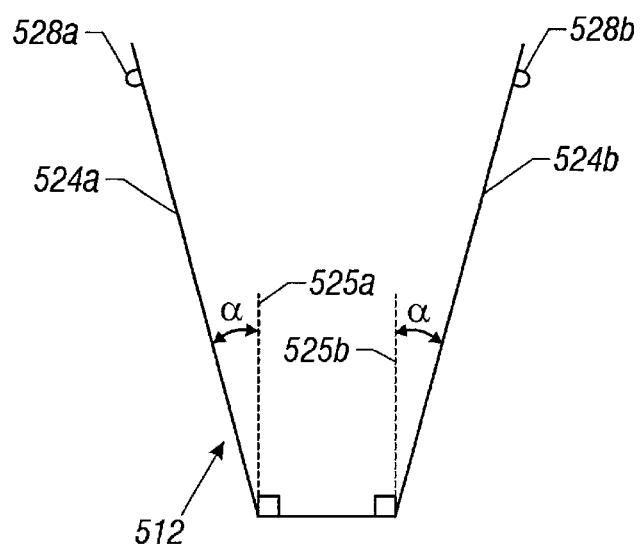
FIG. 41 is a side view of the shutter member of FIG. 37 prior to insertion in the cartridge assembly.
Figure 42:
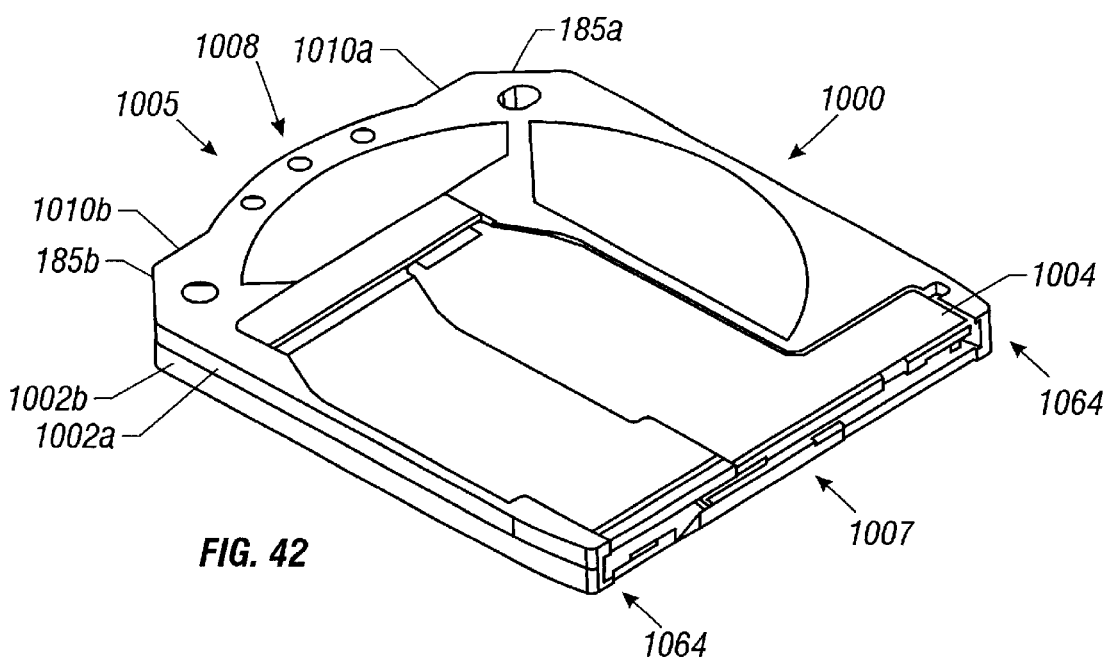
FIG. 42 is a perspective view of another embodiment of a cartridge assembly in accordance with the invention.

FIG. 41 depicts the appearance of the shutter before insertion into the cartridge assembly. The shutter is underbent to bias the shutter outwardly when the shutter is inserted into the cartridge assembly as shown in FIG. 30. After insertion, the shutter members 524a,b are moved or rotated to a position substantially parallel to lines 525a,b. This outward biasing prevents the shutter 512 from contacting the operational surface of the disk. In one configuration, the angle ranges from about 5 to about 25.

Referring again to FIG. 37, the cartridge assembly is manufactured by aligning the medium 116 with the circular opening 570a,b of each housing member 508a,b, placing the locking member 536 in position, adhering the housing members 508a,b together, placing shutter 512 in position, positioning the metal cover in position, inserting the tabs 552a–d in the passage 556, and deforming the tabs as shown in FIG. 41.

FIGS. 42 through 56 illustrate another embodiment of a cartridge assembly in accordance with this invention. The components of cartridge assembly 1000 that are similar to components of cartridge assembly 100 shown in FIGS. 1–29 are numbered similarly. Cartridge assembly 1000 includes housing members 1002a, 1002b (which are identical), a shutter member 1004, and a shutter cover 1006. A trailing edge 1005 of cartridge assembly 1000 contains an arcuate portion 1008 which is located between flat portions 1010a, 1010b and lead-out chamfers 185a, 185b. Cartridge assembly 1000 also has a leading edge 1007. As described below, shutter member 1004 moves between a first position, wherein an opening in housing member 1002a is covered, and a second position, wherein the opening is at least partially uncovered.

Figure 43:
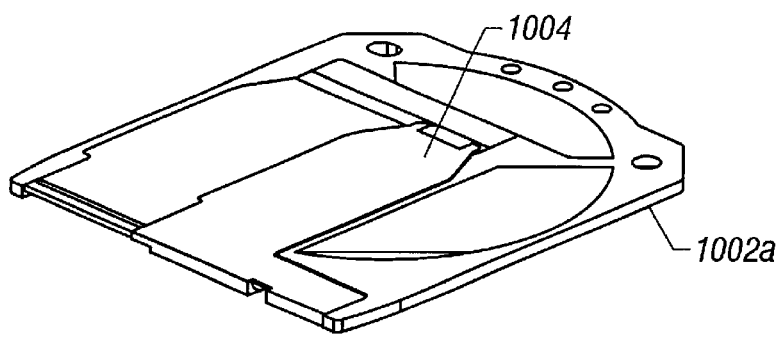
FIG. 43 is an exploded view of the cartridge assembly.
Figure 43:
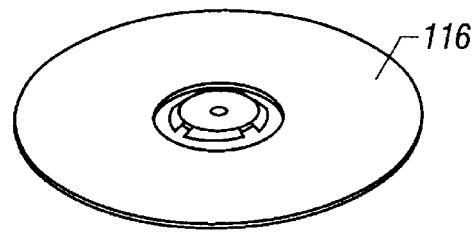
Figure 43:
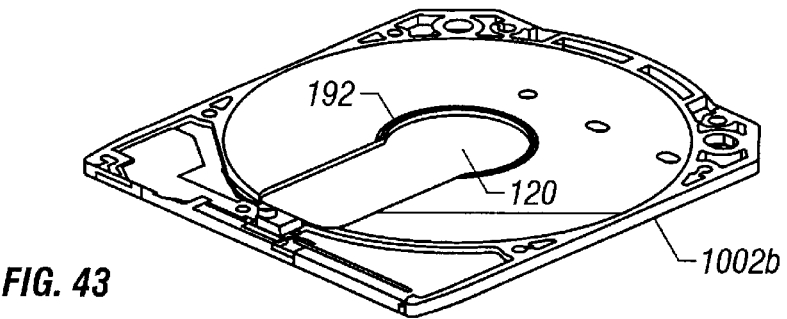

FIG. 43 is an exploded view of cartridge assembly 1000, showing housing members 1002a, 1002b enclosing a storage medium (disk) 116.

Figure 44:
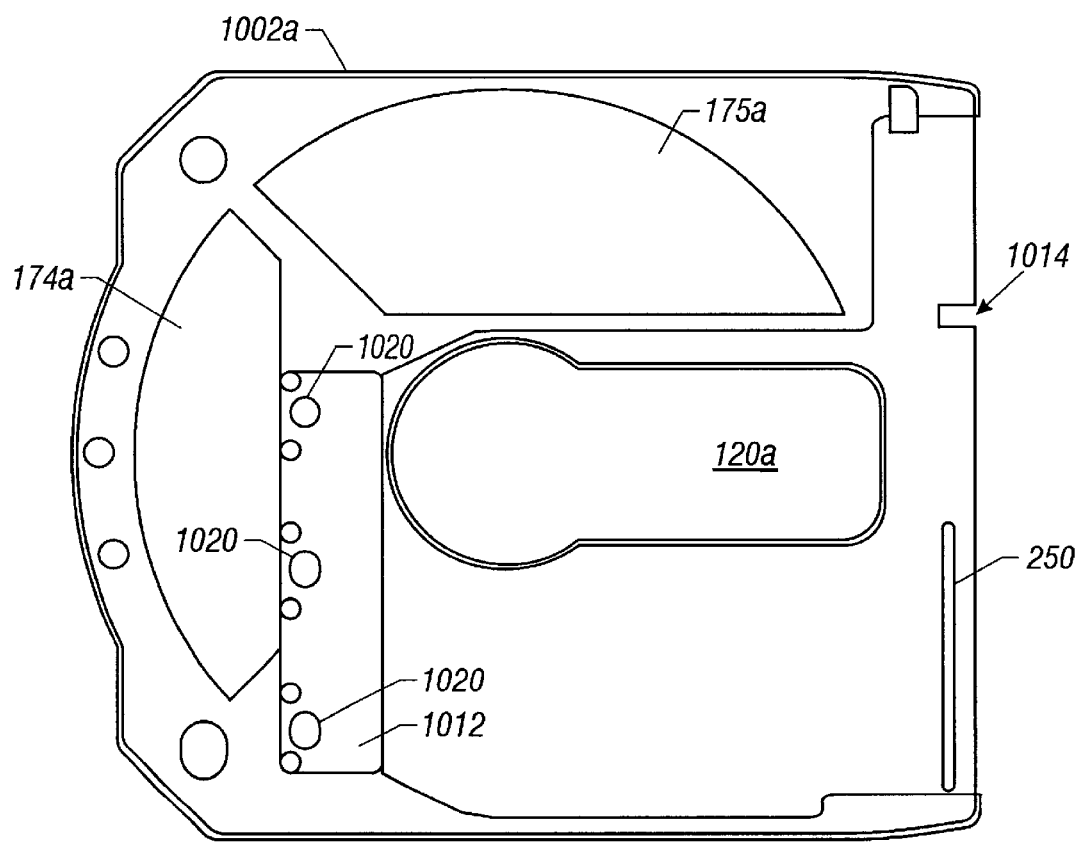
FIG. 44 is plan view of a housing member of the cartridge assembly from the outside.
Figure 45:
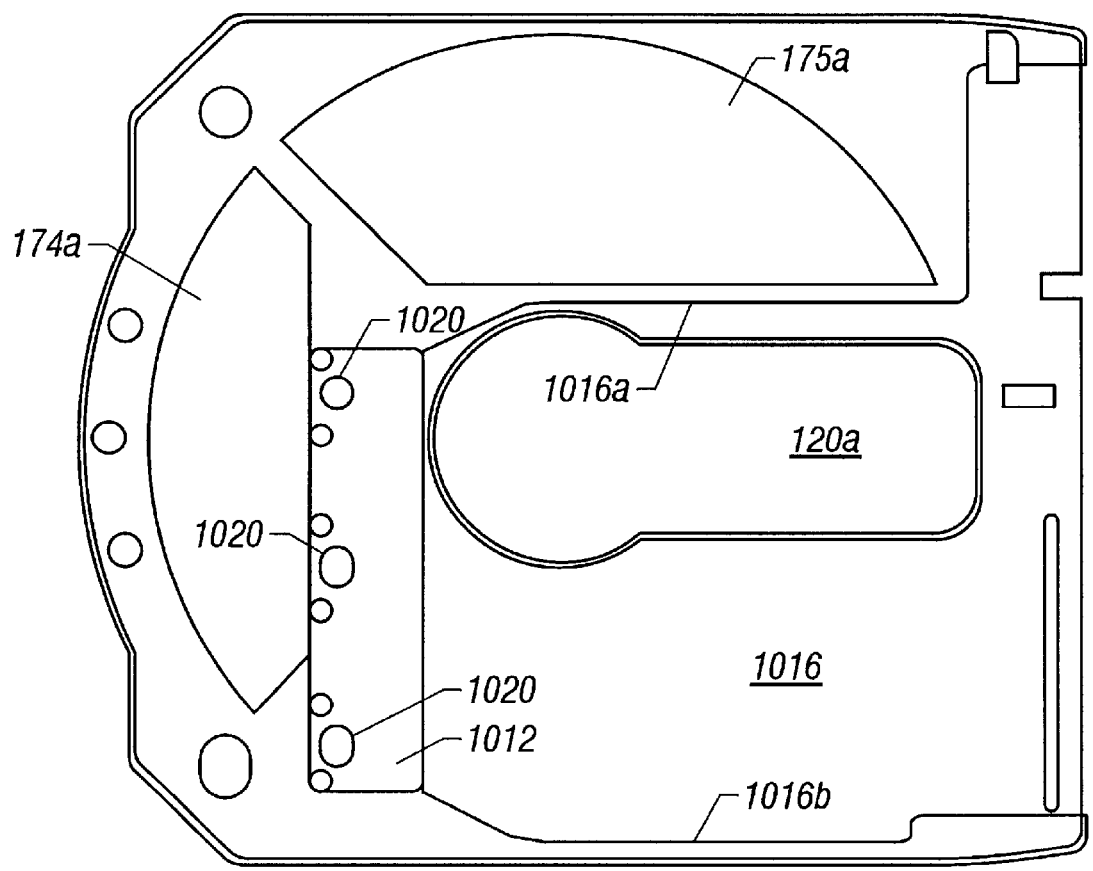
FIG. 45 is plan view of the housing member from the outside, showing the recessed areas.

FIG. 44 is a plan view of housing member 1002a from the outside. Shown are the indented surfaces 174a, 175a for labels and the spring guide slot 250. Also shown is a if recess 1012, which is used to hold the shutter cover 1006 (FIG. 42), and a picker safety slot 1014, which interacts with the drawer assembly as described below. FIG. 45 is a plan view similar to FIG. 44 with the raised areas of housing member 1002a being hatched. The recessed area in which shutter member 1004 slides back and forth to uncover the opening 120 is numbered 1016. Recessed area 1016 is bordered on two sides by edges 106a and 1016b of the raised area.

Figure 46B:
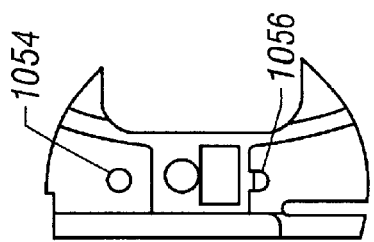
FIG. 46B is a detailed view of the portion of the housing member which includes the lock height positioner.
Figure 46A:
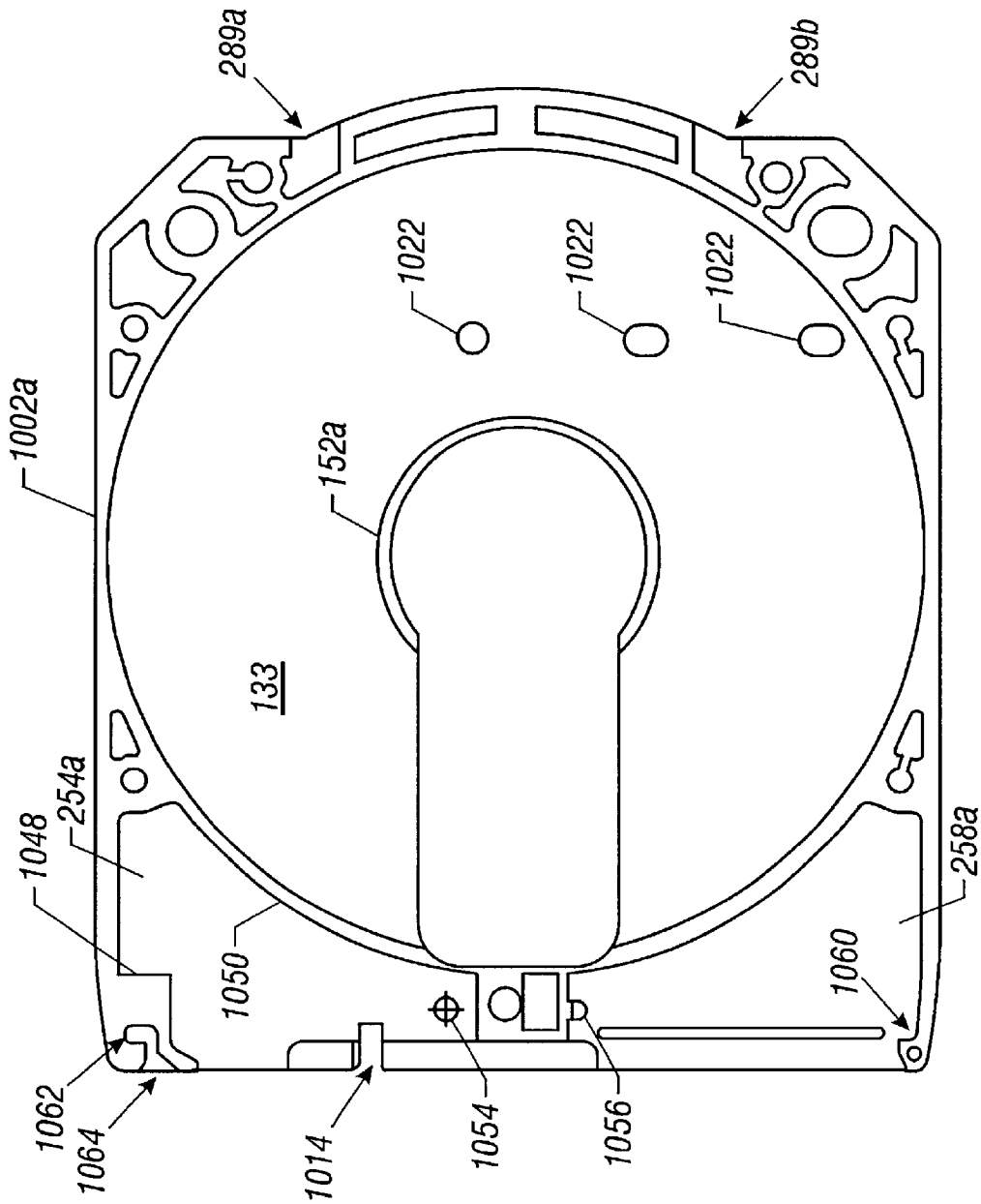
FIG. 46A is plan view of the housing member of the cartridge assembly from the inside.

FIG. 46A is a plan view of housing member 1002a from the inside. Many of the features are the same as those in housing member 104b (FIG. 8), but housing member 1002a includes the picker safety slot 1014, and does not include an indented surface 156a or a slot 230. Instead the surface 133 is smooth in the area where those features are located in housing member 104b. Housing member 1002a does include, however, corresponding opposing surfaces 254a, 254b and 258a, 258b, which form cavities when housing member 1002a is mated to housing member 1002b. As described below, each cavity holds a lock and a shutter closing spring.

Figure 47:
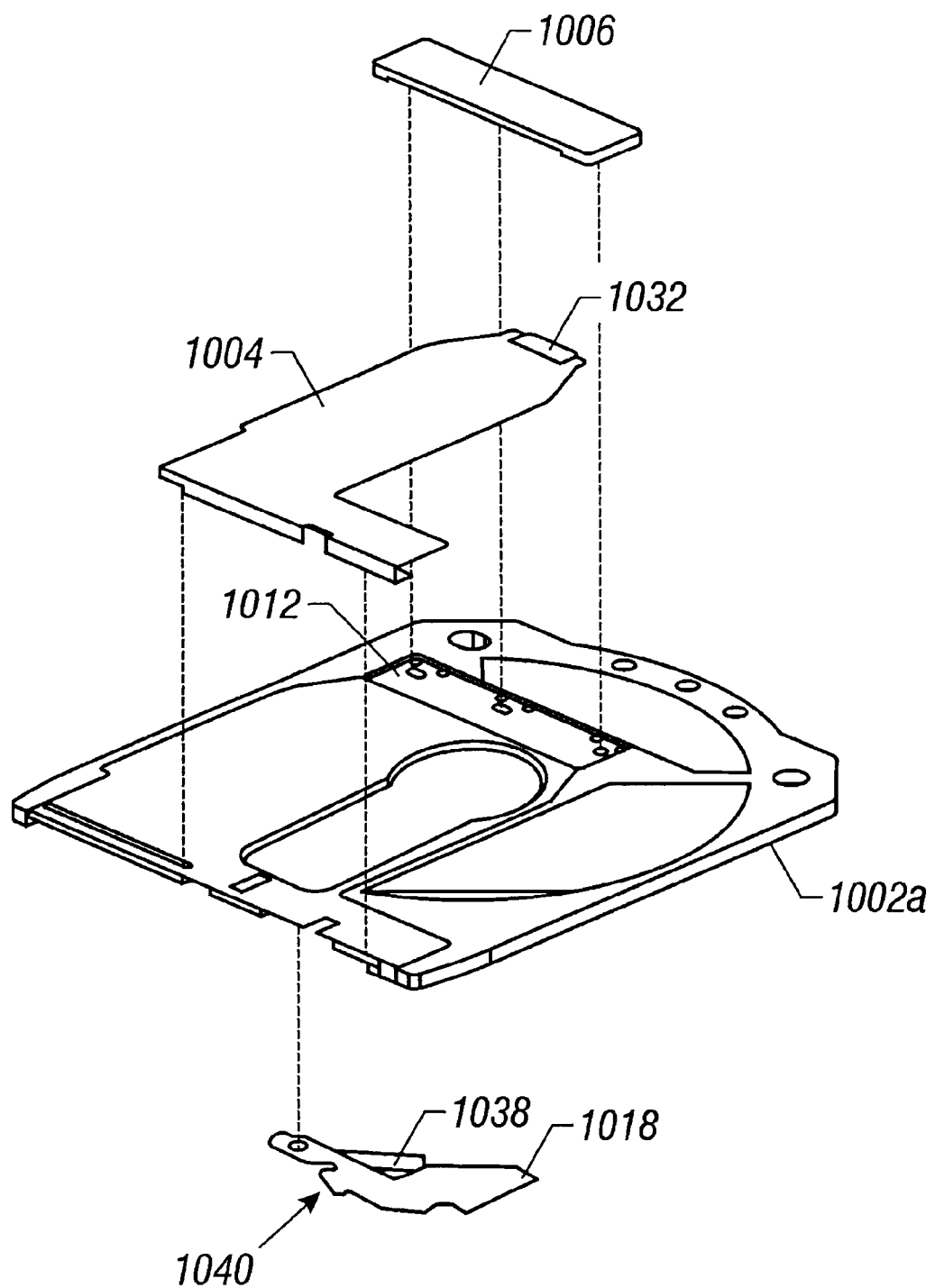
FIG. 47 is an exploded view of the housing member, showing the shutter keeper, the shutter member, and the lock.
Figure 48A:
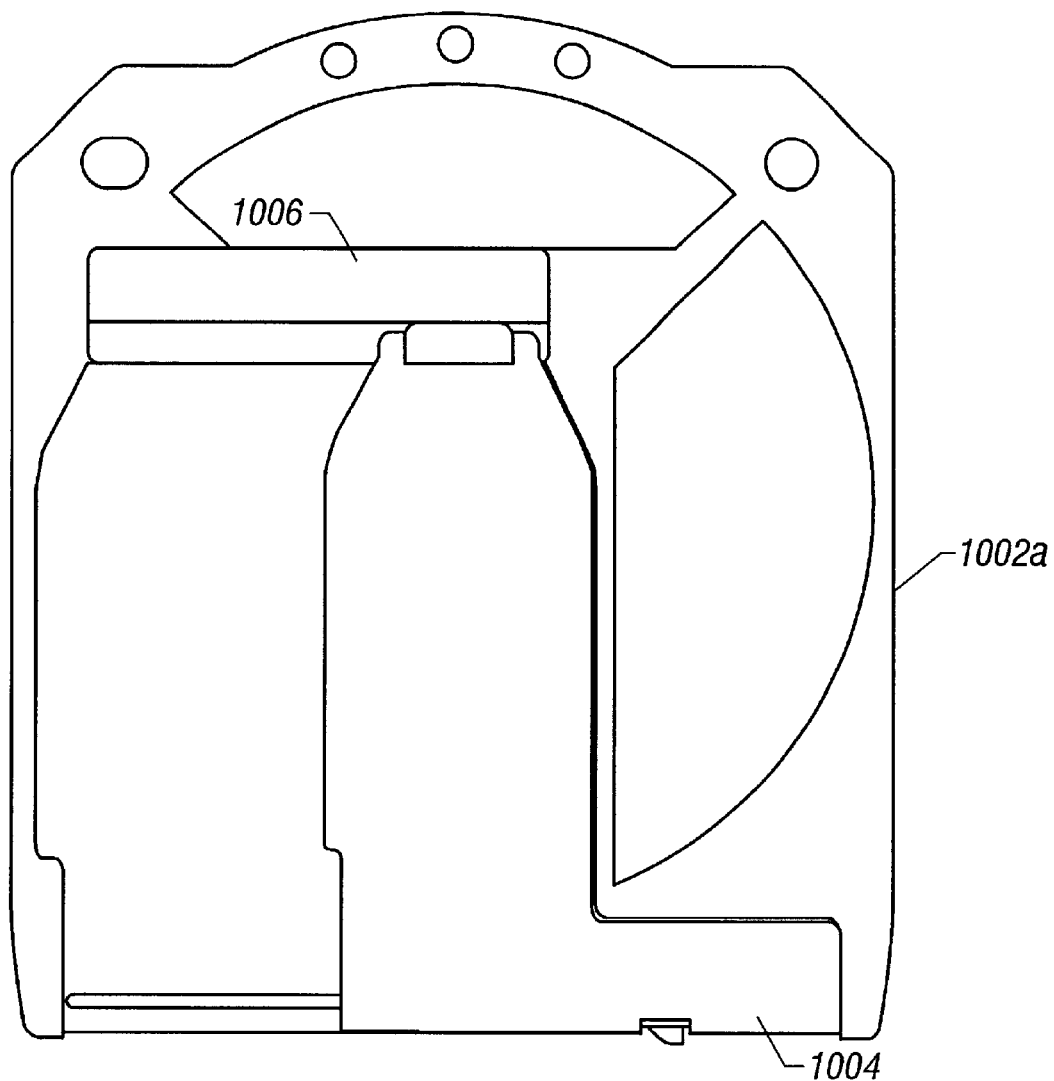
FIG. 48A is a plan view from the outside of the housing member showing the placement of the shutter member and the shutter keeper.
Figure 48B:
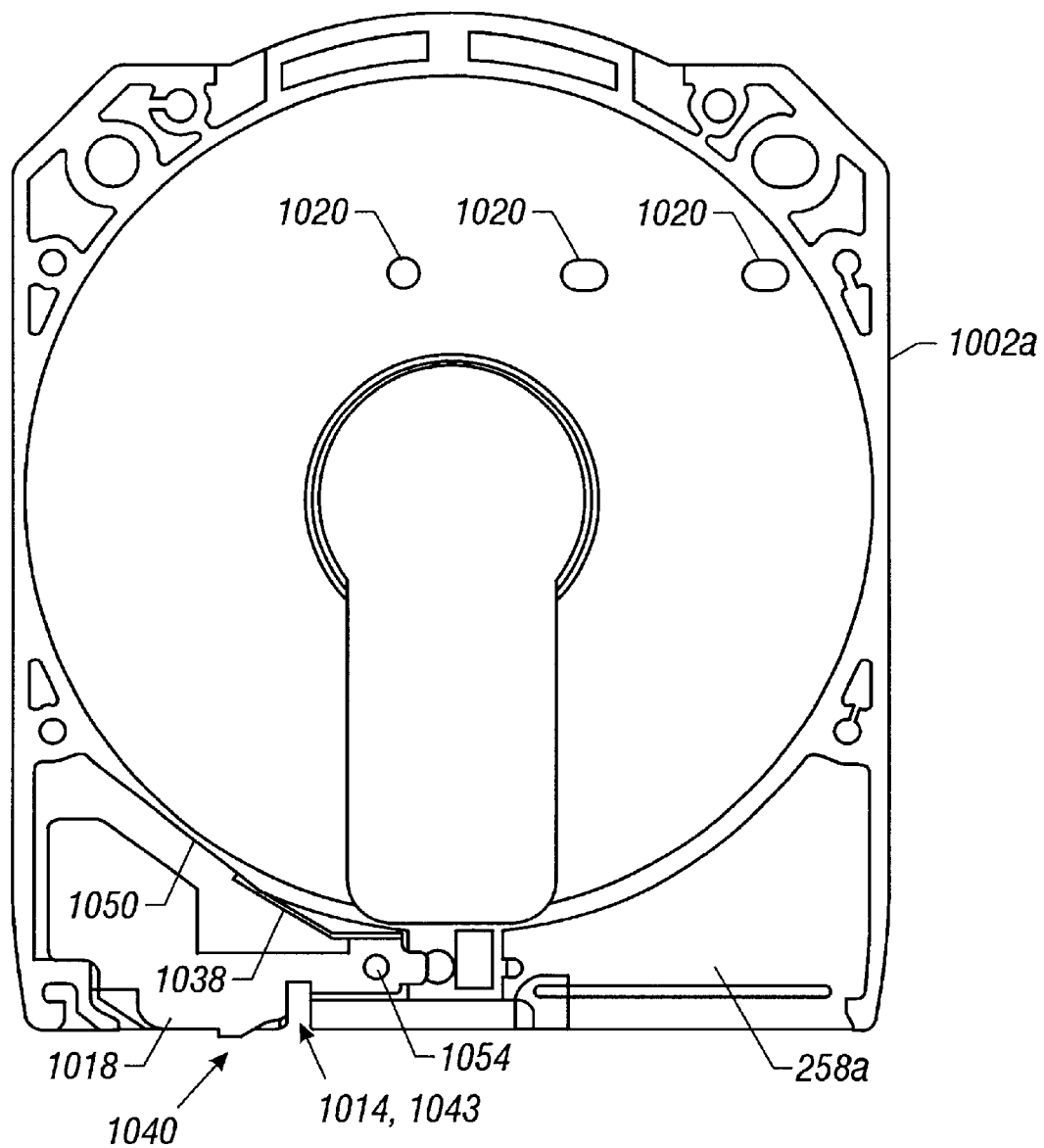
FIG. 48B is a plan view from the inside of the housing member showing the placement of the lock.

FIG. 47 is an exploded view of the assembly of housing member 1002a, showing shutter member 1004 and shutter cover 1006, and in particular how shutter cover 1006 fits into recess 1012. Also shown in a locking arm 1018, which fits on surface 254a (not visible in FIG. 47), as described below. FIGS. 48A and 48B are top and bottom plan views, respectively, showing the assembly of shutter member 1004, shutter cover 1006, and locking arm 1018 to housing member 1002a.

Figure 49A:
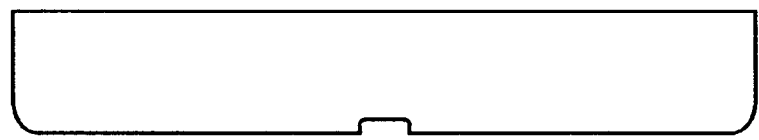
FIG. 49A is a plan view from the outside of the shutter keeper.
Figure 49B:
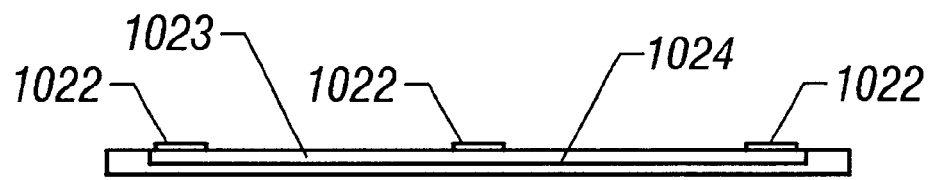
FIG. 49B is an elevation view of the shutter keeper.
Figure 49C:
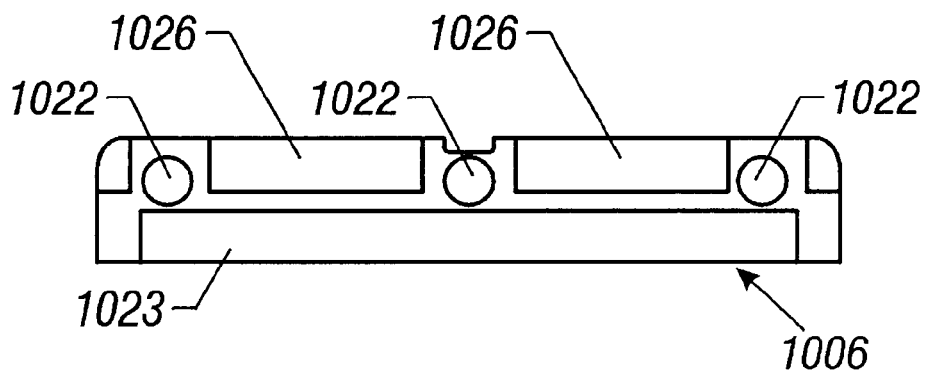
FIG. 49C is a plan view from the inside of the shutter keeper.

FIGS. 49A, 49B and 49C are top, side and bottom views of shutter cover 1006. As shown in FIGS. 49B and 49C, the bottom surface of shutter cover 1006 includes a shutter tab recess 1023, a recessed shutter guide surface 1024 and recessed glue reservoirs 1026. Also, three posts 1022 protrude from the bottom surface of shutter cover 1006. In one embodiment, shutter cover 1006 is 0.61 mm thick, shutter guide surface 1024 is recessed 0.28 mm, and posts 1022 are 0.20 mm high. The overall dimensions of shutter cover 1006 are 17.53 mm×2.92 mm. Shutter cover 1006 fits into recess 1012 on the top surface of housing member 1002a, and posts 1022 fit into holes 1020, shown in FIGS. 44, 45, 46A and 48B. As indicated, one of the holes 1020 is circular and the other two are oval to allow for tolerances in the spacing between posts 1022. When shutter cover 1006 is assembled to housing member 1002a, posts 1022 should not extend below the surface 133 on the bottom of housing member 1002a. Likewise, no glue should protrude below surface 133.

Various views of shutter member 1004 are shown in FIGS. 51A–51G. Shutter member 1004 is similar to shutter member 108a (see, e.g., FIG. 6), except in two respects. First, shutter member 1004 has no tab 218 and instead has a tapered portion 1030 that terminates in an upper tab 1032 which, as shown in FIGS. 51C and 51D, is offset from the tapered portion 1030. In one embodiment, the angle α of tapered portion 1030 in FIG. 51B is 25.87 degrees, and the offset distance D1 shown in FIG. 51D is 0.43 mm. Shutter member 1004 may be formed of ½ hard 300 series stainless steel 0.127±0.0127 mm thick. Upper tab 1032 can be formed by stamping shutter member 1004 such that the edges 1032A are bent (twice) while the edge 1032B is sheared, leaving a small gap 1032C between tab 1032 and the rest of shutter member 1004, as shown in FIG. 51D. Shutter member 1004 is preferably cleaned to be compatible with a Class 1000 environment and should be free of any residual greases or oils.

Figure 50:
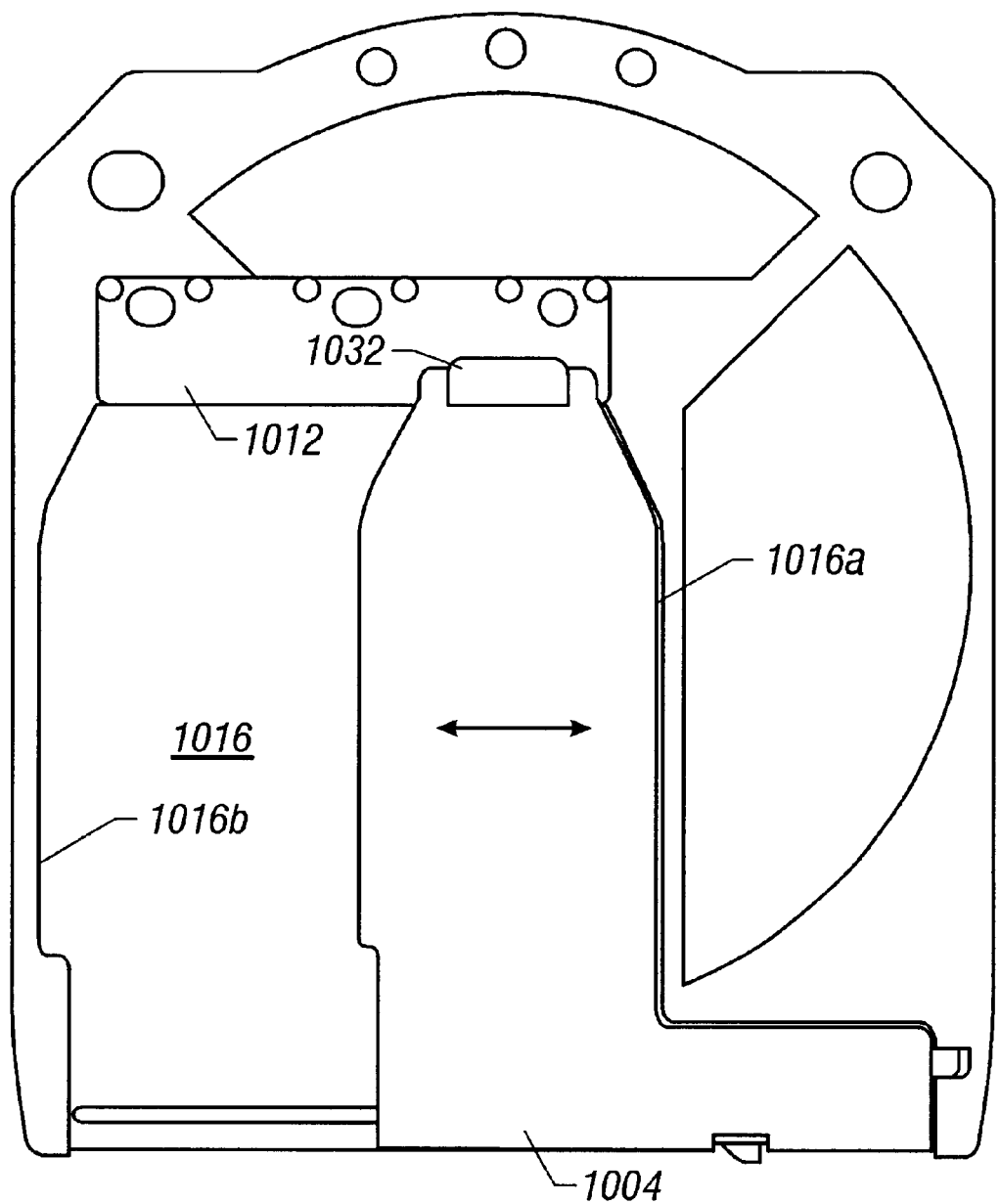
FIG. 50 is a plan view from the outside of the housing member showing the placement of the glue used to bond the shutter keeper.

Upper tab 1032 fits into shutter tab recess 1023 (FIG. 49C) and slides along shutter guide surface 1024 as shutter member opens and closes. FIGS. 47 and 48A show this structure, and FIG. 50 shows the position of upper tab 1032 without the shutter cover 1006 in place. Note that the edges of shutter member 1004 conform to the edges 1016a and 1016b of recess 1016 such that the edges of shutter member 1004 merge with edges 1016a, 1016b, respectively, when shutter member 1004 reaches the extremes of its travel.

Thus, in this embodiment upper tab 1032 slides in the slot formed by recess 1023 and does not extend into the interior of the cartridge 1000. Therefore, upper tab 1032 is isolated from the interior of cartridge assembly 1000 and, in particular, the medium 116, and medium 116 is protected from any particles or contaminants on the exterior of cartridge 1000 and in particular from any debris that may be generated by the sliding motion of upper tab 1032 against housing member 1002a and shutter cover 1006.

The other respect in which shutter member 1004 differs from shutter member 108a is that a tab 1034 is substituted for tab 214a (FIG. 6). As shown in FIG. 51G, tab 1034 has an angled surface 1034X which engages a catch 1047, shown in FIG. 46C, when shutter member 1004 is closed. This locking engagement between tab 1034 and catch 1047 prevents shutter member 1004 from rotating in the direction shown by arrow 1035 in FIG. 51G. Such rotation could cause shutter member 1004 to slip over locking nub 1040 of locking arm 1018 (FIG. 53) and thereby allow shutter member 1004 to slide open when cartridge 1000 is outside a disk drive. This would expose the data storage disk to the possibility of damage.

Figure 52:
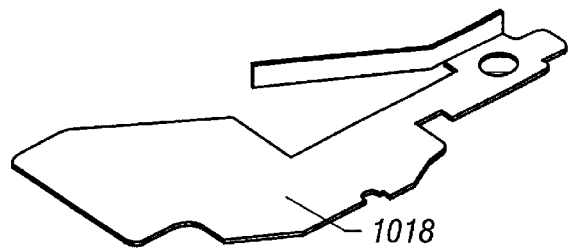
FIG. 52 is a perspective view of the locking arm.

FIG. 52 shows a perspective view of locking arm 1018, and FIG. 48B illustrates the placement of locking arm 1018 on surface 254a. As shown in the detailed plan view of FIG. 53, locking arm 1018 includes a spring member 1038, a locking nub 1040 that is aligned with slot 234 in the bottom of shutter member 1004 (see FIG. 51E), and stop edges 1044 and 1046. To assist the shutter member 1004 in sliding over locking nub 1040, a cam surface 1041 is provided. Cam surface 1041 is made slightly concave. Cam surface 1041 may be formed as an arc of a circle having a radius R as shown. In one embodiment, the length of locking arm 1018 measured from the center of pivot hole 1052 is 12.45 mm, and the radius R is 1.27 mm.

Figure 53:
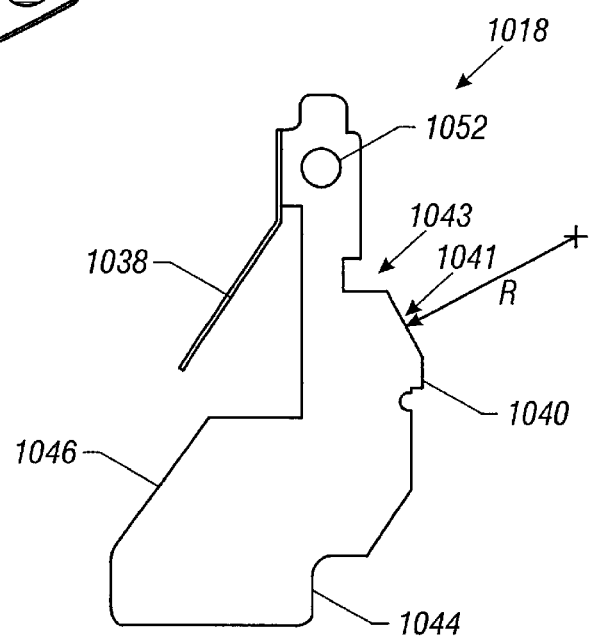
FIG. 53 is a plan view of the locking arm.
Figure 54A:
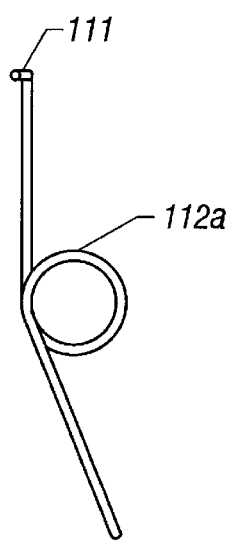
FIGS. 54A, 54B and 54C are views of the shutter closing spring.
Figure 54B:
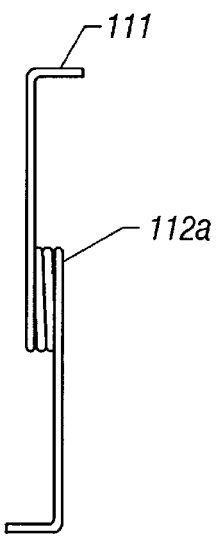
Figure 54C:
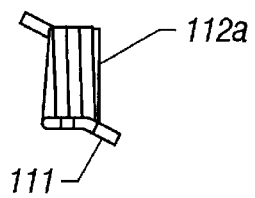
Figure 54D:
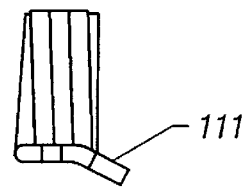
FIG. 54D is a detailed view of the hook at one end of the shutter closing spring.

Referring still to FIG. 48B, the clockwise rotation of locking arm 1018 is limited by contact between stop edge 1046 against surface 1050, and the counterclockwise rotation of locking arm 1018 is limited by contact between stop edge 1044 against surface 1048 (see FIGS. 46A and 53). Safety slot 1043 of locking arm 1018 is aligned with picker safety slot 1014 when locking arm 1018 is installed on surface 254a.

Locking arm 1018 is rotatably disposed in between the corresponding opposing surfaces 254a, 254b and 258a, 258b by means of a pivot hole 1052 in locking arm 1018 which fits over a pivot pin 1054 connected to the housing member 1002a. This assembly is similar to that shown in FIGS. 2 and 6 for locking arms 113a, 113b. When the locking nub 1040 protrudes into slot 234 (FIG. 48B), the spring member 1038 exerts little or no force against the bearing surface 1050 of the housing member 1002a. Spring member 1038, however, applies a resistive force against the depression of locking nub 1040 into housing member 1002a, with the magnitude of the resistive force being directly proportional to the degree of clockwise rotation of locking arm 1018.

The gap between restraining edge 1046 and surface 1050 when locking arm is rotated fully counterclockwise (shown in FIG. 48B) is selected so as to prevent overcompression and damage to the spring member 1038 when locking arm 1018 is rotated fully clockwise. This can occur, for example, when a user unlocks the shutter member 1002 by using an object to dislodge the locking nub 1040 inwardly.

FIGS. 46B and 46C show two useful features of the cartridge assembly 1000. FIG. 46B shows a detailed view of a locking arm height adjustment pin 1056. Pin 1056 presses against the locking arm (not shown) that is located in the cavity formed by surfaces 258a and 254b, and holds that locking arm close to against surface 254b. FIG. 46C shows a detailed view of a corner of housing member 1002a including the surface 254a, the surface 1048, and the pivot pin 1054. As indicated, a retaining shelf 1058 is formed above the surface 254a. The edge 1044 of locking arm 1018 fits under retaining shelf 1058, and this, along with pivot pin 1054, helps to retain locking arm 1018 against surface 254a during the assembly of cartridge assembly 1000.

Figure 46D:
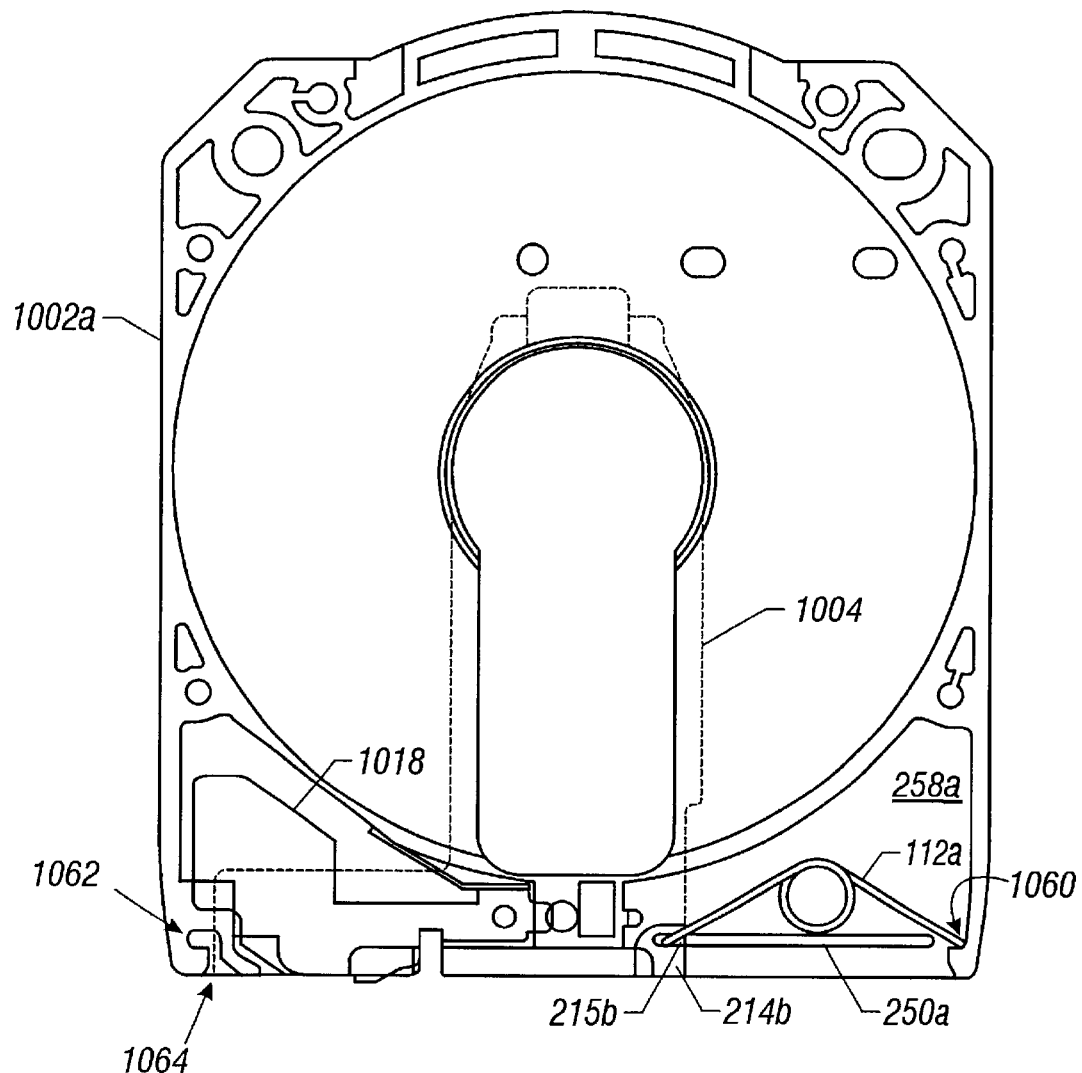
FIG. 46D is a view similar to FIG. 46A but showing in addition the placement of the shutter closing spring when the shutter member is in the closed position.
Figure 46E:
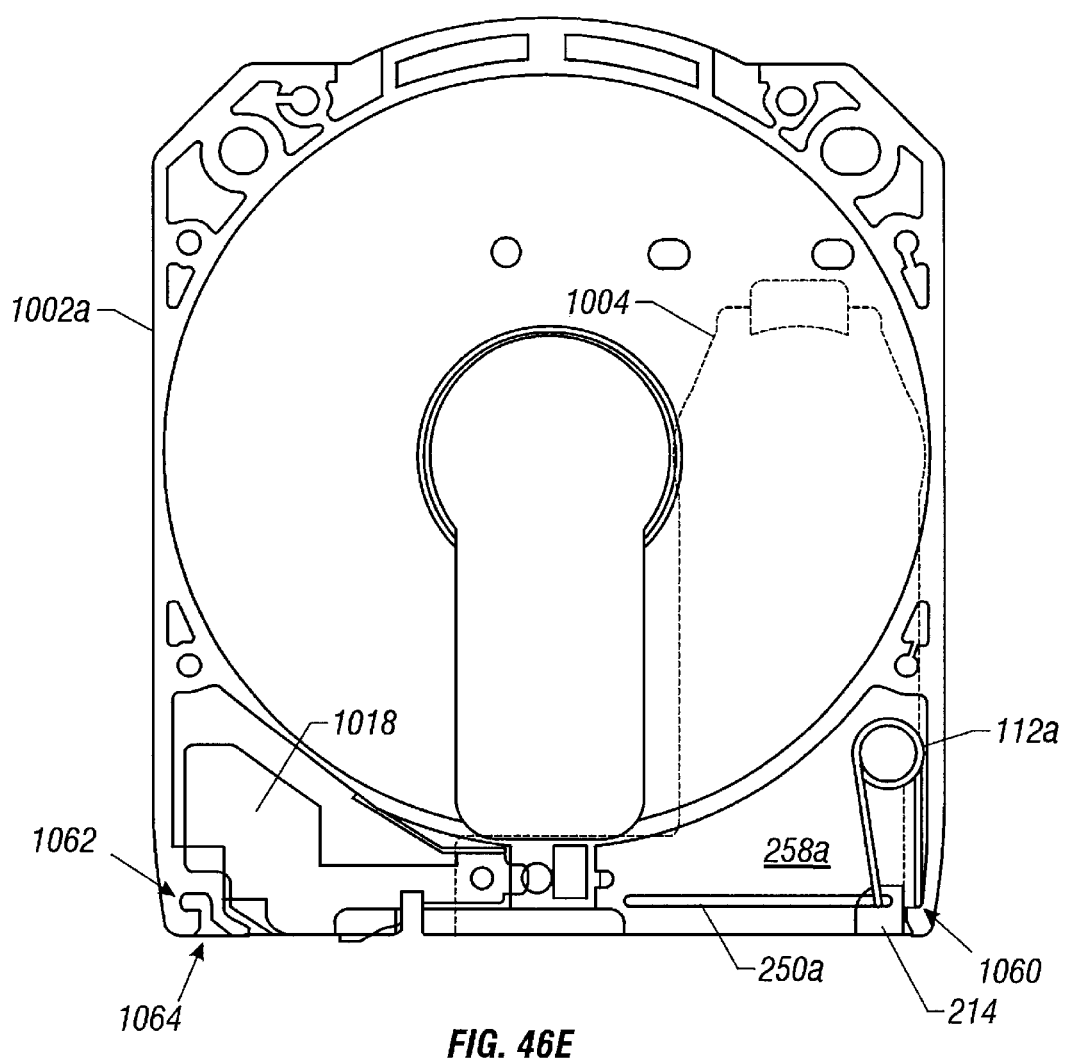
FIG. 46E is a view similar to FIG. 46D but with the shutter member in the open position.

FIGS. 46D and 46E are plan views of housing member 1002a similar to FIG. 46A but showing the placement of spring member 12a on surface 258a. Shutter member 1004, which is on the opposite side of housing member 1002a, is shown in dashed lines. FIG. 46D shows the configuration of spring member 112a when shutter member 1004 is closed; FIG. 46E shows the configuration of spring member 112a when shutter member 1004 is open. As described above, one end of spring member 112a (the end that points downward in FIGS. 46D and 46E) fits into guide slot 250a and into indentation 215b of tab 214b. In embodiments where one end of spring member 112a has a hook 111 (see FIGS. 54A–54D), the end with the hook 111 is fitted into guide slot 250a and indentation 215b. The other end of spring member 112a (the end that points upward in FIGS. 46D and 46E) fits into a corner 1060 of housing member 1002a. When housing members 1002a and 1002b are assembled, corner 1060 of housing member 1002a is aligned with a slot 1062 in housing member 1002b. (Note: slot 1062 of housing member 1002a is shown in FIGS. 46D and 46E. It will be understood that housing member 1002b also has a slot 1062 in the same location that mates with corner 1060 of housing member 1002a when housing members 1002a and 1002b are assembled.) Slot 1062 has a V-shaped entrance 1064 (see also FIG. 42) from the outside.

This structure allows spring member 112a to be inserted in cartridge assembly 1000 after housing members 1002a and 1002b have been assembled. First, one end of spring member is fitted into indentation 215b and guide slot 250a; then, applying a force against the coil of spring member 112a causes the other end of spring member to slide through entrance 1064 and slip into slot 1062 and corner 1060. As a result of this easy assembly technique, made possible by the juxtaposition of entrance 1064 and slot 1062, spring member 112a is introduced into and securely held within cartridge assembly 1000.

Figure 55:
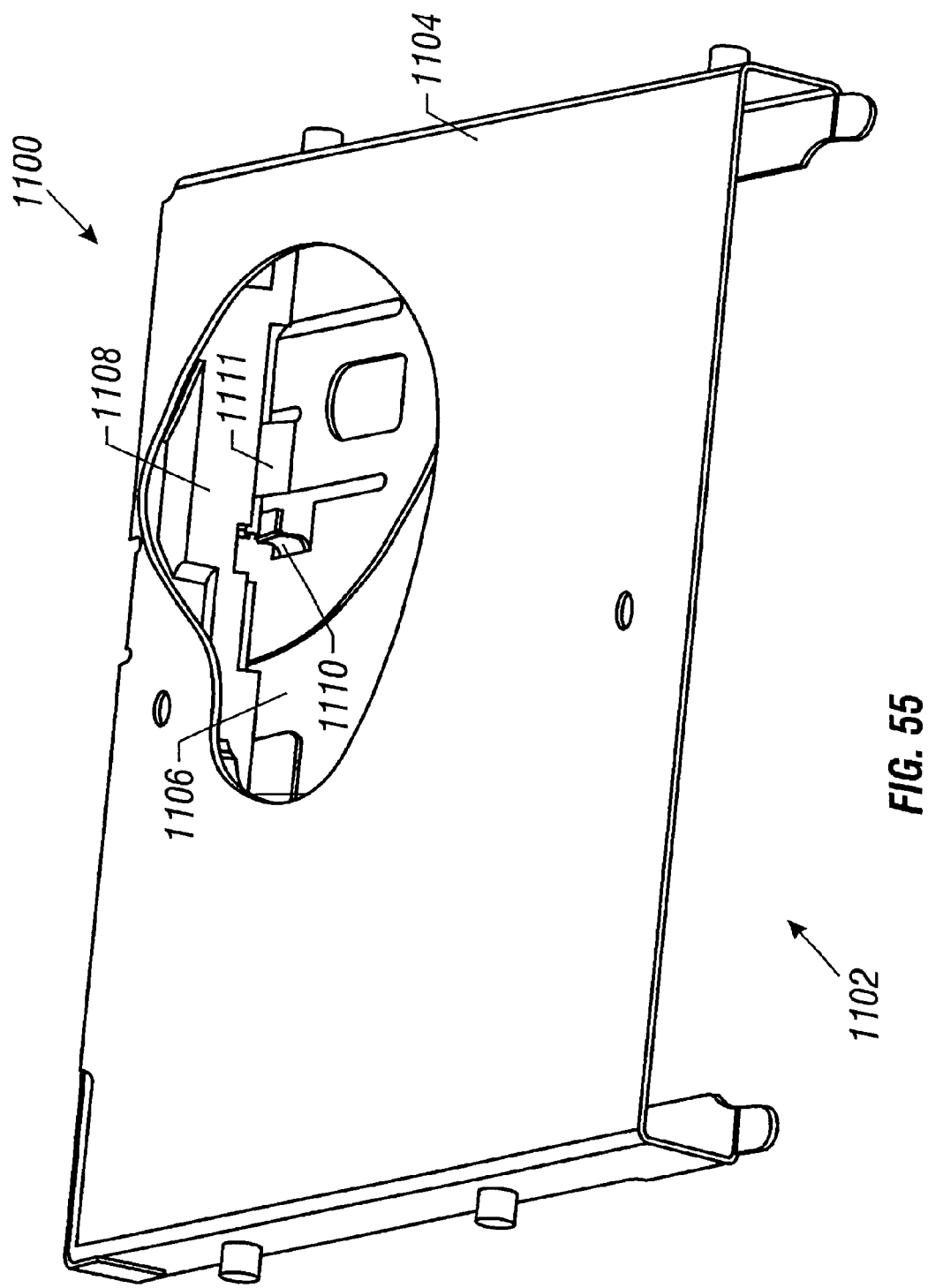
FIG. 55 is a broken-away view of a disk drive drawer for use with the cartridge assembly of this invention.

FIG. 55 is a broken-away view of a disk drive drawer 1100 that can receive cartridge assembly 1000, including a mechanism for opening shutter member 1004 as cartridge assembly is inserted in drawer 1100. Drawer 1100 includes an opening 1102 into which cartridge assembly 1000 is inserted, a top panel 1104, and a bottom panel 1106. Also shown in FIG. 55 is a portion of a rotary arm 1108, which is similar to rotary arm 700 shown in FIGS. 12–16A, and which operates in a similar manner to rotary arm 700 open shutter member 1004 as cartridge assembly 1000 is inserted into drawer 1100.

Referring again to FIG. 55, of particular importance is a blocking tab 1110 which is formed on bottom panel 1106 and protrudes into the path of cartridge assembly 1000. Blocking tab 1110 is aligned with the picker safety slot 1014 of housing member 1002a, shown in FIGS. 46A and 46B, and also with safety slot 1043 of locking arm 1018, shown in FIG. 53.

FIGS. 56A–56E illustrate the operation of blocking tab 1110 in conjunction with safety slots 1043 to prevent cartridge assembly 1000 from being fully inserted into drawer 1100 if rotary arm 1108 does not properly open the shutter member 1004. After cartridge assembly 1000 has been inserted into drawer 1100, it drops into a position in which the data stored on disk 116 can be read. For the data to be read, the shutter member 1004 must be open. If cartridge assembly 1000 were to be fully inserted into drawer 1100 with shutter member 1004 not open, the mechanism would jam and cartridge assembly 1100 could not easily be removed. Therefore, it is important to ensure that cartridge assembly 1000 cannot be fully inserted into drawer 1100 if shutter member 1004 does not op en.

Figure 56A:
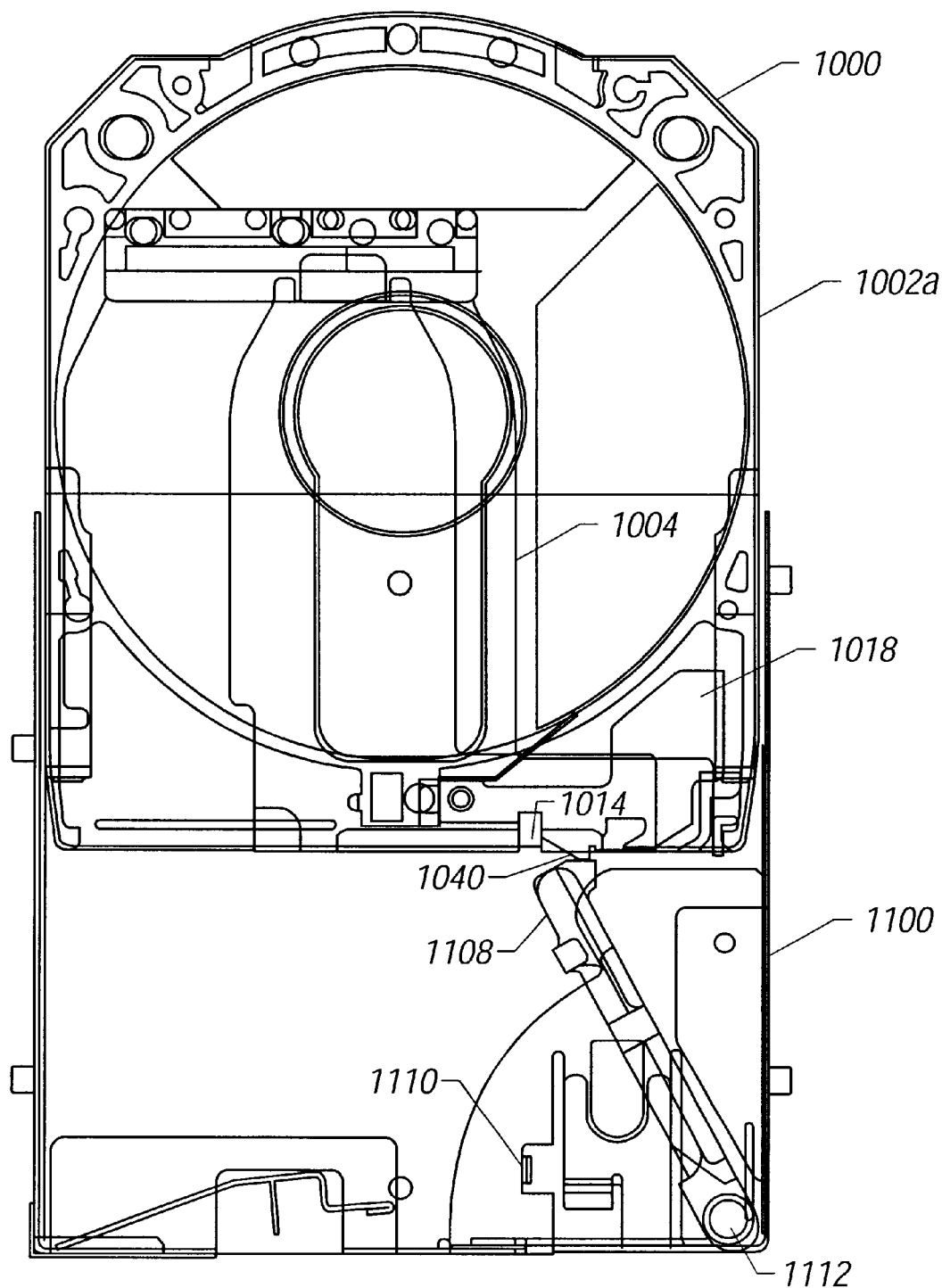
FIGS. 56A–56D are views showing the insertion of a cartridge assembly into the drawer.
Figure 56B:
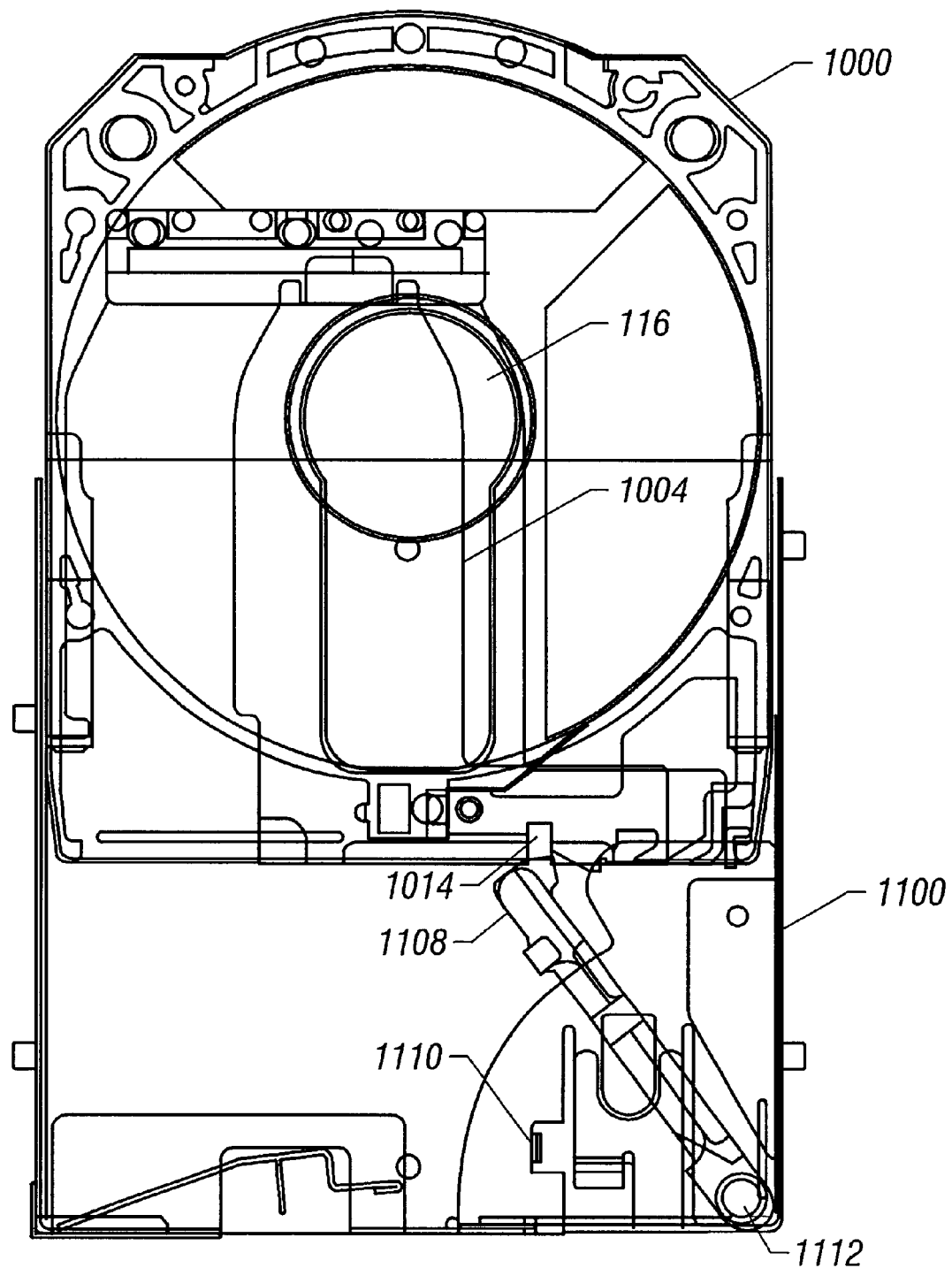
Figure 56C:
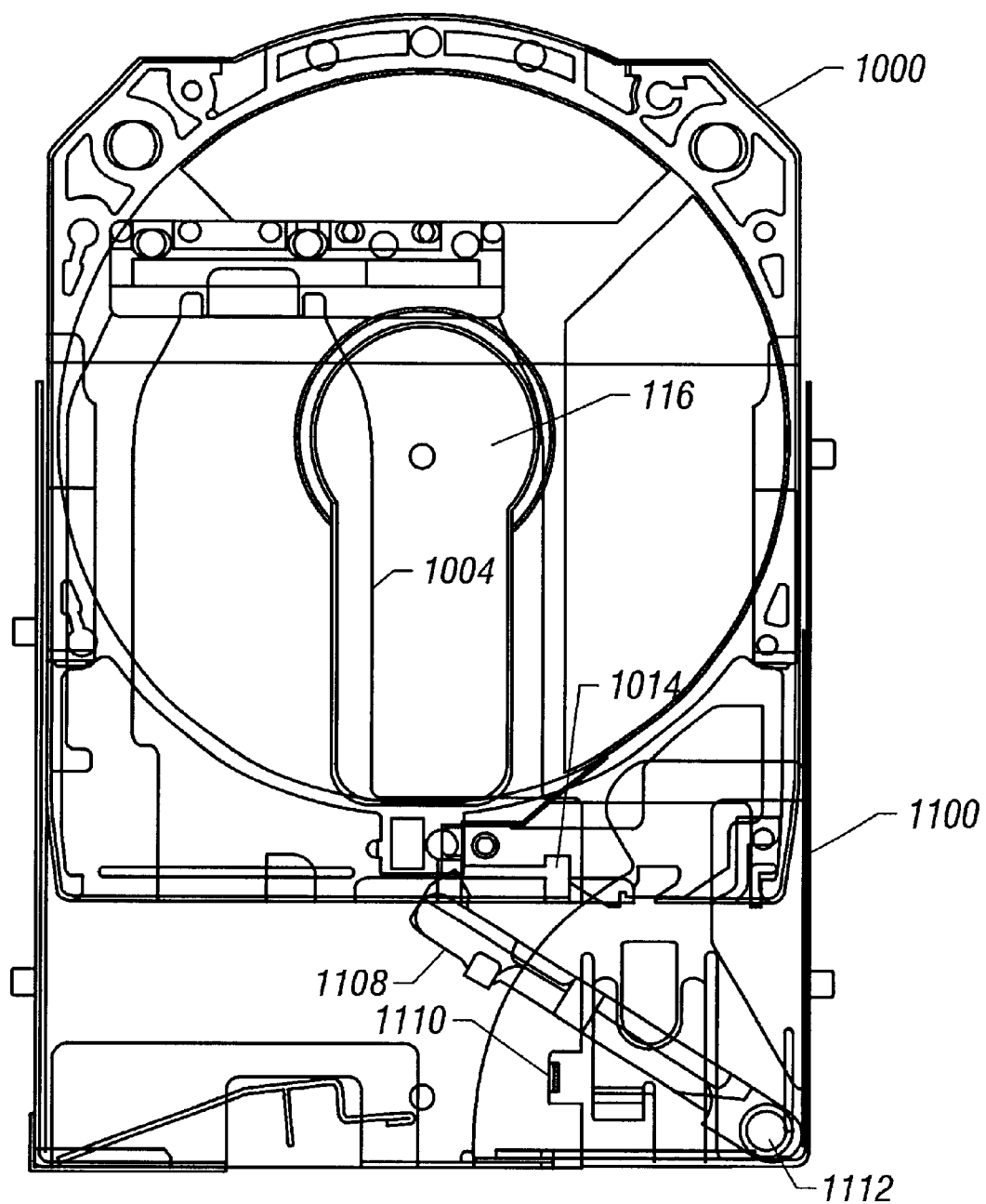

FIGS. 56A–56D illustrate several stages of the insertion of cartridge assembly 1000 into drawer 1100. In each drawing rotary arm 1108 rotates about a pivot point 1112. FIG. 56A shows the structure as cartridge assembly 1000 approaches rotary arm 1108, with rotary arm 1108 about to make contact with locking nub 1040. Shutter member 1004 is in a first position wherein the opening in housing 1002a is closed. In FIG. 56B, rotary arm 1108 has contacted locking nub 1040 and depressed it into cartridge assembly 1000. At the same time, rotary arm 1108 has rotated counterclockwise, pushing shutter member 1004 to the left and uncovering a portion of disk 116. In FIG. 56C, rotary arm 1108 has rotated further counterclockwise, further opening shutter member 1004, and in FIG. 56D, rotary arm 1108 has completely opened shutter member 1004. In this second, open position, the opening in housing 1002a is at least partially uncovered to expose a portion of data storage disk 116.

Figure 56D:
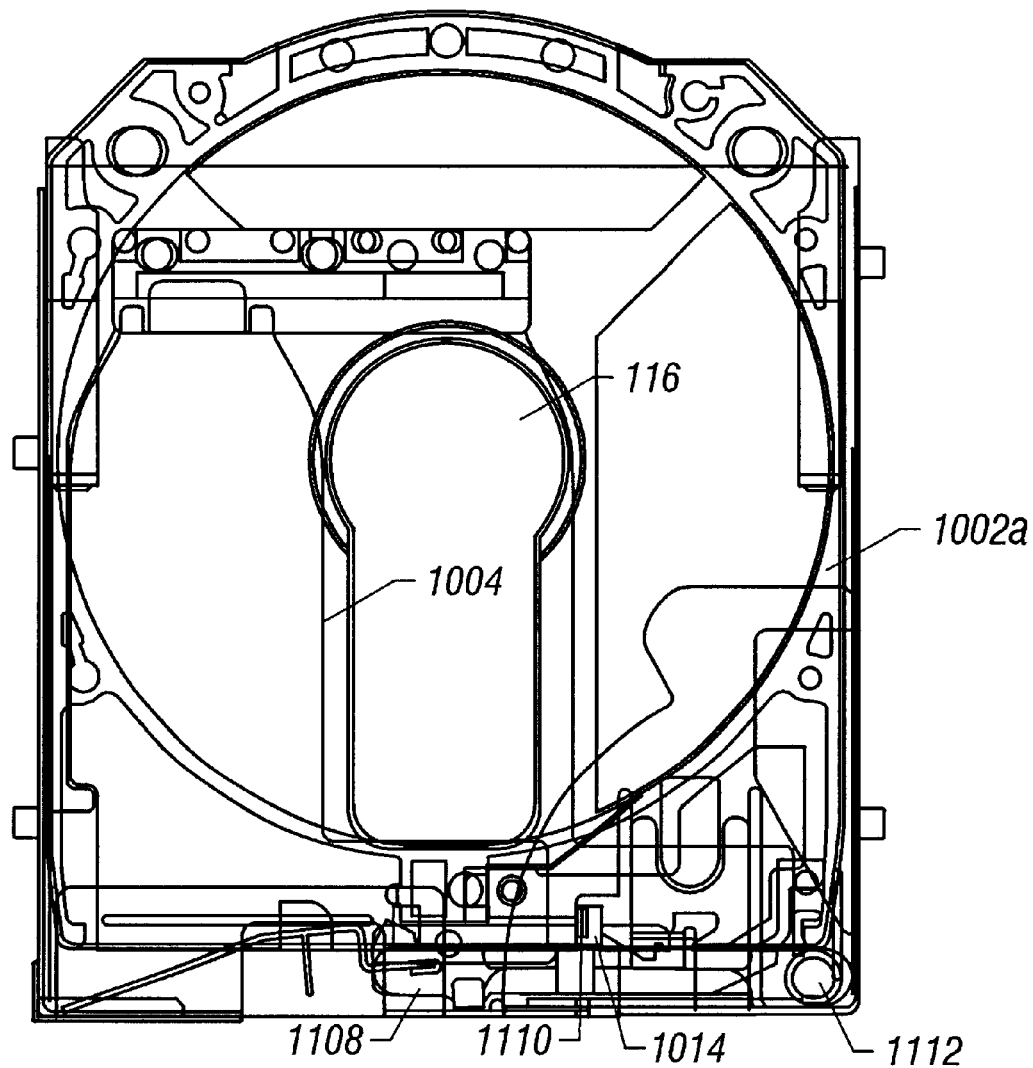

In FIGS. 56A–56C, picker safety slot 1014 in cartridge 1000 is covered by shutter member 1004, while in FIG. 56D, shutter member 1004 has moved all the way to the second, open position, uncovering picker safety slat 1014. Since blocking tab 1110 is aligned with picker safety slot 1014, the presence of blocking tab 1110 does not interfere with the insertion of cartridge assembly 1000 all the way into drawer 1100 when shutter member 1004 has completely opened. As shown in FIG. 56D, safety slot 1014 can be configured to receive stationary blocking tab 1110 of drawer 1100, such that the walls of safety slot 1014 are free from contact with blocking tab 1110 while blocking tab 1110 is disposed within safety slot 1014. Since safety slot 1043 of locking arm 1018 is aligned with picker safety slot 1014, as shown in FIG. 48B, locking arm 1018 likewise does not interfere with the insertion of cartridge assembly 1000 into drawer 1100.

Figure 56E:
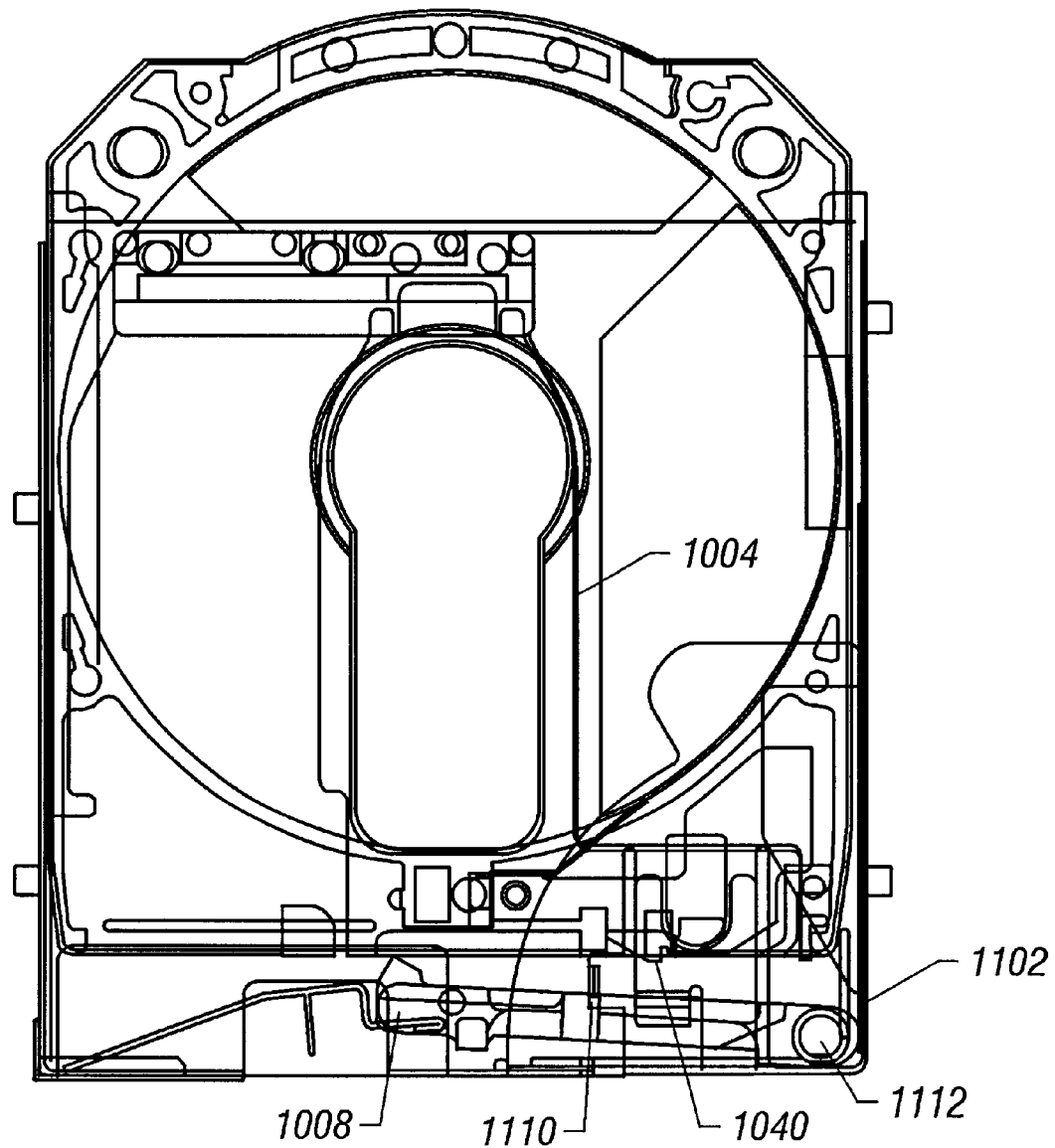
FIG. 56E is a view showing how the blocking tab in the drawer prevents the cartridge assembly from being insert all the way in the drawer if the shutter member is not properly opened.

Contrast FIG. 56D with FIG. 56E. FIG. 56E shows the configuration of drawer 1100 if rotary arm 1108 for some reason does not push shutter member 1004 to the left as cartridge assembly 1000 into drawer 1100. When shutter member 1004 remaining in the first closed position, picker safety slot 1014 remains covered by shutter member 1004, and blocking tab 1110 contacts shutter member 1004, preventing cartridge assembly 1000 from being inserted all the way in to drawer 1000. Thus cartridge assembly 1000 does not become jammed and the user can withdraw cartridge assembly 1000.

A number of variations and modifications of the invention can be used. It would be possible to provide for some features of the invention without providing others. For example, the cartridge assembly can be modified to include an annular labyrinth seal between the hub region of the medium and the interior surfaces of adjacent regions of the first and second housing members, as discussed in Ser. No. 09/315,398, supra. Such a seal can further decrease the likelihood that particles can enter into the interior of the cartridge assembly from the external environment. The leading edge of the cartridge can include one or more recesses that may be used to encode by their number, position, shape, depth, or the like, characteristics of the cartridge or disk such as data density, number of recordable sides, formatting, and the like. The cartridge can be configured to provide for recording on only one surface of the medium, such as by having only one window, one shutter member, and/or being configured to prevent inserting of the cartridge into the disk drive in an attitude other than with the window accessible to drive optics. The side(s) of the cartridge can include one or more grooves for engaging one or more guide rails of the disk drive to assist in desired alignment or positioning of the cartridge with respect to the drive. The cartridge assembly can include vents to cause expulsion of particles located inside of the cartridge assembly during disk rotation. As will be appreciated, when the medium or disk is rotated a pressure differential is created, with the pressure internal to the cartridge assembly being greater than the pressure external to the cartridge assembly. One or more vents would permit particles located inside of the cartridge to be expelled due to the pressure differential. The vent(s) can be of any suitable configuration. Preferably, the vent(s) would include one or more features to inhibit particles from entering the cartridge interior when the pressure is equalized (i.e., when the disk is not in rotation). Such features could selectively open the vent(s) only when the pressure differential is at or above a predetermined threshold. An example would be a flap or cover that is moved outwardly by the pressure differential.

The optical storage device and system of the present invention can be used for various types of data storage including storing data for use by computers such as personal computers, laptops, work stations and the like, storage for music or other audio purposes, including storage for MP3 players, digital cameras, motion picture, home video or other video storage purposes, voice data, computer programs and/or data, personal information or data such as medical data, identification, password or encryption/decryption data, credit information, credit or debit card information and the like. Indeed, it is believed that it will be particularly advantageous to provide for use of the storage system and/or medium of the present invention in a wide variety of devices, e.g. to provide for ease of sharing, storing or transmitting of data, e.g. between platforms including, but not limited to, devices for play-back, communication or reproduction of data (including, e.g. image, video or music data), such as personal stereo or other personal (or fixed) music reproduction devices, portable or fixed television or video reproduction devices, computer peripheral devices, computer game devices, gaming or gambling devices, still, video or motion picture cameras, automobile stereos or other audio or video devices, purchase or distribution devices such as automatic teller machines or other bank machines, vending machines, and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

We claim:

1. An assembly for allowing a data storage disk to be inserted in a data storage disk receiving device comprising:

a housing for containing a data storage disk;

a shutter member movable between a first position, where an opening defined on the housing is covered, and a second position, where the opening is at least partially uncovered to expose a portion of the data storage disk;

a slot defined on an edge of the housing formed of a wall along a perimeter of said slot, the slot being covered when the shutter member is in the first position and being uncovered when the shutter member is in the second position; and a drawer mechanism including a stationary blocking tab, the slot configured to receive said stationary blocking tab where said wall is free from contact with said stationary blocking tab while disposed within said slot to allow the data storage disk to be fully inserted into said drawer mechanism when the shutter member is in the second position.

* * * * *